(12) United States Patent
Unagami et al.

(10) Patent No.: US 9,311,487 B2
(45) Date of Patent: Apr. 12, 2016

(54) TAMPERING MONITORING SYSTEM, MANAGEMENT DEVICE, PROTECTION CONTROL MODULE, AND DETECTION MODULE

(75) Inventors: Yuji Unagami, Osaka (JP); Yuichi Futa, Osaka (JP); Natsume Matsuzaki, Osaka (JP); Hiroki Shizuya, Miyagi (JP); Shuji Isobe, Miyagi (JP); Atsushi Umeta, Miyagi (JP)

(73) Assignee: Panasonic Corporation, Osaka (JP)

( * ) Notice: Subject to any disclaimer, the term of this patent is extended or adjusted under 35 U.S.C. 154(b) by 573 days.

(21) Appl. No.: 13/643,671

(22) PCT Filed: Mar. 1, 2012

(86) PCT No.: PCT/JP2012/001399
§ 371 (c)(1),
(2), (4) Date: Oct. 26, 2012

(87) PCT Pub. No.: WO2012/124270
PCT Pub. Date: Sep. 20, 2012

(65) Prior Publication Data
US 2013/0039491 A1    Feb. 14, 2013

(30) Foreign Application Priority Data
Mar. 15, 2011  (JP) .................................. 2011-056045

(51) Int. Cl.
*H04L 9/14* (2006.01)
*G06F 21/57* (2013.01)
(Continued)

(52) U.S. Cl.
CPC .............. *G06F 21/575* (2013.01); *G06F 21/64* (2013.01); *H04L 9/085* (2013.01); *G06F 2221/2125* (2013.01); *H04L 2209/16* (2013.01)

(58) Field of Classification Search
None
See application file for complete search history.

(56) References Cited

U.S. PATENT DOCUMENTS 5,825,880 A * 10/1998 Sudia et al. .................... 713/180
7,174,464 B1 * 2/2007 Cuenod ................. G06F 21/123
226/26

(Continued)

FOREIGN PATENT DOCUMENTS

| CN | 1985260 | 6/2007 |
| CN | 101023433 | 8/2007 |

(Continued)

OTHER PUBLICATIONS

International Search Report issued Apr. 17, 2012 in International (PCT) Application No. PCT/JP2012/001399.

(Continued)

*Primary Examiner* — Peter Poltorak
*Assistant Examiner* — Christopher Ruprecht
(74) *Attorney, Agent, or Firm* — Wenderoth, Lind & Ponack, L.L.P.

(57) ABSTRACT

A management device 200d comprises: a key share generation unit 251d generating a plurality of key shares by decomposing a decryption key, the decryption key being for decrypting an encrypted application program generated as a result of encryption of the application program; and an output unit 252d outputting each of the key shares to a different one of a plurality of detection modules. The detection modules acquire and store therein the key shares. The protection control module 120d comprises: an acquisition unit 381d acquiring the key shares from the detection modules; a reconstruction unit 382d reconstructing the decryption key by composing the key shares; a decryption unit 383d decrypting the encrypted application program with use of the decryption key; and a deletion unit 384d deleting the decryption key, after the decryption by the decryption unit is completed.

20 Claims, 37 Drawing Sheets

(51) Int. Cl.
*G06F 21/64* (2013.01)
*H04L 9/08* (2006.01)

(56) References Cited

U.S. PATENT DOCUMENTS

| | | | |
|---|---|---|---|
| 7,594,267 B2* | 9/2009 | Gladstone et al. | 726/23 |
| 7,756,873 B2* | 7/2010 | Gould et al. | 707/737 |
| 7,831,838 B2* | 11/2010 | Marr et al. | 713/187 |
| 2002/0013898 A1* | 1/2002 | Sudia et al. | 713/155 |
| 2004/0179686 A1* | 9/2004 | Matsumura et al. | 380/44 |
| 2004/0205140 A1* | 10/2004 | Ikeno | 709/206 |
| 2005/0198521 A1* | 9/2005 | Nakazawa | 713/194 |
| 2006/0047805 A1* | 3/2006 | Byrd et al. | 709/224 |
| 2006/0053302 A1* | 3/2006 | Yasaki | H04L 9/0822 713/183 |
| 2007/0124580 A1* | 5/2007 | Brownell | G06F 21/10 713/156 |
| 2007/0214385 A1* | 9/2007 | White et al. | 714/13 |
| 2007/0271191 A1* | 11/2007 | Torrubia-Saez | 705/59 |
| 2008/0010686 A1* | 1/2008 | Nemoto et al. | 726/27 |
| 2008/0034442 A1* | 2/2008 | Nonaka et al. | 726/27 |
| 2008/0289032 A1 | 11/2008 | Aoki et al. | |
| 2009/0019288 A1* | 1/2009 | Oom Temudo de Castro et al. | 713/181 |
| 2009/0138708 A1* | 5/2009 | Miyazaki | H04L 63/12 713/168 |
| 2009/0193521 A1* | 7/2009 | Matsushima et al. | 726/22 |
| 2009/0249085 A1* | 10/2009 | Stransky | 713/194 |
| 2009/0300369 A1 | 12/2009 | Luetzelberger et al. | |
| 2009/0328003 A1* | 12/2009 | Pensak et al. | 717/124 |
| 2009/0328221 A1* | 12/2009 | Blumfield et al. | 726/24 |
| 2010/0154053 A1* | 6/2010 | Dodgson et al. | 726/19 |
| 2010/0162005 A1* | 6/2010 | Dodgson et al. | 713/193 |
| 2010/0180343 A1* | 7/2010 | Maeda et al. | 726/23 |
| 2010/0235588 A1 | 9/2010 | Maeda et al. | |
| 2010/0260334 A1* | 10/2010 | Obana | 380/28 |
| 2010/0325431 A1* | 12/2010 | Mordetsky et al. | 713/167 |
| 2011/0072279 A1* | 3/2011 | Milliken | 713/194 |
| 2011/0126291 A1* | 5/2011 | Araki | 726/26 |
| 2011/0271344 A1 | 11/2011 | Unagami et al. | |
| 2012/0102321 A1* | 4/2012 | Obana | 713/164 |
| 2012/0243679 A1* | 9/2012 | Obana | 380/28 |

FOREIGN PATENT DOCUMENTS

| | | | | |
|---|---|---|---|---|
| CN | 101236590 | 8/2008 | | |
| CN | 101739531 | 6/2010 | | |
| CN | 102301374 | 12/2011 | | |
| JP | 11-205304 | 7/1999 | | |
| JP | 2948814 | 9/1999 | | |
| JP | 2004-341152 | 12/2004 | | |
| JP | 2005-184134 | 7/2005 | | |
| WO | 2008/099682 | 8/2008 | | |
| WO | WO 2009105139 A1 * | 8/2009 | | G06F 21/31 |
| WO | 2009/118800 | 10/2009 | | |
| WO | 2010/092832 | 8/2010 | | |

OTHER PUBLICATIONS

Office Action issued Jul. 3, 2015 in Chinese Application No. 201280001316.1, with partial English translation.

* cited by examiner

FIG.5

Verification base data 640

| | Ref. info | ID info | Data | | Verification value | | Certificate | |
|---|---|---|---|---|---|---|---|---|
| First partial decryption process data 641 | | 110 | Encrypted application of application 110 | 110e | Decryption verification value A of application 110 = Hash (encrypted application ‖ 1st intermediate application) | 645a | Decryption process certificate Sign(Prk,Hash (A‖B‖C‖D‖E)) | 646a |
| | | 111 | Encrypted application of application 111 | 111e | Decryption verification value B of application 111 | 645b | | |
| | | 112 | Encrypted application of application 112 | 112e | Decryption verification value C of application 112 | 645c | | |
| | | 113 | Encrypted application of application 113 | 113e | Decryption verification value D of application 113 | 645d | | |
| | | 114 | Encrypted application of application 114 | 114e | Decryption verification value E of application 114 | 645e | | |
| Second partial decryption process data 642 | | 110 | 1st intermediate application of application 110 | 110da | Decryption verification value F of application 110 | 645f | Decryption process certificate Sign(Prk,Hash (F‖G‖H‖I‖J)) | 646b |
| | | 111 | 1st intermediate application of application 111 | 111da | Decryption verification value G of application 111 | 645g | | |
| | | 112 | 1st intermediate application of application 112 | 112da | Decryption verification value H of application 112 | 645h | | |
| | | 113 | 1st intermediate application of application 113 | 113da | Decryption verification value I of application 113 | 645i | | |
| | | 114 | 1st intermediate application of application 114 | 114da | Decryption verification value J of application 114 | 645j | | |
| Third partial decryption process data 643 | | 110 | 2nd intermediate application of application 110 | 110db | Decryption verification value K of application 110 | 645k | Decryption process certificate Sign(Prk,Hash (K‖L‖M‖N‖O)) | 646c |
| | | 111 | 2nd intermediate application of application 111 | 111db | Decryption verification value L of application 111 | 645l | | |
| | | 112 | 2nd intermediate application of application 112 | 112db | Decryption verification value M of application 112 | 645m | | |
| | | 113 | 2nd intermediate application of application 113 | 113db | Decryption verification value N of application 113 | 645n | | |
| | | 114 | 2nd intermediate application of application 114 | 114db | Decryption verification value O of application 114 | 645o | | |

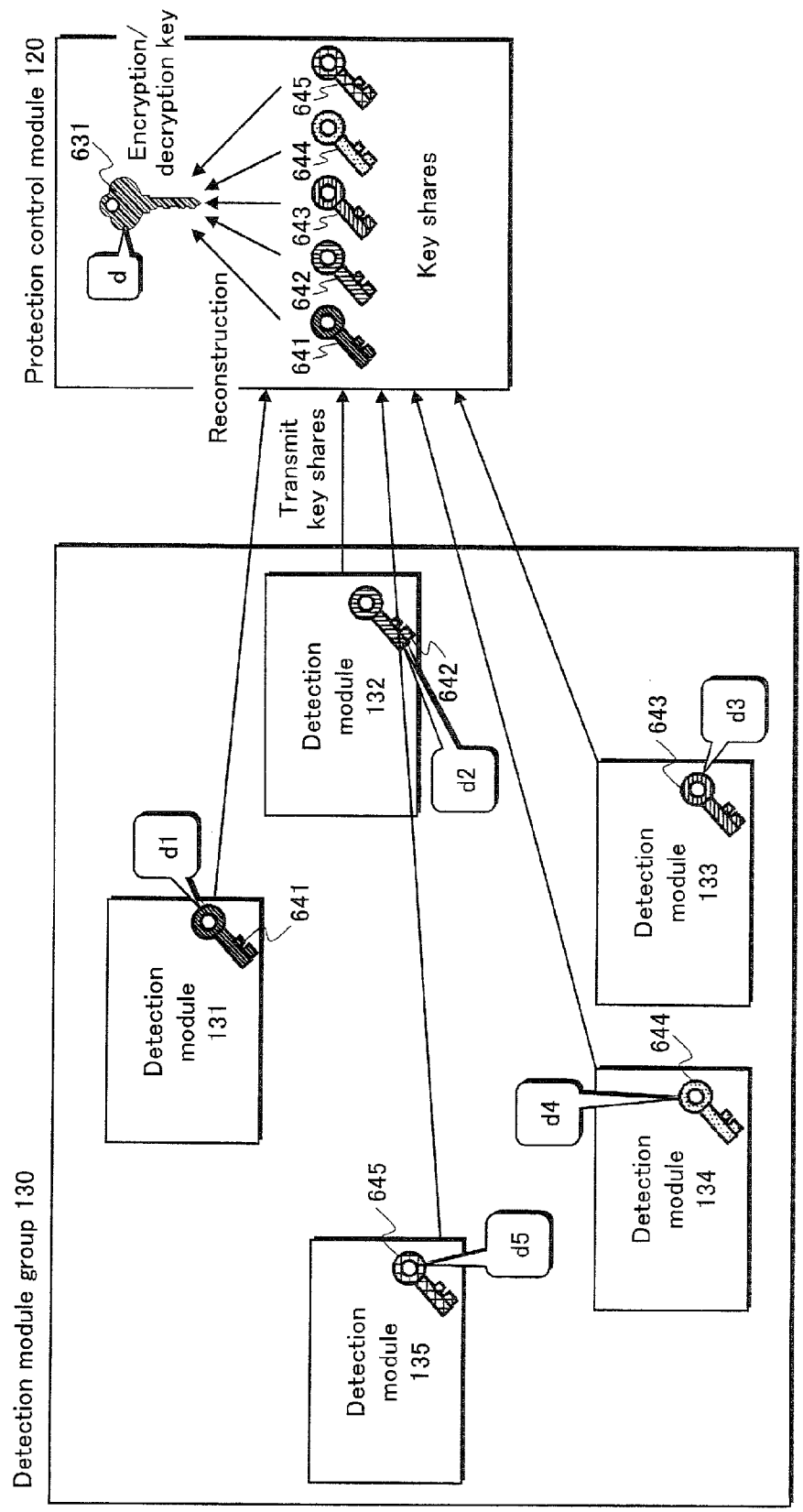

FIG.12

Verification data of first partial decryption process

| | Ref. info | ID info | Data | Verification value | Certificate |
|---|---|---|---|---|---|
| First partial decryption process data | 3 | 110 | Encrypted application of application 110 | Decryption verification value A of application 110 | Decryption process certificate |
| | | 111 | Encrypted application of application 111 | Decryption verification value B of application 111 | |
| | | 112 | Encrypted application of application 112 | Decryption verification value C of application 112 | |
| | | 113 | Encrypted application of application 113 | Decryption verification value D of application 113 | |
| | | 114 | Encrypted application of application 114 | Decryption verification value E of application 114 | |

FIG.13

Verification data of second partial decryption process

| | Ref. info | ID info | Data | Verification value | Certificate |
|---|---|---|---|---|---|
| Second partial decryption process data | 3 | 110 | 1st intermediate application of application 110 | Decryption verification value F of application 110 | Decryption process certificate |
| | | 111 | 1st intermediate application of application 111 | Decryption verification value G of application 111 | |
| | | 112 | 1st intermediate application of application 112 | Decryption verification value H of application 112 | |
| | | 113 | 1st intermediate application of application 113 | Decryption verification value I of application 113 | |
| | | 114 | 1st intermediate application of application 114 | Decryption verification value J of application 114 | |

FIG.14

Verification data of third partial decryption process — 343, 643

| | Ref. info | ID info | Data | Verification value | Certificate |
|---|---|---|---|---|---|
| Third partial decryption process data | 3 | 110 | 2nd intermediate application of application 110 | Decryption verification value K of application 110 | Decryption process certificate |
| | | 111 | 2nd intermediate application of application 111 | Decryption verification value L of application 111 | |
| | | 112 | 2nd intermediate application of application 112 | Decryption verification value M of application 112 | |
| | | 113 | 2nd intermediate application of application 113 | Decryption verification value N of application 113 | |
| | | 114 | 2nd intermediate application of application 114 | Decryption verification value O of application 114 | |

TAMPERING MONITORING SYSTEM, MANAGEMENT DEVICE, PROTECTION CONTROL MODULE, AND DETECTION MODULE

TECHNICAL FIELD

The present invention relates to a technique for monitoring tampering in modules or the like that operate inside devices such as information processing devices.

BACKGROUND ART

In recent years, attempts have been made to develop techniques for protecting application programs by means of software in order to prevent the application programs, which include confidential data, from being analyzed in an unauthorized manner by a malicious third party (hereinafter "attacker") (Patent Literatures 1 and 2).

Examples of such techniques for protecting application programs by means of software include tampering verification and decryption load function. The tampering verification is performed with use of hash values of the application programs. The decryption load function is a function to encrypt the application programs and store the encrypted application programs when the application programs are not used, and to decrypt the encrypted application programs and load the application programs into a memory only when the application programs are used.

However, even when such techniques are used, if the very software used to protect the application programs (hereinafter "protection control module") is tampered with by an attacker, the application programs are subjected to an attack by the attacker. To counter such an attack, tampering detection of the protection control module is performed with use of a detection module (Patent Literatures 2 and 3).

The detection module detects tampering of the protection control module by reading all data constituting the protection control module and calculating a MAC (Message Authentication Code) value.

CITATION LIST

Patent Literature

Patent Literature 1: International Publication No. WO 2008/099682
Patent Literature 2: International Publication No. WO 2009/118800
Patent Literature 3: International Publication No. WO 2010/092832
Patent Literature 4: Japanese Patent No. 2948814 Specification

Non-Patent Literature

Non-Patent Literature 1: Tatsuaki OKAMOTO and Hirosuke YAMAMOTO, "Gendai Ango" (Modern Encryption), Sangyo Tosho, 1997.

SUMMARY OF INVENTION

Technical Problem

However, if the detection module that performs tampering detection of the protection control module is tampered with, a decryption key of application programs, which is included in the protection control module, may be maliciously acquired by the tampered detection module. In such a case, the decryption key which has been maliciously acquired may be used to decrypt encrypted application programs, and unauthorized application programs may be installed in an information processing device. As a result, the unauthorized application programs may leak user's personal information, contents, or the like.

In order to solve the above problem, the present invention aims to provide a tampering monitoring system, a management device, a protection control module, a detection module, an integrated circuit, a method, a computer program, and a recording medium having stored thereon a computer program that each reduce the possibility of a decryption key of an application program being acquired from the protection control module in an unauthorized manner.

Solution to Problem

In order to achieve the above aim, the present invention provides a tampering monitoring system including: a protection control module for protecting an application program; a plurality of detection modules for monitoring tampering of the protection control module; and a management device, the management device comprising: a key share generation unit configured to generate a plurality of key shares by decomposing a decryption key, the decryption key being for decrypting an encrypted application program generated as a result of encryption of the application program; and an output unit configured to output each of the key shares to a different one of the detection modules, the detection modules configured to acquire and store therein the key shares, and the protection control module comprising: an acquisition unit configured to acquire the key shares from the detection modules; a reconstruction unit configured to reconstruct the decryption key by composing the key shares acquired by the acquisition unit; a decryption unit configured to decrypt the encrypted application program, with use of the decryption key reconstructed by the reconstruction unit; and a deletion unit configured to delete the decryption key, after the decryption by the decryption unit is completed.

Advantageous Effects of Invention

According to the above structure, the protection control module does not always hold the decryption key, but holds the decryption key only during decryption of the encrypted application program. Then, upon completion of the decryption, the protection control module deletes the decryption key. This reduces the possibility of a malicious leak of the decryption key from the protection control module.

As a result, security of the tampering monitoring system is increased.

BRIEF DESCRIPTION OF DRAWINGS

FIG. 5 shows an example of the data structure of verification base data 640.

FIG. 11 is a schematic diagram showing collection of the key shares from the detection module group 130 and reconstruction of the encryption/decryption key 631.

FIG. 12 shows an example of the data structure of verification data 341 of the first partial decryption process.

FIG. 13 shows an example of the data structure of verification data 342 of the second partial decryption process.

FIG. 14 shows an example of the data structure of verification data 343 of the third partial decryption process.

FIG. 23 is a block diagram showing the structure of a protection control module 120a.

FIG. 25 is a block diagram showing the structure of a detection module 131a.

FIG. 26 is a sequence diagram showing operations of initial setting in the detection system 10a.

FIG. 27 is a flowchart showing operations of detection in the detection system 10a.

FIG. 28 is a sequence diagram showing operations of detection on the protection control module 120a.

FIG. 29 is a flowchart showing operations of decryption of an encrypted application in the detection system 10a.

DESCRIPTION OF EMBODIMENTS

Figure 1:
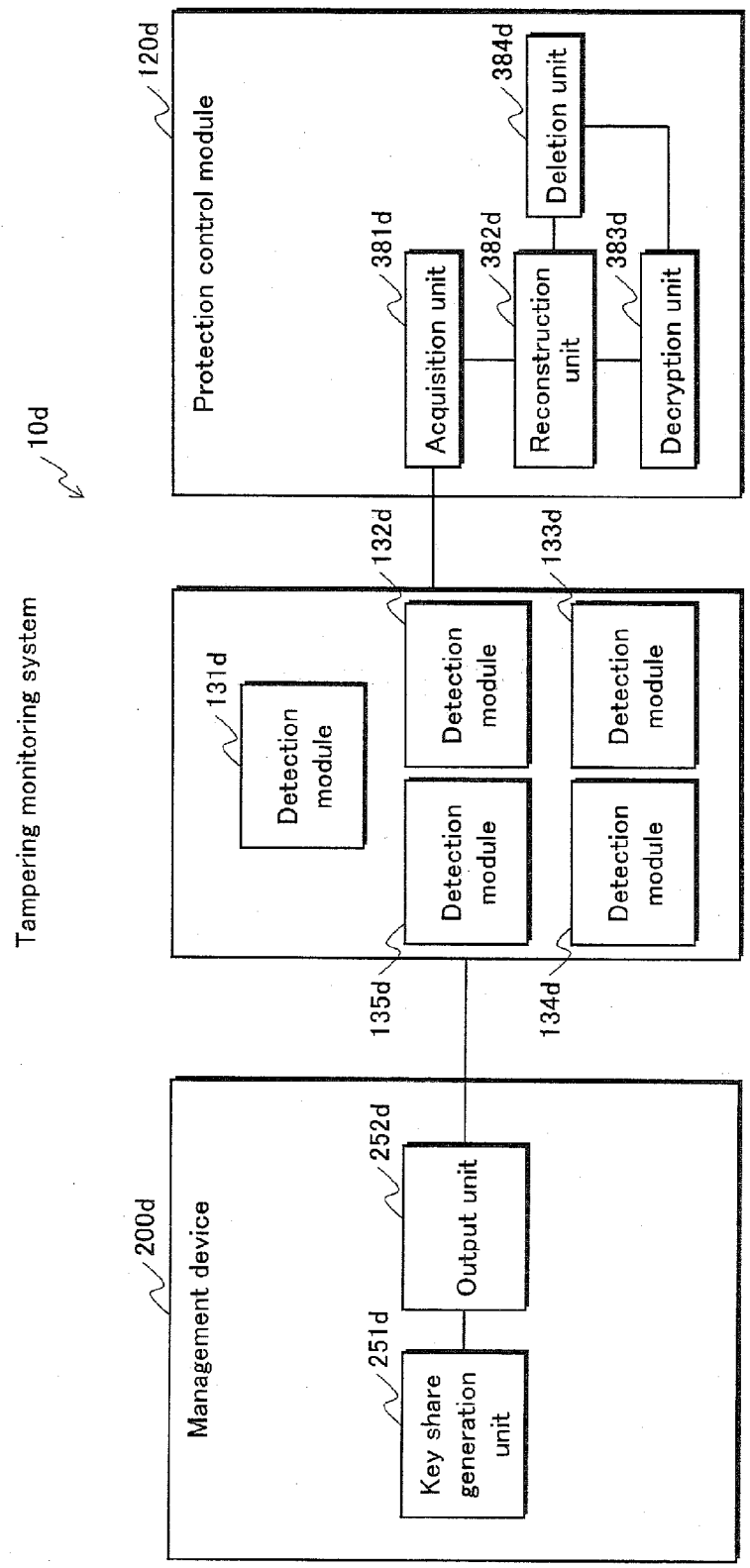
FIG. 1 shows the overall structure of a tampering monitoring system 10d according to Embodiment 1 of the present invention.

One aspect of the present invention is a tampering monitoring system including: a protection control module for protecting an application program; a plurality of detection modules for monitoring tampering of the protection control module; and a management device. The management device comprises: a key share generation unit configured to generate a plurality of key shares by decomposing a decryption key, the decryption key being for decrypting an encrypted application program generated as a result of encryption of the application program; and an output unit configured to output each of the key shares to a different one of the detection modules. The detection modules are configured to acquire and store therein the key shares. The protection control module comprises: an acquisition unit configured to acquire the key shares from the detection modules; a reconstruction unit configured to reconstruct the decryption key by composing the key shares acquired by the acquisition unit; a decryption unit configured to decrypt the encrypted application program, with use of the decryption key reconstructed by the reconstruction unit; and a deletion unit configured to delete the decryption key, after the decryption by the decryption unit is completed.

The management device may further comprise a verification data generation unit configured to perform decryption processing made up of a plurality of partial decryption processes on an encrypted application program generated as a result of encryption of the application program in a non-tampered state and, for each partial decryption process, to perform a one-way conversion on both input data for the partial decryption process and output data resulting from the partial decryption process to generate a decryption verification value, and generate verification data including the input data and the decryption verification value, the output unit may further be configured to output the verification data to the protection control module, the decryption unit may perform the decryption processing made up of the plurality of partial decryption processes on the encrypted application program, the protection control module may further comprise a second output unit configured to output, for each partial decryption process by the decryption unit, the verification data and the output data resulting from the partial decryption process to a corresponding one of the detection modules, and each of the detection modules corresponding to the partial decryption processes may comprise: a reception unit configured to receive the output data and the verification data; and a verification unit configured to perform verification using the output data and the verification data, and to output a result of the verification indicating a verification failure if the verification fails.

The verification unit may perform the verification by (i) performing the same conversion as the one-way conversion on both the input data included in the verification data and the output data to generate a second verification value and (ii) judging whether the decryption verification value in the verification data matches the second verification value, and may output the result of the verification indicating the verification failure if the values do not match.

The protection control module may further protect at least one other application program, the management device may further comprise a certificate generation unit configured to generate, for each partial decryption process, a decryption verification value of the other application program, and generate, for each partial decryption process, a certificate by digitally signing the decryption verification values generated for the application program and the other application program. For each partial decryption process, the verification data generation unit may generate the verification data by further including therein the decryption verification value of the other application program and the certificate, both generated for the partial decryption process, the output unit may output the verification data including the certificate to the protection control module, the second output unit may output the verification data including the certificate to the corresponding detection module, the reception unit may receive the verification data including the certificate, and the verification unit may perform the verification by further using the certificate included in the verification data, for each partial decryption process.

The verification unit may perform the same conversion as the one-way conversion on both the input data included in the verification data and the output data to generate a second verification value, and may perform the verification by using the decryption verification value of the other application program included in the verification data, the second verification value, and the certificate.

The plurality of partial decryption processes may correspond one-to-one to two or more of the plurality of detection modules, and the second output unit may output the verification data and the output data resulting from each partial decryption process to the detection module corresponding to the partial decryption process.

Each of the detection modules corresponding to the partial decryption processes may further comprise a transmission unit configured to transmit identification information identifying the partial decryption process corresponding to the detection module, to another one or more of the detection modules, the reception unit of each detection module may further be configured to receive, from another one or more of the detection modules, one or more pieces of identification information identifying the partial decryption processes corresponding to the other one or more detection modules, the verification unit of each detection module may further be configured to perform verification on duplication of the one or more pieces of identification information and the identification information identifying the partial decryption process corresponding to the detection module, and on the comprehensiveness of the one or more pieces of identification information and the identification information identifying the partial decryption process corresponding to the detection module, with respect to all pieces of identification information corresponding to the plurality of partial decryption processes. The verification unit of each detection module may output a result of verification indicating a verification failure, if any duplicates exist among the one or more pieces of identification information and the identification information identifying the partial decryption process corresponding to the detection module, or if the one or more pieces of identification information and the identification information identifying the partial decryption process corresponding to the detection module do not completely cover all pieces of identification information corresponding to the plurality of partial decryption processes.

The protection control module may have attached thereto a tampering detection certificate, the tampering detection certificate being generated by digitally signing the protection control module in a state where the protection control module has not been tampered with, and each of the detection modules may comprise a verification unit configured to perform tampering detection on the protection control module using the tampering detection certificate, after the decryption is completed and the decryption key is deleted.

The key share generation unit may generate the plurality of key shares such that the decryption key is obtained by addition of the key shares, and the reconstruction unit may reconstruct the decryption key by adding the key shares.

The key share generation unit may generate the plurality of key shares from the decryption key, with use of a secret sharing scheme, and the reconstruction unit may reconstruct the decryption key from the plurality of key shares, with use of the secret sharing scheme.

The protection control module may further comprise a second output unit configured to output the encrypted application program to each of the detection modules, each detection module may comprise: a second acquisition unit configured to acquire the encrypted application program from the protection control module; a second decryption unit configured to partially decrypt the encrypted application program with use of the key share stored therein to generate a partially decrypted text; and a third output unit configured to output the partially decrypted text to the protection control module, the acquisition unit may acquire the partially decrypted texts from the detection modules, and the decryption unit may decrypt the encrypted application program with use of the partially decrypted texts acquired by the acquisition unit.

The encrypted application program may have been generated according to an RSA cryptosystem, the second decryption unit may generate the partially decrypted text by raising the encrypted application program by the power of a value of the key share, and the decryption unit may decrypt the encrypted application program by multiplying values of the partially decrypted texts.

The protection control module may further comprise a selection unit configured to select a plurality of detection modules from among all the detection modules, and the second output unit may output the encrypted application program to each of the detection modules selected by the selection unit.

The protection control module may have attached thereto a tampering detection certificate, the tampering detection certificate being generated by digitally signing the protection control module in a non-tampered state, and each of the detection modules may comprise a verification unit configured to perform tampering detection on the protection control module using the tampering detection certificate.

One of the detection modules may have been revoked, the key share generation unit may further be configured to generate a plurality of regenerated key shares by decomposing the key share allocated to the revoked detection module, the output unit may further be configured to output each of the plurality of regenerated key shares to a different one of the detection modules that have not been revoked, and each of the unrevoked detection modules may comprise a key share update unit configured to acquire the regenerated key share, and update the key share stored therein with use of the regenerated key share to generate a new key share.

The key share generation unit may generate the plurality of regenerated key shares such that the key share from which the regenerated key shares is generated is obtained by addition of the regenerated key shares, and the key share update unit may generate the new key share by adding the regenerated key share to the key share stored therein.

The plurality of detection modules may be categorized into a first group and a second group, the key share generation unit may be further configured to generate a plurality of second key shares by decomposing the decryption key, the output unit may output each of the plurality of key shares to a different one of the plurality of detection modules that belong to the first group, and may output each of the plurality of second key shares to a different one of the plurality of detection modules that belong to the second group, each of the detection modules that belong to the first group may acquire and store therein the key share, each of the detection modules that belong to the second group may acquire and store therein the second key share, the acquisition unit may acquire either the key shares from the detection modules that belong to the first group or the second key shares from the detection modules that belong to the second group, and the reconstruction unit may reconstruct the decryption key either by composing the key shares acquired by the acquisition unit or by composing the second key shares acquired by the acquisition unit.

The protection control module and the plurality of detection modules may each be a computer program, and the application program, the protection control module, and the plurality of detection modules may be stored in an information processing device.

The output unit may output the plurality of key shares to the plurality of detection modules during initial setting of the information processing device.

The acquisition unit may acquire the key shares from the plurality of detection modules when the application program is executed in the information processing device.

One aspect of the present invention is a management device for managing: a protection control module for protecting an application program; and a plurality of detection modules for monitoring tampering of the protection control module. The management device comprises: a key share generation unit configured to generate a plurality of key shares by decomposing a decryption key, the decryption key being for decrypting an encrypted application program generated as a result of encryption of the application program; and an output unit configured to output each of the key shares to a different one of the detection modules.

The management device may further comprise a verification data generation unit configured to perform decryption processing made up of a plurality of partial decryption processes on an encrypted application program generated as a result of encryption of the application program in a non-tampered state and, for each partial decryption process, to perform a one-way conversion on both input data for the partial decryption process and output data resulting from the partial decryption process to generate a decryption verification value, and generate verification data including the input data and the decryption verification value, wherein the output unit is further configured to output the verification data to the protection control module.

The protection control module may further protect at least one other application program, the management device may further comprise a certificate generation unit configured to generate, for each partial decryption process, a decryption verification value of the other application program, and generate, for each partial decryption process, a certificate by digitally signing the decryption verification values generated for the application program and the other application program. For each partial decryption process, the verification data generation unit may generate the verification data by further including therein the decryption verification value of the other application program and the certificate, both generated for the partial decryption process, and the output unit may output the verification data including the certificate to the protection control module.

The key share generation unit may generate the plurality of key shares such that the decryption key is obtained by addition of the key shares.

The key share generation unit may generate the plurality of key shares from the decryption key, with use of a secret sharing scheme.

One of the detection modules may have been revoked, the key share generation unit may further be configured to generate a plurality of regenerated key shares by decomposing the key share allocated to the revoked detection module, and the output unit may further be configured to output each of the plurality of regenerated key shares to a different one of the detection modules that have not been revoked.

The key share generation unit may generate the plurality of regenerated key shares such that the key share from which the regenerated key shares are generated is obtained by addition of the regenerated key shares.

The plurality of detection modules may be categorized into a first group and a second group, the key share generation unit may further be configured to generate a plurality of second key shares by decomposing the decryption key, and the output unit may output each of the plurality of key shares to a different one of the plurality of detection modules that belong to the first group, and may output each of the plurality of second key shares to a different one of the plurality of detection modules that belong to the second group.

The protection control module and the plurality of detection modules may each be a computer program, the application program, the protection control module, and the plurality of detection modules may be stored in an information processing device, and the output unit may output the plurality of key shares to the plurality of detection modules during initial setting of the information processing device.

One aspect of the present invention is a protection control module for protecting an application program, tampering of the protection control module being monitored by a plurality of detection modules. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The detection modules acquire and store therein the key shares. The protection control module comprises: an acquisition unit configured to acquire the key shares from the detection modules; a reconstruction unit configured to reconstruct the decryption key by composing the key shares acquired by the acquisition unit; a decryption unit configured to decrypt the encrypted application program, with use of the decryption key reconstructed by the reconstruction unit; and a deletion unit configured to delete the decryption key, after the decryption by the decryption unit is completed.

The management device may further perform decryption processing made up of a plurality of partial decryption processes on an encrypted application program generated as a result of encryption of the application program in a non-tampered state and, for each partial decryption process, perform a one-way conversion on both input data for the partial decryption process and output data resulting from the partial decryption process to generate a decryption verification value, generate verification data including the input data and the decryption verification value, and output the verification data to the protection control module, the decryption unit may perform the decryption processing made up of the plurality of partial decryption processes on the encrypted application program, and the protection control module may further comprise a second output unit configured to output, for each partial decryption process by the decryption unit, the verification data and the output data resulting from the partial decryption process to a corresponding one of the detection modules.

The protection control module may further protect at least one other application program. For each partial decryption process, the management device may further generate a decryption verification value of the other application program and generate a certificate by digitally signing the decryption verification values generated for the application program and the other application program, generate the verification data by further including therein the decryption verification value of the other application program and the certificate, both generated for the partial decryption process, and output the verification data including the certificate to the protection control module, and the second output unit may output the verification data including the certificate to the corresponding detection module.

The plurality of partial decryption processes may correspond one-to-one to two or more of the plurality of detection modules, and the second output unit may output the verification data and the output data resulting from each partial decryption process to the detection module corresponding to the partial decryption process.

The management device may generate the plurality of key shares such that the decryption key is obtained by addition of the key shares, and the reconstruction unit may reconstruct the decryption key by adding the key shares.

The management device may generate the plurality of key shares from the decryption key, with use of a secret sharing scheme, and the reconstruction unit may reconstruct the decryption key from the plurality of key shares, with use of the secret sharing scheme.

The protection control module may further comprise a second output unit configured to output the encrypted application program to each of the detection modules, each detection module may acquire the encrypted application program from the protection control module, partially decrypt the encrypted application program with use of the key share stored therein to generate a partially decrypted text, and output the partially decrypted text to the protection control module, the acquisition unit may acquire the partially decrypted texts from the detection modules, and the decryption unit may decrypt the encrypted application program with use of the partially decrypted texts acquired by the acquisition unit.

The encrypted application program may have been generated according to an RSA cryptosystem, each detection module may generate the partially decrypted text by raising the encrypted application program by the power of a value of the key share, and the decryption unit may decrypt the encrypted application program by multiplying values of the partially decrypted texts.

The protection control module may further comprise a selection unit configured to select a plurality of detection modules from among all the detection modules, and the second output unit may output the encrypted application program to each of the detection modules selected by the selection unit.

The plurality of detection modules may be categorized into a first group and a second group, the management device may further generate a plurality of second key shares by decomposing the decryption key, output each of the plurality of key shares to a different one of the plurality of detection modules that belong to the first group, and output each of the plurality of second key shares to a different one of the plurality of detection modules that belong to the second group, each of the detection modules that belong to the first group may acquire and store therein the key share, each of the detection modules that belong to the second group may acquire and store therein the second key share, the acquisition unit may acquire either the key shares from the detection modules that belong to the first group or the second key shares from the detection modules that belong to the second group, and the reconstruction unit may reconstruct the decryption key either by composing the key shares acquired by the acquisition unit or by composing the second key shares acquired by the acquisition unit.

The protection control module and the plurality of detection modules may each be a computer program, and the application program, the protection control module, and the plurality of detection modules may be stored in an information processing device.

The acquisition unit may acquire the key shares from the plurality of detection modules when the application program is executed in the information processing device.

One aspect of the present invention is one of a plurality of detection modules for monitoring tampering of a protection control module that is for protecting an application program. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The detection module comprises: an acquisition unit configured to acquire the key share; a storage unit configured to store therein the key share; and an output unit configured to output the key share to the protection control module.

The management device may further perform decryption processing made up of a plurality of partial decryption processes on an encrypted application program generated as a result of encryption of the application program in a non-tampered state and, for each partial decryption process, perform a one-way conversion on both input data for the partial decryption process and output data resulting from the partial decryption process to generate a decryption verification value, generate verification data including the input data and the decryption verification value, and output the verification data to the protection control module. The protection control module may perform the decryption processing made up of the plurality of partial decryption processes on the encrypted application program and, for each partial decryption process, output the verification data and the output data resulting from the partial decryption process to a corresponding one of the detection modules. The detection module may further comprise: a reception unit configured to receive the output data and the verification data; and a verification unit configured to perform verification using the output data and the verification data, and to output a result of the verification indicating a verification failure if the verification fails.

The verification unit may perform the verification by (i) performing the same conversion as the one-way conversion on both the input data included in the verification data and the output data to generate a second verification value and (ii)

judging whether the decryption verification value in the verification data matches the second verification value, and may output the result of the verification indicating the verification failure if the values do not match.

The protection control module may further protect at least one other application program. For each partial decryption process, the management device may further generate a decryption verification value of the other application program and generate a certificate by digitally signing the decryption verification values generated for the application program and the other application program, generate the verification data by further including therein the decryption verification value of the other application program and the certificate, both generated for the partial decryption process, and output the verification data including the certificate to the protection control module. The protection control module may output the verification data including the certificate to the corresponding detection module. The reception unit may receive the verification data including the certificate, and the verification unit may perform the verification by further using the certificate included in the verification data, for each partial decryption process.

The verification unit may perform the same conversion as the one-way conversion on both the input data included in the verification data and the output data to generate a second verification value, and may perform the verification by using the decryption verification value of the other application program included in the verification data, the second verification value, and the certificate.

The plurality of partial decryption processes may correspond one-to-one to two or more of the plurality of detection modules. The protection control module may output the verification data and the output data resulting from each partial decryption process to the detection module corresponding to the partial decryption process. The detection module may further comprise a transmission unit configured to transmit identification information identifying the partial decryption process corresponding to the detection module, to another one or more of the detection modules. The reception unit may further be configured to receive, from another one or more of the detection modules, one or more pieces of identification information identifying the partial decryption processes corresponding to the other one or more detection modules. The verification unit may further be configured to perform verification on duplication of the one or more pieces of identification information and the identification information identifying the partial decryption process corresponding to the detection module, and on the comprehensiveness of the one or more pieces of identification information and the identification information identifying the partial decryption process corresponding to the detection module, with respect to all pieces of identification information corresponding to the plurality of partial decryption processes.

The verification unit may output a result of verification indicating a verification failure, if any duplicates exist among the one or more pieces of identification information and the identification information identifying the partial decryption process corresponding to the detection module, or if the one or more pieces of identification information and the identification information identifying the partial decryption process corresponding to the detection module do not completely cover all pieces of identification information corresponding to the plurality of partial decryption processes.

The protection control module may have attached thereto a tampering detection certificate, the tampering detection certificate being generated by digitally signing the protection control module in a state where the protection control module has not been tampered with. The detection module may further comprise a verification unit configured to perform tampering detection on the protection control module using the tampering detection certificate, after the decryption is completed and the decryption key is deleted.

The protection control module may further output the encrypted application program to the detection module, The detection module may further comprise: a second acquisition unit configured to acquire the encrypted application program from the protection control module; a second decryption unit configured to partially decrypt the encrypted application program with use of the key share stored therein to generate a partially decrypted text; and a third output unit configured to output the partially decrypted text to the protection control module.

The encrypted application program may have been generated according to an RSA cryptosystem, and the second decryption unit may generate the partially decrypted text by raising the encrypted application program by the power of a value of the key share.

The protection control module may have attached thereto a tampering detection certificate, the tampering detection certificate being generated by digitally signing the protection control module in a non-tampered state. The detection module may further comprise a verification unit configured to perform tampering detection on the protection control module using the tampering detection certificate.

One of the detection modules may have been revoked. The management device may further generate a plurality of regenerated key shares by decomposing the key share allocated to the revoked detection module, and output each of the plurality of regenerated key shares to a different one of the detection modules that have not been revoked. The detection module, which has not been revoked, may further comprise a key share update unit configured to acquire the regenerated key share, and update the key share stored therein with use of the regenerated key share to generate a new key share.

The management device may generate the plurality of regenerated key shares such that the key share from which the regenerated key shares are generated is obtained by addition of the regenerated key shares. The key share update unit may generate the new key share by adding the regenerated key share to the key share stored therein.

The protection control module and the plurality of detection modules may each be a computer program. The application program, the protection control module, and the plurality of detection modules may be stored in an information processing device.

One aspect of the present invention is a control method used in a management device for managing: a protection control module for protecting an application program; and a plurality of detection modules for monitoring tampering of the protection control module, the control method comprising the steps of: generating a plurality of key shares by decomposing a decryption key, the decryption key being for decrypting an encrypted application program generated as a result of encryption of the application program; and outputting each of the key shares to a different one of the detection modules.

One aspect of the present invention is a computer-readable recording medium storing thereon a control computer program used in a management device for managing: a protection control module for protecting an application program; and a plurality of detection modules for monitoring tampering of the protection control module, the management device being a computer, the control computer program causing the management device to perform the steps of: generating a plurality of key shares by decomposing a decryption key, the decryption key being for decrypting an encrypted application program generated as a result of encryption of the application program; and outputting each of the key shares to a different one of the detection modules.

One aspect of the present invention is a control computer program used in a management device for managing: a protection control module for protecting an application program; and a plurality of detection modules for monitoring tampering of the protection control module, the management device being a computer, the control computer program causing the management device to perform the steps of: generating a plurality of key shares by decomposing a decryption key, the decryption key being for decrypting an encrypted application program generated as a result of encryption of the application program; and outputting each of the key shares to a different one of the detection modules.

One aspect of the present invention is an integrated circuit constituting a management device for managing: a protection control module for protecting an application program; and a plurality of detection modules for monitoring tampering of the protection control module, the integrated circuit comprising: a key share generation unit configured to generate a plurality of key shares by decomposing a decryption key, the decryption key being for decrypting an encrypted application program generated as a result of encryption of the application program; and an output unit configured to output each of the key shares to a different one of the detection modules.

One aspect of the present invention is a control method used in a protection control module for protecting an application program, tampering of the protection control module being monitored by a plurality of detection modules. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The detection modules acquire and store therein the key shares. The control method comprises the steps of: acquiring the key shares from the detection modules; reconstructing the decryption key by composing the key shares acquired in the acquiring step; decrypting the encrypted application program, with use of the decryption key reconstructed by the reconstructing step; and deleting the decryption key, after the decryption in the decrypting step is completed.

One aspect of the present invention is a computer-readable recording medium storing thereon a control computer program used in a protection control module for protecting an application program, tampering of the protection control module being monitored by a plurality of detection modules. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The detection modules acquire and store therein the key shares. The control computer program causes the protection control module, which is a computer, to perform the steps of: acquiring the key shares from the detection modules; reconstructing the decryption key by composing the key shares acquired in the acquiring step; decrypting the encrypted application program, with use of the decryption key reconstructed by the reconstructing step; and deleting the decryption key, after the decryption in the decrypting step is completed.

One aspect of the present invention is a control computer program used in a protection control module for protecting an application program, tampering of the protection control module being monitored by a plurality of detection modules. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The detection modules acquire and store therein the key shares. The control computer program causes the protection control module, which is a computer, to perform the steps of: acquiring the key shares from the detection modules; reconstructing the decryption key by composing the key shares acquired in the acquiring step; decrypting the encrypted application program, with use of the decryption key reconstructed by the reconstructing step; and deleting the decryption key, after the decryption in the decrypting step is completed.

One aspect of the present invention is an integrated circuit constituting a protection control module for protecting an application program, tampering of the protection control module being monitored by a plurality of detection modules. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The detection modules acquire and store therein the key shares. The integrated circuit comprises: an acquisition unit configured to acquire the key shares from the detection modules; a reconstruction unit configured to reconstruct the decryption key by composing the key shares acquired by the acquisition unit; a decryption unit configured to decrypt the encrypted application program, with use of the decryption key reconstructed by the reconstruction unit; and a deletion unit configured to delete the decryption key, after the decryption by the decryption unit is completed.

One aspect of the present invention is a method used in one of a plurality of detection modules for monitoring tampering of a protection control module that is for protecting an application program. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The method comprises the steps of: acquiring the key share; storing the key share; and outputting the key share to the protection control module.

One aspect of the present invention is a computer-readable recording medium storing thereon a computer program used in one of a plurality of detection modules for monitoring tampering of a protection control module that is for protecting an application program. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The computer program causes the detection module, which is a computer, to perform the steps of: acquiring the key share; storing the key share; and outputting the key share to the protection control module.

One aspect of the present invention is a computer program used in one of a plurality of detection modules for monitoring tampering of a protection control module that is for protecting an application program. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The computer program causes the detection module, which is a computer, to perform the steps of: acquiring the key share; storing the key share; and outputting the key share to the protection control module.

One aspect of the present invention is an integrated circuit constituting one of a plurality of detection modules for monitoring tampering of a protection control module that is for protecting an application program. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The integrated circuit comprises: an acquisition unit configured to acquire the key share; a storage unit configured to store therein the key share; and an output unit configured to output the key share to the protection control module.

1. Embodiment 1

The following describes a tampering monitoring system 10d according to Embodiment 1 of the present invention.

(1) Structure of Tampering Monitoring System 10d

As shown in FIG. 1, a tampering monitoring system 10d includes a protection control module 120d, a plurality of detection modules 131d, 132d, . . . , 135d, and a management device 200d.

The protection control module 120d protects an application program. The detection modules 131d, 132d, . . . , 135d each monitor tampering of the protection control module 120d.

As shown in FIG. 1, the management device 200d comprises a key share generation unit 251d and an output unit 252d.

The key share generation unit 251d generates a plurality of key shares by decomposing a decryption key, the decryption key being a key for decrypting an encrypted application program generated as a result of encryption of the application program.

The output unit 252d outputs each of the key shares to a different one of the detection modules.

The detection modules 131d, 132d, . . . , 135d acquire and store therein the key shares.

As shown in FIG. 1, the protection control module 120d comprises an acquisition unit 381d, a reconstruction unit 382d, a decryption unit 383d, and a deletion unit 384d.

The acquisition unit 381d acquires the key shares from the plurality of detection modules 131d, 132d, . . . , 135d.

The reconstruction unit 382d reconstructs the decryption key by composing the key shares acquired by the acquisition unit 381d.

The decryption unit 383d decrypts the encrypted application program, with use of the decryption key reconstructed by the reconstruction unit 382d.

The deletion unit 384d deletes the decryption key, after the decryption by the decryption unit 383d is completed.

According to this structure, the protection control module 120d does not always hold the decryption key, but holds the decryption key only during decryption of the encrypted application program. Then, upon completion of the decryption, the protection control module deletes the decryption key. This reduces the possibility of a malicious leak of the decryption key from the protection control module 120d.

As a result, security of the tampering monitoring system 10d is increased.

(2) The management device 200d may further comprise a verification data generation unit (not shown). The verification data generation unit performs decryption processing made up of a plurality of partial decryption processes on an encrypted application program generated as a result of encryption of the application program in a non-tampered state and, for each partial decryption process, performs a one-way conversion on both input data for the partial decryption process and output data resulting from the partial decryption process to generate a decryption verification value, and generates verification data including the input data and the decryption verification value.

The output unit 252d further outputs the verification data to the protection control module 120d.

The decryption unit 383d performs the decryption processing made up of the plurality of partial decryption processes on the encrypted application program.

The protection control module 120d further comprises a second output unit (not shown). The second output unit outputs, for each partial decryption process by the decryption unit 383d, the verification data and the output data resulting from the partial decryption process to a corresponding one of the detection modules (e.g., detection module 131d).

Each of the detection modules (e.g., detection module 131d) corresponding to the partial decryption processes comprises: a reception unit (not shown) and a verification unit (not shown).

The reception unit receives the output data and the verification data.

The verification unit performs verification using the output data and the verification data, and outputs a result of the verification indicating a verification failure if the verification fails.

With this structure, each of the detection modules corresponding to the partial decryption processes can perform, with use of the output data and the verification data, tampering verification regarding the partial decryption processes of the decryption processing performed by the protection control module 120d.

(3) The verification unit may perform the verification by (i) performing the same conversion as the one-way conversion on both the input data included in the verification data and the output data to generate a second verification value and (ii) judging whether the decryption verification value in the verification data matches the second verification value, and may output the result of the verification indicating the verification failure if the values do not match.

(4) The protection control module 120d may further protect at least one other application program.

The management device 200d may further comprise a certificate generation unit (not shown).

The certificate generation unit generates, for each partial decryption process, a decryption verification value of the other application program, and generates, for each partial decryption process, a certificate by digitally signing the decryption verification values generated for the application program and the other application program.

For each partial decryption process, the verification data generation unit generates the verification data by further including therein the decryption verification value of the other application program and the certificate, both generated for the partial decryption process.

The output unit 252d outputs the verification data including the certificate to the protection control module 120d.

The second output unit outputs the verification data including the certificate to the corresponding detection module (e.g., detection module 131d).

The reception unit receives the verification data including the certificate.

The verification unit performs the verification by further using the certificate included in the verification data, for each partial decryption process.

With this structure, in a case where a plurality of applications are in operation, each of the detection modules corresponding to the partial decryption processes can perform, with use of the output data and the verification data, tampering verification regarding the partial decryption processes of the decryption processing performed by the protection control module 120d.

(5) The verification unit may perform the same conversion as the one-way conversion on both the input data included in the verification data and the output data to generate a second verification value, and may perform the verification by using the decryption verification value of the other application program included in the verification data, the second verification value, and the certificate.

(6) The plurality of partial decryption processes may correspond one-to-one to two or more of the plurality of detection modules.

The second output unit may output the verification data and the output data resulting from each partial decryption process to the detection module corresponding to the partial decryption process.

With this structure, each of the two or more of the plurality of detection modules performs verification on the corresponding partial decryption process. Accordingly, if a detection module not corresponding to any of the partial decryption processes has been tampered with, the tampering does not affect the tampering verification.

(7) Each of the detection modules corresponding to the partial decryption processes may further comprise a transmission unit. The transmission unit of each detection module transmits identification information identifying the partial decryption process corresponding to the detection module, to another one or more of the detection modules.

The reception unit of each detection module further receives, from another one or more of the detection modules, one or more pieces of identification information identifying the partial decryption processes corresponding to the other one or more detection modules.

The verification unit of each detection module further performs verification on duplication of the one or more pieces of identification information and the identification information identifying the partial decryption process corresponding to the detection module, and on the comprehensiveness of the one or more pieces of identification information and the identification information identifying the partial decryption process corresponding to the detection module, with respect to all pieces of identification information corresponding to the plurality of partial decryption processes.

With this structure, each detection module performs verification on the duplication and on the comprehensiveness. Accordingly, even if a plurality of detection modules are tampered with so as to verify the same partial decryption process, or if a detection module is tampered with so as not to verify the partial decryption process corresponding thereto, such tampering is detected.

(8) The verification unit of each detection module may output a result of verification indicating a verification failure, if any duplicates exist among the one or more pieces of identification information and the identification information identifying the partial decryption process corresponding to the detection module, or if the one or more pieces of identification information and the identification information identifying the partial decryption process corresponding to the detection module do not completely cover all pieces of identification information corresponding to the plurality of partial decryption processes.

(9) The protection control module 120d may have attached thereto a tampering detection certificate, the tampering detection certificate being generated by digitally signing the protection control module in a state where the protection control module has not been tampered with.

Each of the detection modules may comprise a verification unit. The verification unit of each detection module performs tampering detection on the protection control module using the tampering detection certificate, after the decryption is completed and the decryption key is deleted.

This structure allows detection using the tampering detection certificate.

(10) The key share generation unit 251d may generate the plurality of key shares such that the decryption key is obtained by addition of the key shares.

The reconstruction unit 382d reconstructs the decryption key by adding the key shares.

This structure allows reconstruction of the original decryption key.

(11) The key share generation unit 251d may generate the plurality of key shares from the decryption key, with use of a secret sharing scheme.

The reconstruction unit 382d reconstructs the decryption key from the plurality of key shares, with use of the secret sharing scheme.

This structure allows reconstruction of the original decryption key.

(12) The protection control module 120d may further comprise a second output unit that outputs the encrypted application program to each of the detection modules.

Each detection module comprises a second acquisition unit, a second decryption unit, and a third output unit.

The second acquisition unit acquires the encrypted application program from the protection control module 120d.

The second decryption unit partially decrypts the encrypted application program with use of the key share stored therein to generate a partially decrypted text.

The third output unit outputs the partially decrypted text to the protection control module 120d.

The acquisition unit 381d acquires the partially decrypted texts from the detection modules.

The decryption unit 383d decrypts the encrypted application program with use of the partially decrypted texts acquired by the acquisition unit.

According to this structure, the protection control module 120d does not always hold the decryption key. This reduces the possibility of a malicious leak of the decryption key from the protection control module 120d.

(13) The encrypted application program may have been generated according to an RSA cryptosystem.

The second decryption unit generates the partially decrypted text by raising the encrypted application program by the power of a value of the key share.

The decryption unit 383d decrypts the encrypted application program by multiplying values of the partially decrypted texts.

This structure allows decryption of the encrypted application program.

(14) The protection control module 120d may further comprise a selection unit that selects a plurality of detection modules from among all the detection modules.

The second output unit outputs the encrypted application program to each of the detection modules selected by the selection unit.

With this structure, the selected detection modules partially decrypt the encrypted application program. Accordingly, even if an unselected detection module has been tampered with, the tampering does not affect the verification.

(15) The protection control module 120d may have attached thereto a tampering detection certificate, the tampering detection certificate being generated by digitally signing the protection control module in a non-tampered state.

Each of the detection modules comprises a verification unit that performs tampering detection on the protection control module using the tampering detection certificate.

This structure allows detection using the tampering detection certificate.

(16) One of the detection modules may have been revoked.

The key share generation unit 251d further generates a plurality of regenerated key shares by decomposing the key share allocated to the revoked detection module.

The output unit 252d further outputs each of the plurality of regenerated key shares to a different one of the detection modules that have not been revoked.

Each of the unrevoked detection modules may comprise a key share update unit that acquires the regenerated key share, and updates the key share stored therein with use of the regenerated key share to generate a new key share.

With this structure, even if one of the detection modules has been revoked, the protection control module can acquire a new key share from the unrevoked detection modules to reconstruct the decryption key.

(17) The key share generation unit 251d may generate the plurality of regenerated key shares such that the key share from which the regenerated key shares is generated is obtained by addition of the regenerated key shares.

The key share update unit generates the new key share by adding the regenerated key share to the key share stored therein.

(18) The plurality of detection modules may be categorized into a first group and a second group.

The key share generation unit 251d further generates a plurality of second key shares by decomposing the decryption key.

The output unit 252d outputs each of the plurality of key shares to a different one of the plurality of detection modules that belong to the first group, and outputs each of the plurality of second key shares to a different one of the plurality of detection modules that belong to the second group.

Each of the detection modules that belong to the first group acquires and stores therein the key share.

Each of the detection modules that belong to the second group acquires and stores therein the second key share.

The acquisition unit 381d acquires either the key shares from the detection modules that belong to the first group or the second key shares from the detection modules that belong to the second group.

The reconstruction unit 382d reconstructs the decryption key either by composing the key shares acquired by the acquisition unit or by composing the second key shares acquired by the acquisition unit.

With the above structure, even if any of the detection modules that belong to the first group has been tampered with, verification can be performed with use of the detection modules that belong to the second group. Also, even if any of the detection modules that belong to the second group has been tampered with, verification can be performed with use of the detection modules that belong to the first group.

(19) The protection control module 120d and the plurality of detection modules 131d, 132d, . . . , 135d may each be a computer program.

The application program, the protection control module 120d, and the plurality of detection modules 131d, 132d, . . . , 135d are stored in an information processing device.

(20) The output unit 252d may output the plurality of key shares to the plurality of detection modules during initial setting of the information processing device.

(21) The acquisition unit 381d may acquire the key shares from the plurality of detection modules 131d, 132d, . . . , 135d when the application program is executed in the information processing device.

(22) A plurality of key shares may be generated as a result of a decryption key being decomposed by the management device 200d, the decryption key being for decrypting an encrypted application program generated as a result of encryption of the application program. Each of the key shares thus generated may be output by the management device 200d to a different one of the detection modules 131d, 132d, . . . , 135d. The detection modules 131d, 132d, . . . , 135d monitor tampering of the protection control module 120d that is for protecting an application program.

One of the detection modules 131d, 132d, . . . , 135d may comprise an acquisition unit, a storage unit, and an output unit.

The acquisition unit acquires the key share.

The storage unit stores therein the key share.

The output unit outputs the key share to the protection control module 120d.

2. Embodiment 2

The following describes a detection system 10 according to Embodiment 2 of the present invention.

2.1 Structure of Detection System 10

Figure 2:
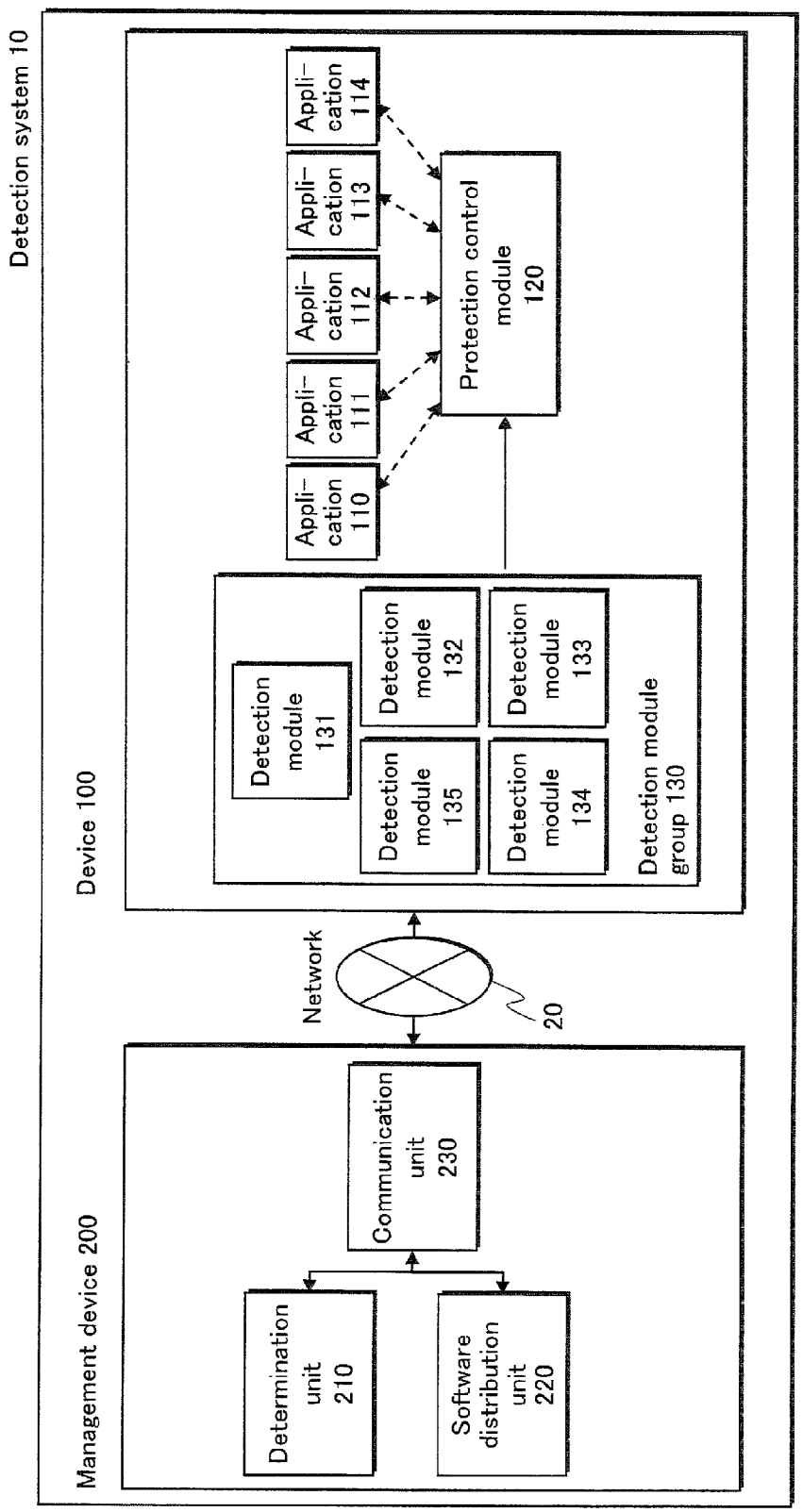
FIG. 2 shows the overall structure of a detection system 10 according to Embodiment 2 of the present invention.

As shown in FIG. 2, the detection system 10 is composed of an apparatus 100 and a management device 200. The apparatus 100 and the management device 200 are connected to each other via a network 20 represented by the Internet.

The device 100 is an information processing device for providing the user with various services. For example, the device 100 accesses a content delivery server device (not shown) for purchasing of music, video, or other content via the network 20, and plays back content purchased by the user. Also, the device 100 accesses a server device of a financial institution (not shown) via the network 20, and performs Internet banking (balance inquiries, transfers, etc).

Examples of the device 100 include a PC (personal computer), a mobile telephone, a PDA (personal digital assistant), a digital broadcast reception device, a DVD (Digital Versatile Disc) player, a BD (Blu-ray Disc) player, and a content recording device.

The device 100 has application programs installed therein, and these applications are executed in the device 100. Also, the device 100 has a protection control module 120 and a plurality of detection modules 131, 132, . . . , 135 installed therein. The protection control module 120 and the plurality of detection modules 131, 132, . . . , 135 are each a computer program. The protection control module 120 protects the application programs. Also, the plurality of detection modules 131, 132, . . . , 135 each monitor tampering of the protection control module 120.

The management device 200 manages the protection control module 120 and the plurality of detection modules 131, 132, . . . , 135.

2.2 Structure of Management Device 200

The management device 200 generates and outputs verification base data to the device 100. The verification base data is data necessary for verifying whether the protection control module 120 is correctly operating.

As shown in FIG. 2, the management device 200 is composed of a determination unit 210, a software distribution unit 220, and a communication unit 230.

Specifically, the management device 200 is a computer system including a CPU (Central Processing Unit), a ROM (Read Only Memory), a RAM (Random Access Memory), a hard disk unit, and an NIC (Network Interface Card). Either the ROM or the hard disk unit stores therein a control computer program for controlling operations of the management device 200. The determination unit 210 and the software distribution unit 220 of the management device 200 achieve their functions when the CPU operates in accordance with the control computer program. The communication unit 230 achieves its functions by means of the NIC.

(1) Determination Unit 210

The determination unit 210 determines processing that is to be executed by the device 100, based on the states of computer programs (i.e., application programs—hereinafter "applications") 110, 111, 112, 113, and 114 stored in the device 100, the protection control module 120, and the detection module group 130, and gives various instructions to the software distribution unit 220.

Figure 3:
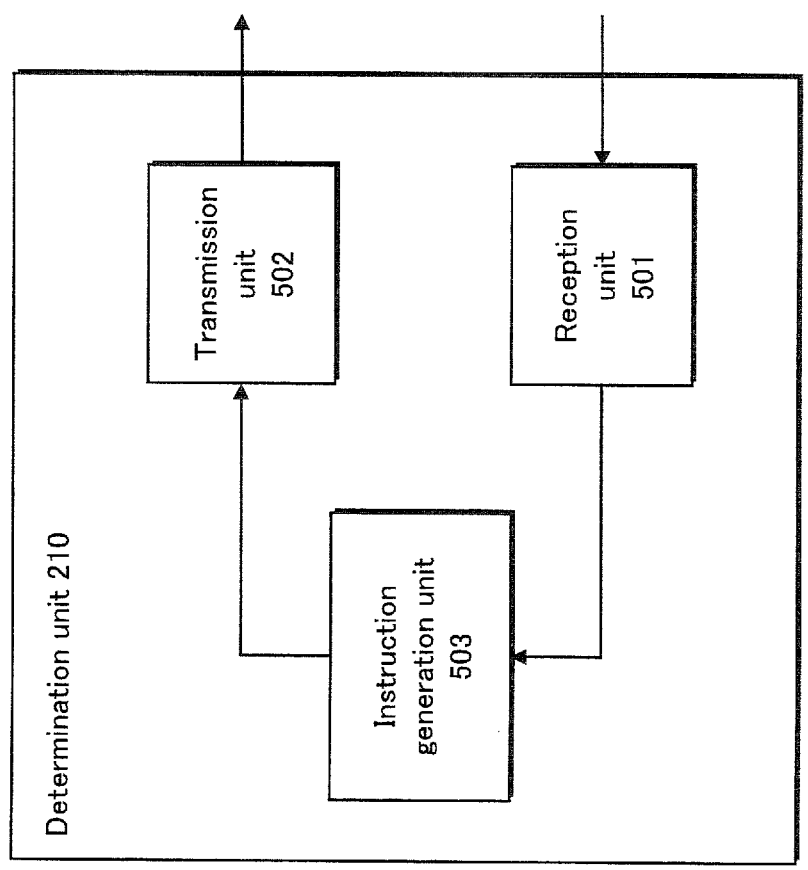
FIG. 3 is a block diagram showing the structure of a determination unit 210 of a management device 200.

As shown in FIG. 3, the determination unit 210 is composed of a reception unit 501, a transmission unit 502, and an instruction generation unit 503.

The reception unit 501 receives detection results, various requests, etc., from the detection modules, and outputs the detection results, the requests, etc., to the instruction generation unit 503. The reception unit 501 receives, from the software distribution unit 220, a notification indicating completion of processing, and outputs the notification to the instruction generation unit 503.

The transmission unit 502 receives an instruction from the instruction generation unit 503, and transmits the instruction to the software distribution unit 220.

The instruction generation unit 503 receives, from the protection control module 120, a request for generating the verification base data. Upon receiving the request for generating the verification base data, the instruction generation unit 503 generates an instruction to generate the verification base data, and outputs the instruction to the software distribution unit 220 via the transmission unit 502.

(2) Software Distribution Unit 220

At the time of tampering detection of the protection control module 120 stored in the device 100, the software distribution unit 220 transmits, to the protection control module 120, the verification base data including verification data used by each detection module to perform verification.

Figure 4:
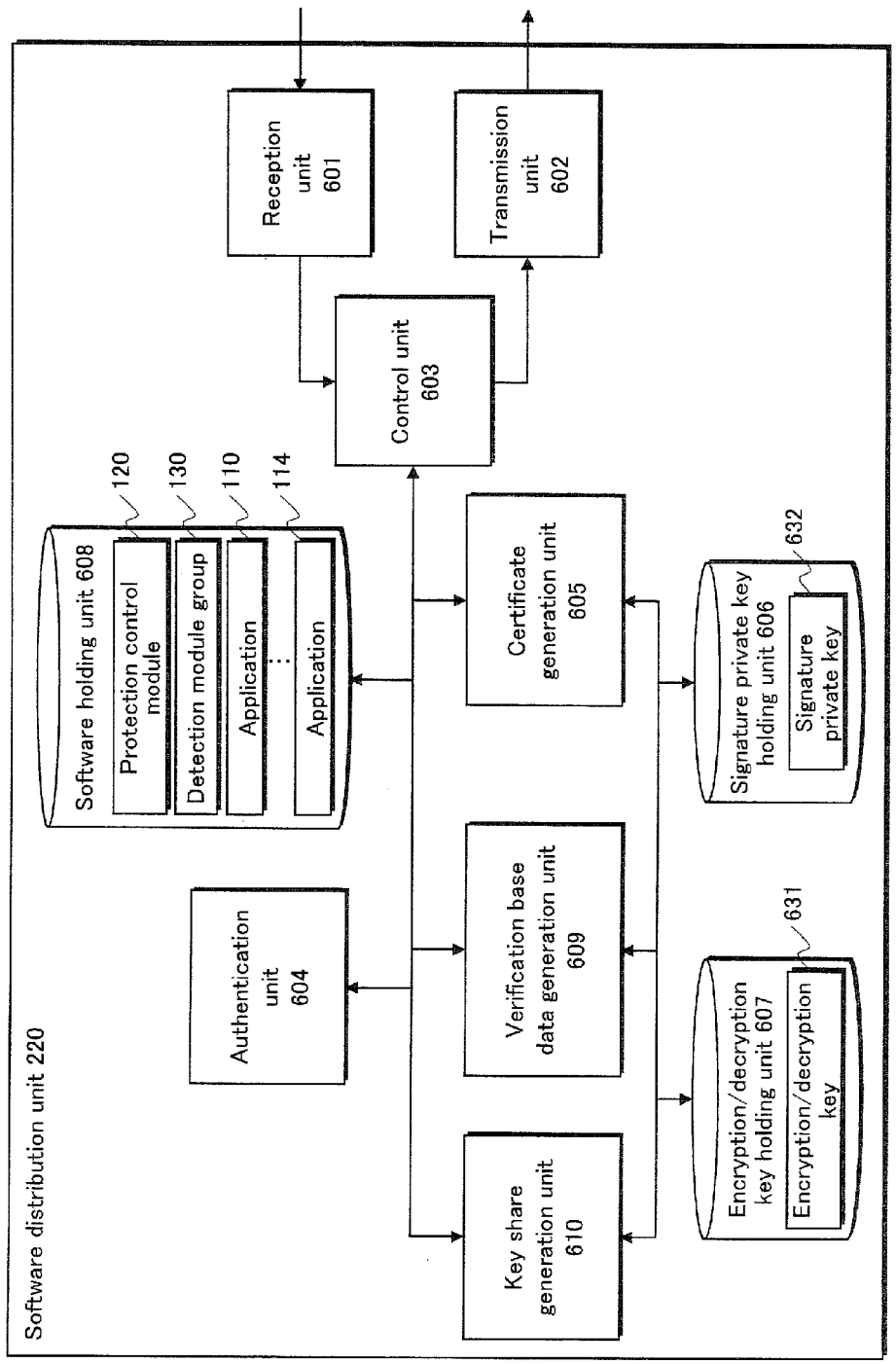
FIG. 4 is a block diagram showing the structure of a software distribution unit 220 of the management device 200.

As shown in FIG. 4, the software distribution unit 220 is composed of a reception unit 601, a transmission unit 602, a control unit 603, an authentication unit 604, a certificate generation unit 605, a signature private key holding unit 606, an encryption/decryption key holding unit 607, a software holding unit 608, a verification base data generation unit 609, and a key share generation unit 610.

(Signature Private Key Holding Unit 606)

The signature private key holding unit 606 holds therein a signature private key Prk (632). The signature private key Prk (632) is a private key in a public key cryptosystem allocated to the management device 200, and is used by the certificate generation unit 605 during generation of a certificate.

For example, the public key cryptosystem may be an RSA cryptosystem.

(Encryption/Decryption Key Holding Unit 607)

The encryption/decryption key holding unit 607 holds therein an encryption/decryption key d (631) used for encrypting an application to generate an encrypted application and decrypting the encrypted application. The encryption/decryption key d (631) is a secret key in a secret key cryptosystem. The encryption/decryption key d (631) is, for example, a 128-bit secret key in AES (Advanced Encryption Standard).

(Software Holding Unit 608)

The software holding unit 608 stores therein, in advance, the protection control module 120, the detection module group 130, and the applications 110, 111, . . . , 114 that are each a computer program.

The protection control module 120, the detection module group 130, and the applications 110, 111, . . . , 114 are installed in the device 100. Details of the protection control module 120, the detection module group 130, and the applications 110, 111, . . . , 114 are described below.

(Reception Unit 601)

The reception unit 601 receives a detection result regarding the protection control module 120 from each detection module of the device 100, via the network 20 and the communication unit 230, and outputs the detection result to the control unit 603.

(Transmission Unit 602)

The transmission unit 602 transmits data to the device 100, by control of the control unit 603. Examples of such data include a request of tampering verification regarding each application and the protection control module 120 inside the device 100, and verification base data necessary for the tampering verification.

(Control Unit 603)

The control unit 603 controls each component in the software distribution unit 220.

Also, the control unit 603 outputs a plurality of key shares generated by the key share generation unit 610 to the plurality of detection modules 131, 132, . . . , 135 in the device 100, via the transmission unit 602, the communication unit 230, and the network 20.

Furthermore, the control unit 603 outputs verification base data 640 (described below) generated by the verification base data generation unit 609 to the protection control module 120 in the device 100, via the transmission unit 602, the communication unit 230, and the network 20.

(Authentication Unit 604)

The authentication unit 604 performs mutual authentication with each detection module and the protection control module 120.

(Verification Base Data Generation Unit 609)

The verification base data generation unit 609 performs decryption processing made up of a plurality of partial decryption processes on an encrypted application program generated as a result of encryption of an application program in a non-tampered state. For each partial decryption process, verification base data generation unit 609 performs a one-way conversion on both input data for the partial decryption process and output data resulting from the partial decryption process to generate a decryption verification value, and generates verification data including the input data and the decryption verification value.

Specifically, the verification base data generation unit 609 generates the verification base data 640 which includes first partial decryption process data 641, second partial decryption process data 642, and third partial decryption process data 643 as shown in FIG. 5, and outputs the verification base data 640 to the control unit 603. Details are described below.

(a) The verification base data generation unit 609 generates reference information. In the present example, the reference information indicates the number of decryption sub-processes (also referred to as "partial decryption processes") constituting a decryption algorithm D described below. For example, the number of decryption sub-processes is "3" as described below. Accordingly, the reference information indicates "3".

(b) Next, the verification base data generation unit 609 reads the applications 110, 111, . . . , 114 from the software holding unit 608. The applications 110, 111, . . . , 114 are provided with file names, and the verification base data generation unit 609 extracts identification information from each of the file names of the applications 110, 111, . . . , 114. In the present embodiment, identification information "110", "111", "112", "113", and "114" are extracted from the file names of the applications 110, 111, . . . , 114, respectively.

(c) The verification base data generation unit 609 reads the encryption/decryption key d (631) from the encryption/decryption key holding unit 607. Next, the verification base data generation unit 609 causes a decryption load unit 304 (described below) in the protection control module 120 stored in the software holding unit 608 to be in an execution state, and causes the decryption load unit 304 to encrypt the applications 110, 111, . . . , 114 thus read, according to an encryption algorithm E with use of the encryption/decryption key d (631) thus read. In the present embodiment, the encryption algorithm E is AES in the secret key cryptosystem, for example. With the above process, encrypted applications 110e, 111e, . . . , 114e are generated from the applications 110, 111, . . . , 114.

(d) Next, the verification base data generation unit 609 causes the decryption load unit 304 in the execution state to decrypt the encrypted applications 110e, 111e, . . . , 114e, according to the decryption algorithm D which is the inverse conversion of the encryption algorithm E, with use of the encryption/decryption key d (631), and to generate decrypted applications 110d, 111d, . . . , 114d.

Here, the decryption algorithm D is made up of a plurality of decryption sub-processes (partial decryption processes). Ciphertext is sequentially subjected to the decryption sub-processes to be converted to plaintext. Examples of decryption processing made up of a plurality of decryption sub-processes include DES (Data Encryption Standard) and AES. In the present example, the decryption algorithm D is made up of three decryption sub-processes, for example.

Figure 6:
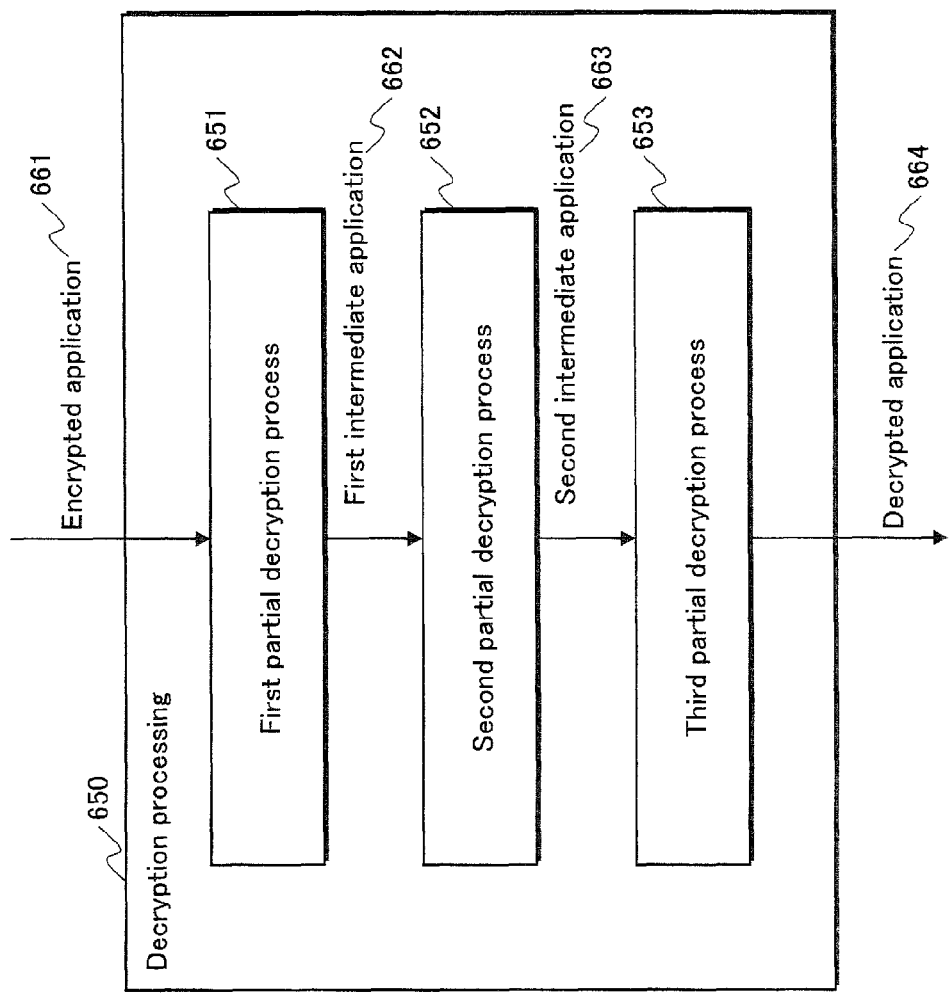
FIG. 6 is a schematic diagram showing decryption processing 650 made up of a first partial decryption process 651, a second partial decryption process 652, and a third partial decryption process 653.

As shown in FIG. 6 as one example, decryption processing 650 by the decryption load unit 304 is carried out through three decryption sub-processes (partial decryption processes), i.e., a first partial decryption process 651, a second partial decryption process 652, and a third partial decryption process 653.

Specifically, as shown in FIG. 6, an encrypted application 661 is converted to a first intermediate application 662 through the first partial decryption process 651. Next, the first intermediate application 662 is converted to a second intermediate application 663 through the second partial decryption process 652. Next, the second intermediate application 663 is converted to a decrypted application 664 through the third partial decryption process 653.

At this point, the verification base data generation unit 609 causes the decryption load unit 304 to output the decrypted application 664, which is the final result of the decryption processing 650, together with the first intermediate application 662 resulting from the first partial decryption process 651 and the second intermediate application 663 resulting from the second partial decryption process 652.

In this way, the decrypted applications 110d, 111d, . . . , 114d are generated from the encrypted applications 110e, 111e, . . . , 114e; first intermediate applications 110da, 111da, . . . , 114da are generated from the encrypted applications 110e, 111e, . . . , 114e; and second intermediate applications 110db, 111db, . . . , 114db are generated from the encrypted applications 110e, 111e, . . . , 114e, respectively.

(e) The verification base data generation unit 609 generates a decryption verification value for each application, for each decryption sub-process (i.e., partial decryption process), as shown below.

For the first partial decryption process 651, the verification base data generation unit 609 concatenates the encrypted application 110e and the first intermediate application 110da in the stated order to generate a concatenation, and applies a hash algorithm to the concatenation to generate a decryption verification value A (645a).

Decryption verification value A (645a)=Hash(encrypted application 110e||first intermediate application 110da)

In the present example, a hash SHA-1 is used as the hash algorithm. However, the present invention is not limited to such. Instead of SHA-1, it is possible to use SHA-2, SHA-3, or CBC-MAC (Cipher Block Chaining-Message Authentication Code) using block cryptography.

In the above formula, Hash(x) indicates a hash value generated by applying a hash algorithm to data x, and (a||b) indicates a concatenation generated by concatenating data a and data b in the stated order.

Similarly, a decryption verification value B (645b), a decryption verification value C (645c), a decryption verification value D (645d), and a decryption verification value E (645e) are generated for the encrypted applications 111e, 112e, . . . , 114e, respectively.

Decryption verification value B (645b)=Hash(encrypted application 111e||first intermediate application 111da)

Decryption verification value C (645c)=Hash(encrypted application 112e||first intermediate application 112da)

Decryption verification value D (645d)=Hash(encrypted application 113e||first intermediate application 113da)

Decryption verification value E (645e)=Hash(encrypted application 114e||first intermediate application 114da)

For the second partial decryption process 652, the verification base data generation unit 609 concatenates the first intermediate application 110da and the second intermediate application 110db in the stated order to generate a concatenation, and applies the hash algorithm to the concatenation to generate a decryption verification value F (645f).

Decryption verification value F (645f)=Hash(first intermediate application 110da||second intermediate application 110db)

Similarly, a decryption verification value G (645g), a decryption verification value H (645h), a decryption verification value I (645i), and a decryption verification value J (645j) are generated for the first intermediate applications 111da, 112da, . . . , 114da, respectively.

Decryption verification value G (645g)=Hash(first intermediate application 111da||second intermediate application 111db)

Decryption verification value H (645h)=Hash(first intermediate application 112da||second intermediate application 112db)

Decryption verification value I (645*i*)=Hash(first intermediate application 113*da*||second intermediate application 113*db*)

Decryption verification value J (645*j*)=Hash(first intermediate application 114*da*||second intermediate application 114*db*)

For the third partial decryption process 653, the verification base data generation unit 609 concatenates the second intermediate application 110*db* and the decrypted application 110*d* in the stated order to generate a concatenation, and applies the hash algorithm to the concatenation to generate a decryption verification value K (645*k*).

Decryption verification value K (645*k*)=Hash(second intermediate application 110*db*||decrypted application 110*d*)

Similarly, a decryption verification value L (645*l*), a decryption verification value M (645*m*), a decryption verification value N (645*n*), and a decryption verification value O (645*o*) are generated for the second intermediate applications 111*db*, 112*db*, . . . , 114*db*, respectively.

Decryption verification value L (645*l*)=Hash(second intermediate application 111*db*||decrypted application 111*d*)

Decryption verification value M (645*m*)=Hash(second intermediate application 112*db*||decrypted application 112*d*)

Decryption verification value N (645*n*)=Hash(second intermediate application 113*db*||decrypted application 113*d*)

Decryption verification value O (645*o*)=Hash(second intermediate application 114*db*||decrypted application 114*d*)

(f) The verification base data generation unit 609 generates a decryption certificate for each decryption sub-process (i.e., partial decryption process), as shown below.

For the first partial decryption process 651, the verification base data generation unit 609 concatenates the decryption verification value A (645*a*), the decryption verification value B (645*b*), the decryption verification value C (645*c*), the decryption verification value D (645*d*), and the decryption verification value E (645*e*) in the stated order, and thereby generates a concatenation. Next, the verification base data generation unit 609 applies the hash algorithm to the concatenation thus generated to generate a hash value. Next, the verification base data generation unit 609 outputs the hash value thus generated to the certificate generation unit 605, and causes the certificate generation unit 605 to generate a decryption processing certificate 646*a* by applying a signature generation algorithm Sign to the hash value, with use of the signature private key Prk (632).

Decryption processing certificate 646*a*=Sign(Prk, Hash (A||B||C||D||E))

Here, the signature generation algorithm Sign is an algorithm in a signature scheme based on the public key cryptography. Examples of such an algorithm include an RSA signature scheme, DSA (Digital Signature Algorithm), and Elliptic Curve DSA. Note that the signature generation algorithm Sign is not limited to such. For example, the signature generation algorithm Sign may be an algorithm in a shared key cryptography, such as a MAC (Message Authentication Code), or an algorithm in a signature scheme based on a hash function.

A detailed description of a signature generation algorithm is provided in the Non-Patent Literature 1 from page 171 to page 187.

In the above formula, Sign (x, y) indicates signature data generated by applying the signature generation algorithm Sign to data y, with use of a private key x.

Next, for the second partial decryption process 652, the verification base data generation unit 609 concatenates the decryption verification value F (645*f*), the decryption verification value G (645*g*), the decryption verification value H (645*h*), the decryption verification value I (645*i*), and the decryption verification value J (645*j*) in the stated order to generate a concatenation. Next, the verification base data generation unit 609 applies the hash algorithm to the concatenation thus generated to generate a hash value. Next, the verification base data generation unit 609 outputs the hash value thus generated to the certificate generation unit 605, and causes the certificate generation unit 605 to generate a decryption processing certificate 646*b* by applying the signature generation algorithm Sign to the hash value, with use of the signature private key Prk (632).

Decryption processing certificate 646*b*=Sign(Prk, Hash (F||G||H||I||J))

For the third partial decryption process 653, the verification base data generation unit 609 concatenates a decryption verification value K (645*k*), a decryption verification value L (645*l*), a decryption verification value M (645*m*), a decryption verification value N (645*n*), and a decryption verification value O (645*o*) in the stated order to generate a concatenation. Next, the verification base data generation unit 609 applies the hash algorithm to the concatenation thus generated to generate a hash value. Next, the verification base data generation unit 609 outputs the hash value thus generated to the certificate generation unit 605, and causes the certificate generation unit 605 to generate a decryption processing certificate 646*c* by applying the signature generation algorithm Sign to the hash value, with use of the signature private key Prk (632).

Decryption processing certificate 646*c*=Sign(Prk, Hash (K||L||M||N||O))

(g) For the first partial decryption process 651, the verification base data generation unit 609 generates the first partial decryption process data 641 including the reference information "3", a first set, a second set, . . . a fifth set, and the decryption processing certificate 646*a*, the first set including the identification information "110", the encrypted application 110*e*, and the decryption verification value A (645*a*), the second set including the identification information "111", the encrypted application 111*e*, and the decryption verification value B (645*b*), the third set including the identification information "112", the encrypted application 112*e*, and the decryption verification value C (645*c*), and the fourth set including the identification information "113", the encrypted application 113*e*, and the decryption verification value D (645*d*), and the fifth set including the identification information "114", the encrypted application 114*e*, and the decryption verification value E (645*e*).

For the second partial decryption process 652, the verification base data generation unit 609 generates the second partial decryption process data 642 including the reference information "3", a first set, a second set, . . . , a fifth set, and the decryption processing certificate 646*b*, the first set including the identification information "110", the first intermediate application 110*da*, and the decryption verification value F (645*f*), the second set including the identification information "111", the first intermediate application 111*da*, and the decryption verification value G (645*g*), the third set including the identification information "112", the first intermediate application 112*da*, and the decryption verification value H (645*h*), the fourth set including the identification information "113", the first intermediate application 113*da*, and the decryption verification value I (645*i*), and the fifth set including the identification information "114", the first intermediate application 114*da*, and the decryption verification value J (645*j*).

For the third partial decryption process 653, the verification base data generation unit 609 generates the third partial decryption process data 643 including the reference information "3", a first set, a second set, . . . , a fifth set, and the decryption processing certificate 646c, the first set including the identification information "110", the second intermediate application 110db, and the decryption verification value K (645k), the second set including the identification information "111", the second intermediate application 111db, and the decryption verification value L (645l), the third set including the identification information "112", the second intermediate application 112db, and the decryption verification value M (645m), the fourth set including the identification information "113", the second intermediate application 113db, and the decryption verification value N (645n), and the fifth set including the identification information "114", the second intermediate application 114db, and the decryption verification value O (645o).

(h) Next, the verification base data generation unit 609 generates the verification base data 640 including the first partial decryption process data 641, the second partial decryption process data 642, and the third partial decryption process data 643.

FIG. 5 shows the verification base data 640 generated as described above.

As shown by the example in FIG. 5, the verification base data 640 includes the first partial decryption process data 641, the second partial decryption process data 642, and the third partial decryption process data 643.

The first partial decryption process data 641 includes the reference information "3", the first set, the second set, . . . , the fifth set, and the decryption processing certificate 646a. The first set includes the identification information "110", the encrypted application 110e, and the decryption verification value A (645a). The second set includes the identification information "111", the encrypted application 111e, and the decryption verification value B (645b). The third set includes the identification information "112", the encrypted application 112e, and the decryption verification value C (645c). The fourth set includes the identification information "113", the encrypted application 113e, and the decryption verification value D (645d). The fifth set includes the identification information "114", the encrypted application 114e, and the decryption verification value E (645e).

The second partial decryption process data 642 and the third partial decryption process data 643 have a similar structure as the first partial decryption process data 641.

(Certificate Generation Unit 605)

The certificate generation unit 605 receives data targeted for a signature from the verification base data generation unit 609. Upon receiving the data, the certificate generation unit 605 reads the signature private key Prk (632) from the signature private key holding unit 606.

Next, the certificate generation unit 605 generates signature data by signing the received data with use of the signature private key Prk (632), according to a digital signature scheme by the signature generation algorithm Sign, and outputs the signature data to the verification base data generation unit 609.

Note that the signature generation algorithm Sign is described above.

(Key Share Generation Unit 610)

The key share generation unit 610 decomposes the encryption/decryption key d (631) held by the encryption/decryption key holding unit 607 to generate a plurality of key shares, as described below.

As one example of a key share generation method, the key share generation unit 610 generates a plurality of key shares such that the encryption/decryption key d (631) can be generated by the addition of all the generated key shares.

For example, in the case of decomposing the encryption/decryption key d (631) into five key shares, the key share generation unit 610 generates key shares d1, d2, . . . , d5 such that d=d1+d2+d3+d4+d5 is satisfied.

In this case, for example, the key share generation unit 610 generates a random number r1 as a key share d1, a random number r2 as a key share d2, a random number r3 as a key share d3, and a random number r4 as a key share d4.

d1=r1
d2=r2
d3=r3
d4=r4

Next, the key share generation unit 610 calculates d5 using d5=d−(d1+d2+d3+d4).

Since the key shares d1, d2, d3, d4, and d5 are generated from the encryption/decryption key d, d=d1+d2+d3+d4+d5 is satisfied.

Alternatively, the key share generation unit 610 may use the encryption/decryption key d (631) held in the encryption/decryption key holding unit 607 as secret information, and generate a plurality of information shares from the encryption/decryption key d (631) using the secret sharing scheme to use the information shares as key shares. The secret sharing scheme is described in Non-Patent Literature 1.

Figure 7:
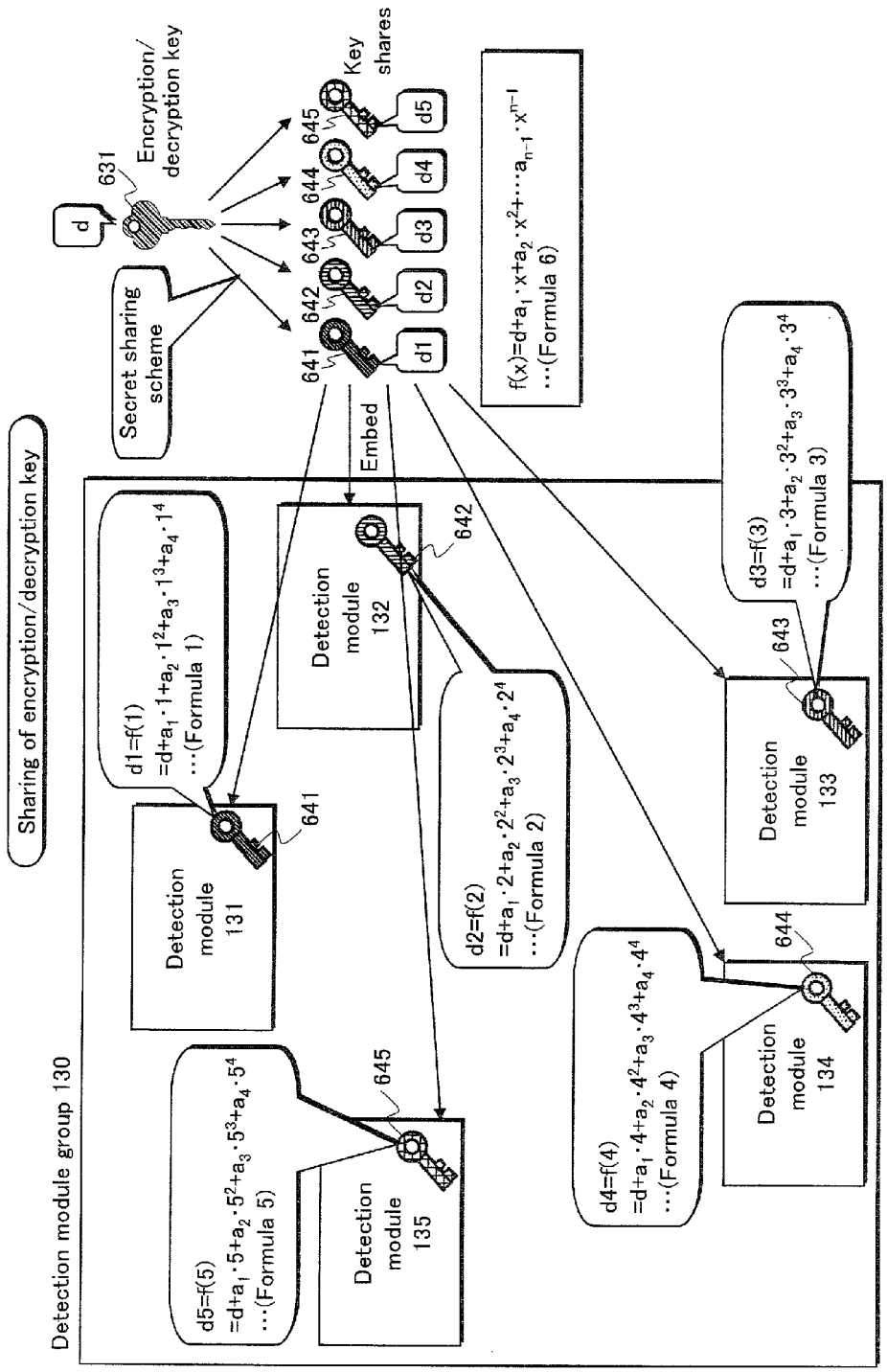
FIG. 7 is a schematic diagram showing decomposition of an encryption/decryption key 631 into key shares and output of the key shares to a detection module group 130.

For example, as shown in FIG. 7, the key share generation unit 610 randomly selects integers $a_1, a_2, \ldots, a_{n-1}$, and sets a $(n-1)^{th}$ degree polynomial, as shown in Formula 6 of FIG. 7.

In Formula 6, d is a constant term that denotes the encryption/decryption key. The integers $a_1, a_2, \ldots, a_{n-1}$ are each a coefficient of a term with degree 1 or more. The key share generation unit 610 generates key shares dj=f(j) (j=1, 2, . . . , n) for each application with use of the $(n-1)^{th}$ degree polynomial shown of Formula 6 in FIG. 7, as shown in Formulas 1 to 5.

Next, the key share generation unit 610 transmits the key shares d1, d2, . . . , d5 thus generated to the detection module group 130 of the device 100, via the control unit 603, the transmission unit 602, the communication unit 230, and the network 20.

(3) Communication Unit 230

The communication unit 230 communicates with the device 100 via the network 20. The communication unit 230 outputs information received from the device 100 to an appropriate unit among the units in the management device 200. Also, the communication unit 230 transmits, to the device 100, instructions or information received from the units in the management device 200. Specifically, the communication unit 230 transmits, to the device 100, an instruction or a notification received from the software distribution unit 220, and transmits, to the determination unit 210, information received from the device 100, such as a result of tampering detection.

Note that during the communication between the device 100 and the management device 200, the communication unit 230 may use a secure communication channel in which communication data is encrypted.

2.3 Structure of Device 100

As shown in FIG. 2, the device 100 stores therein computer programs, such as the applications 110, 111, 112, 113, and 114, the protection control module 120, and the detection module group 130. These computer programs operate in the device 100.

(1) Hardware Structure of Device 100

Figure 8:
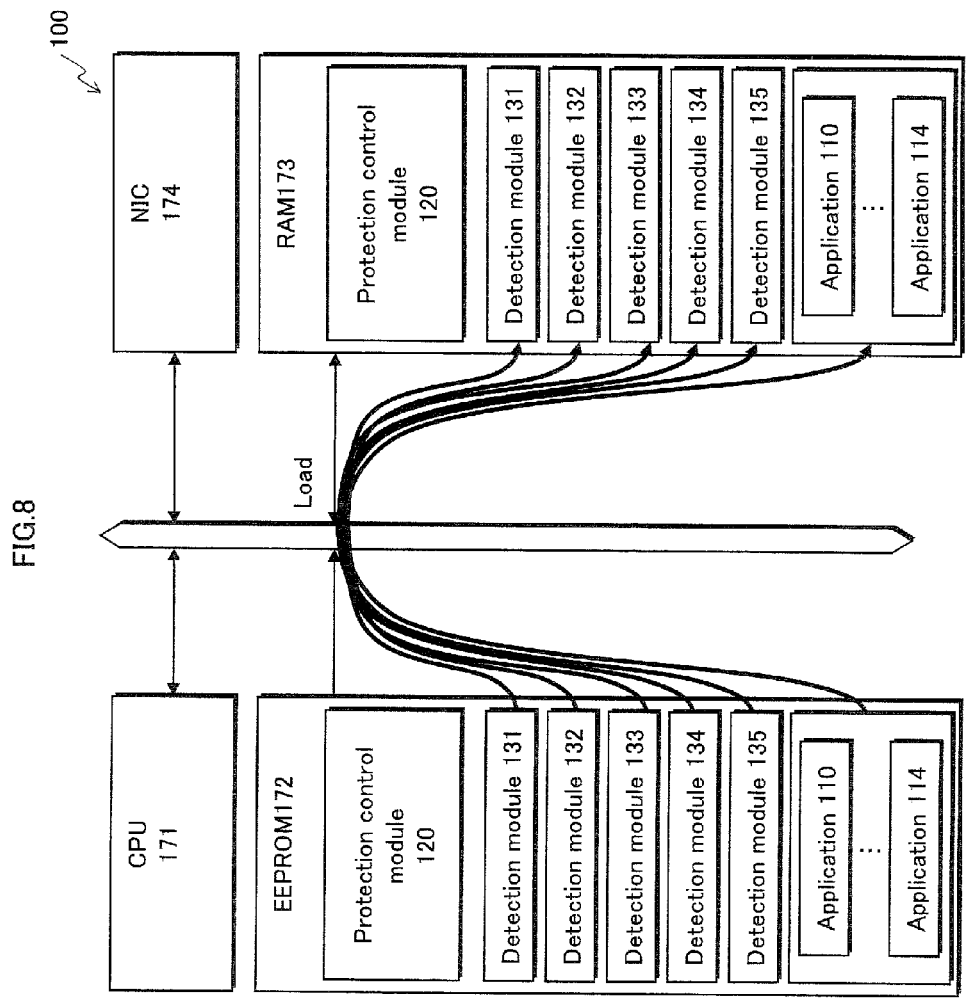
FIG. 8 shows an example of the hardware structure of a device 100.

As shown in FIG. 8, the device 100 includes a CPU 171, an EEPROM (Electrically Erasable and Programmable Read Only Memory) 172, a RAM 173, an NIC 174, a bus 175, and other devices. The CPU 171, the EEPROM 172, the RAM 173, and the NIC 174 are connected to each other via the bus 175 for mutual communication.

The EEPROM 172 is a non-volatile semiconductor memory, and includes an area for storing computer programs such as a boot loader 190, the protection control module 120, the detection modules 131, 132, . . . , 135, the applications 110, 111, . . . , 114, and an OS (Operating System) 180. The computer programs stored in the EEPROM 172 are loaded into the RAM 173. The computer programs thus loaded in the RAM 173 are then executed by the CPU 171, whereby the functions of the computer programs are realized.

The RAM 173 is a volatile semiconductor memory, and includes an area for storing the aforementioned computer programs and other data. Computer programs, such as the protection control module 120, the detection modules 131, 132, . . . , 135, the applications 110, 111, . . . , 114, and the OS 180, are loaded in the RAM 173. The RAM 173 is used as a work area of the CPU 171.

The NIC 174 is an expansion card for connecting to the network 20.

(2) Software Structure of Device 100

The following describes a software structure of the device 100.

Figure 9:
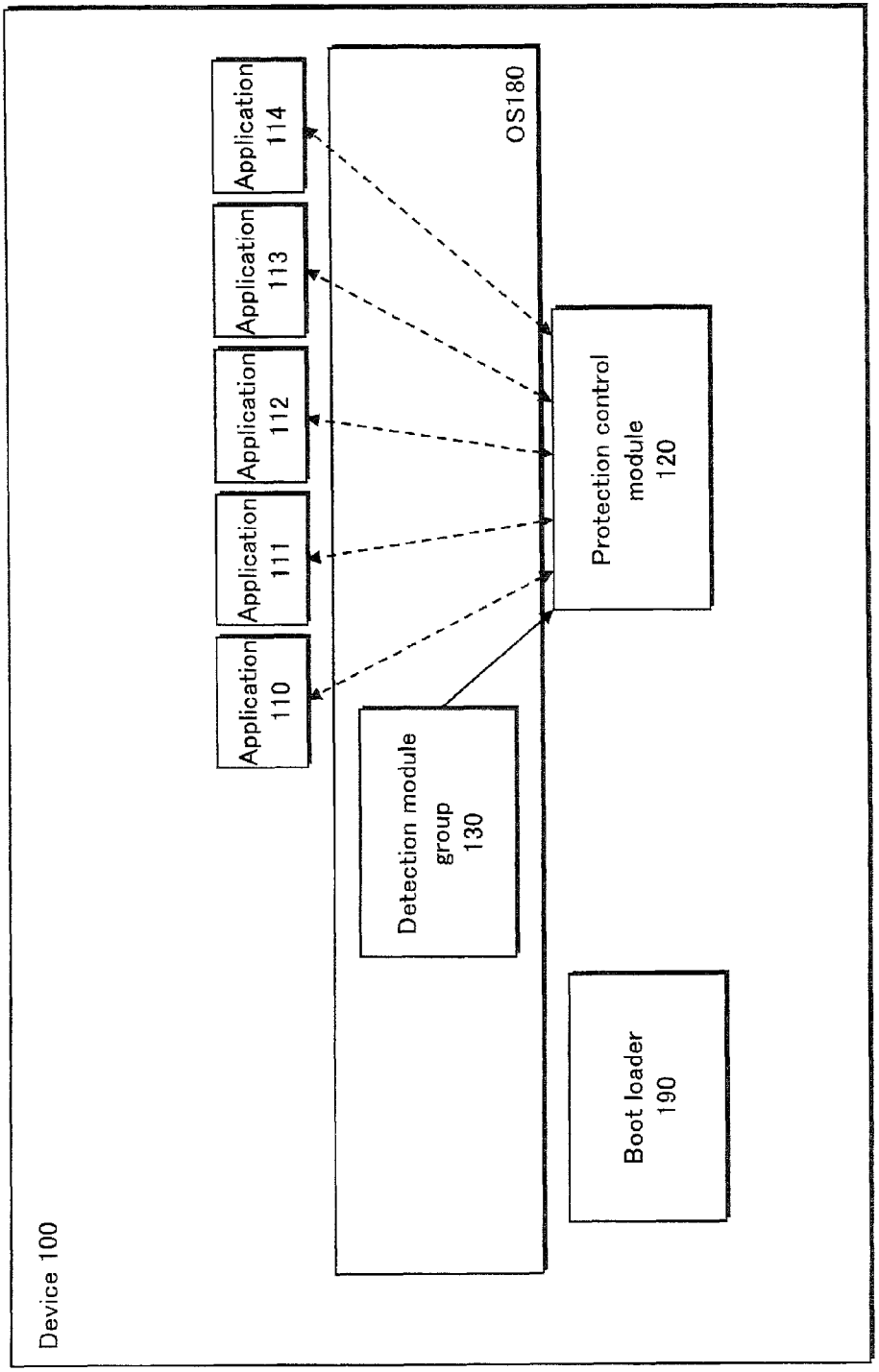
FIG. 9 shows an example of the hierarchical structure of the software of the device 100.

As shown in FIG. 9, the device 100 stores therein the boot loader 190, the protection control module 120, the OS 180, and the applications 110, 111, . . . , 114. The OS 180 includes the detection module group 130 which includes the detection modules 131, 132, 133, 134, and 135.

When the device 100 is powered on, the boot loader 190 operates first. Then, the protection control module 120 is loaded into the RAM 173, so that the protection control module 120 is placed in an operable state. Subsequently, the OS 180 is loaded into the RAM 173 and starts operations. At this point, the detection module group 130 is placed in an operable state since it is included in the OS 180. Next, any or all of the applications 110, 111, . . . , 114 are loaded into the RAM 173, so that the any or all applications thus loaded are placed in an executable state.

(3) Protection Control Module 120

The protection control module 120 is a computer program that has functions for protecting the applications, such as protecting the applications against analysis by an attacker and preventing extraction of confidential data from the applications. The protection control module 120 performs control in order to realize these functions. As described below, the confidential data is held by each application, and needs to be confidential.

One of the functions of the protection control module 120 for protecting the applications is a decryption load function. The decryption load function is a function of encrypting an application and storing the encrypted application when the application is not in use, and of generating an application in plaintext by decrypting the encrypted application and loading the application in plaintext into a memory only when the application is in use. Another one of the functions of the protection control module 120 for protecting the applications is a tampering detection function. The tampering detection function is a function of judging whether an application has been tampered with. Yet another one of the functions is an analysis tool detection function that is a function of judging whether an analysis tool, such as a debugger, is operating or not.

The protection control module 120 controls operations of these functions, in order to judge whether each application is exposed to an analysis or attack by an attacker. If an attack by an attacker is detected, the protection control module 120 stops operations of an application in which the attack has been detected. Also, the protection control module 120 performs processing such as clearing a memory used by the application, especially a memory area in which confidential data is stored. For example, the protection control module 120 fills the memory area with "0". In this way, the protection control module 120 prevents a leak of confidential data.

The protection control module 120 acquires the key shares from the plurality of detection modules 131, 132, . . . , 135, and composes the acquired key shares to reconstruct the encryption/decryption key. Then, the protection control module 120 decrypts an encrypted application with use of the encryption/decryption key, and deletes the encryption/decryption key upon completing the decryption of the encrypted application.

Figure 10:
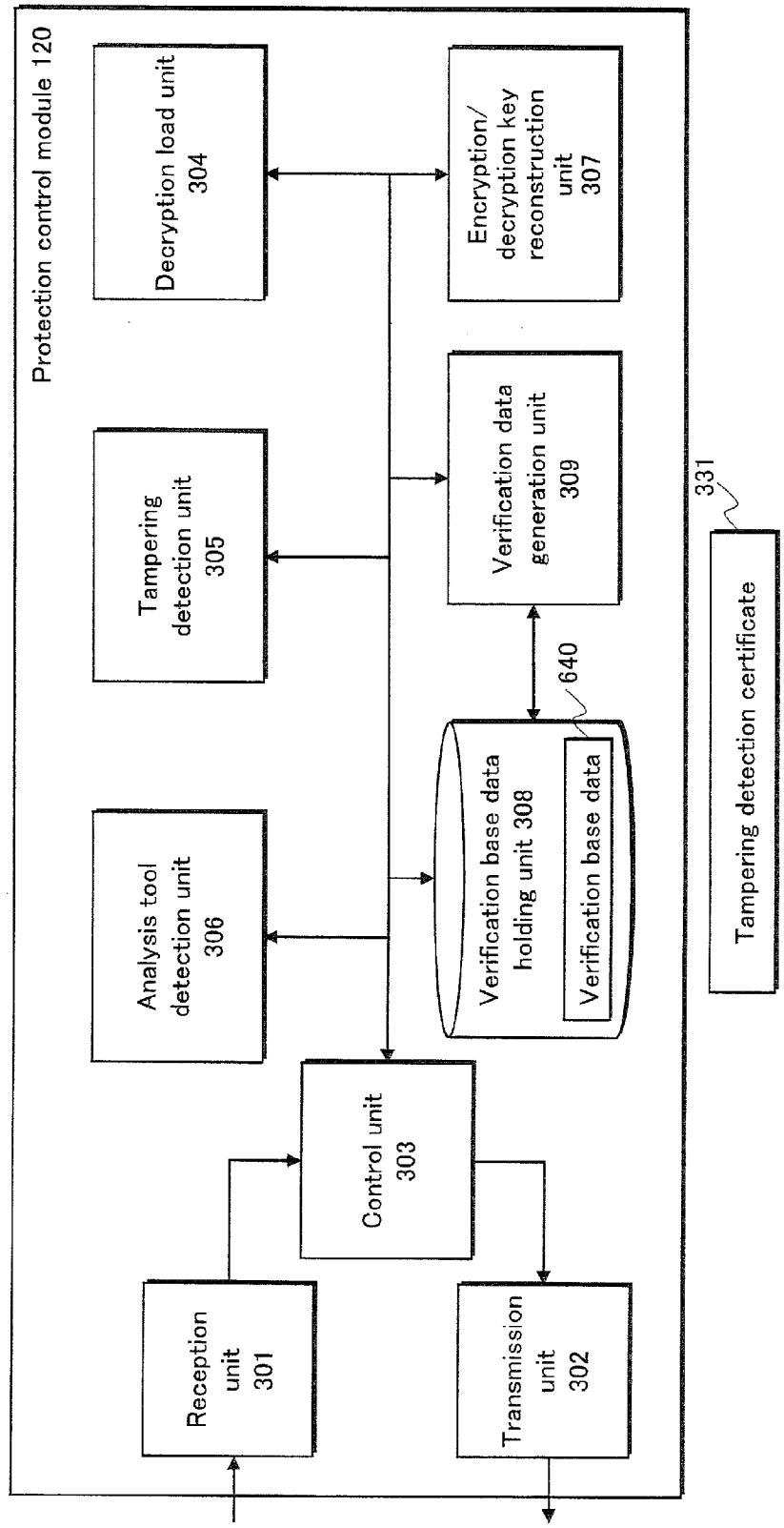
FIG. 10 is a block diagram showing the structure of a protection control module 120.

As shown in FIG. 10, the protection control module 120 includes a reception unit 301, a transmission unit 302, a control unit 303, a decryption load unit 304, a tampering detection unit 305, an analysis tool detection unit 306, an encryption/decryption key reconstruction unit 307, a verification base data holding unit 308, and a verification data generation unit 309.

Also, the protection control module 120 has attached thereto a tampering detection certificate 331.

(Tampering Detection Certificate 331)

The tampering detection certificate 331 is a certificate for detecting tampering of the protection control module 120 per se. The tampering detection certificate 331 includes signature data. The signature data is generated by applying the hash SHA-1 to the entirety of the protection control module 120 to generate a hash value, and signing the hash value according to the digital signature scheme by the signature generation algorithm Sign, with use of the signature private key 632 held by the management device 200.

Note that the signature generation algorithm Sign is described above.

Also, although the hash SHA-1 is used in the above example, it is not limited to such. Instead of SHA-1, it is possible to use SHA-2, SHA-3, or CBC-MAC (Cipher Block Chaining-Message Authentication Code) using block cryptography.

(Reception Unit 301)

The reception unit 301 receives information shares, various requests, etc., from the detection modules.

(Transmission Unit 302)

The transmission unit 302 transmits various requests to the detection modules 131, 132, . . . , 135.

(Control Unit 303)

The control unit 303 detects an attack being made to any of the applications by controlling the decryption load unit 304, the tampering detection unit 305, and the analysis tool detection unit 306 to operate.

The control unit 303 acquires the key shares from the detection modules 131, 132, . . . , 135 of the device 100, via the reception unit 301.

The control unit 303 deletes the encryption/decryption key 631 generated by the encryption/decryption key reconstruction unit 307 and used to decrypt an encrypted application, upon completion of decryption of the encrypted application.

For each partial decryption process, the control unit 303 outputs, to a corresponding detection module, output data from the partial decryption process and the verification data that has been received. For example, the control unit 303 transmits, via the transmission unit 302, the first intermediate application and verification data to the detection module 131, the second intermediate application and verification data to the detection module 132, and the decrypted application and verification data to the detection module 133.

Also, the control unit 303 transmits identification information indicating an application to, for example, the detection module 131, the detection module 132, and the detection module 133, via the transmission unit 302.

(Decryption Load Unit 304)

The decryption load unit 304 performs load processing. Specifically, when executing the encrypted applications 110e, 111e, ..., 114e held in the device 100, the decryption load unit 304 decrypts the encrypted applications 110e, 111e, ..., 114e according to the decryption algorithm D, with use of the encryption/decryption key 631 reconstructed by the encryption/decryption key reconstruction unit 307, and generates the applications 110, 111, ..., 114 in plaintext. Then, the decryption load unit 304 loads the applications 110, 111, ..., 114 thus generated into the RAM 173.

Also, the decryption load unit 304 performs storing processing. Specifically, for example, when a context switch to the application 112 occurs during execution of the application 110, the decryption load unit 304 generates encrypted data by encrypting data that relates to the application 110 and that is stored in the RAM 173, according to the encryption algorithm E with use of the encryption/decryption key 631, and temporarily stores the encrypted data in the decryption load unit 304 itself. Then, when a context switch back to the application 110 occurs, the decryption load unit 304 generates data by decrypting the encrypted data that has been temporarily stored, and stores the generated data into the RAM 173. Note that the context switch refers to the process of saving and restoring the state (context) of a CPU so that a plurality of modules can share the same CPU.

Also, the decryption load unit 304 performs decryption processing on an encrypted application according to the decryption algorithm D, the decryption processing being made up of a plurality of partial decryption processes. The decryption processing made up of a plurality of partial decryption processes is described above with reference to FIG. 6.

One example of the encryption algorithm E and the decryption algorithm D used by the decryption load unit 304 is AES in the secret key cryptosystem. Another example is DES.

(Tampering Detection Unit 305)

The tampering detection unit 305 performs tampering detection processing to check whether any of the applications has been tampered with. The tampering detection processing is performed with use of the tampering detection certificate attached to each of the applications. Alternatively, the tampering detection processing may be performed by comparing MAC values.

(Analysis Tool Detection Unit 306)

The analysis tool detection unit 306 detects an installation or operation of an analysis tool such as a debugger. This is because it is assumed that a malicious attacker may install or operate an analysis tool to attack the applications. For example, the detection method may be to search for the name of a file storing an analysis tool such as a debugger, to check whether a special register used by a debugger is in use, or to detect an interrupt set by a debugger.

(Encryption/Decryption Key Reconstruction Unit 307)

As shown in FIG. 11 as one example, the encryption/decryption key reconstruction unit 307 composes the plurality of key shares received from the plurality of detection modules, and thereby reconstructs the encryption/decryption key 631 for encrypting and decrypting each application.

Assume that the key share generation unit 610 generates a plurality of key shares such that the addition of all the generated key shares can generate the encryption/decryption key d (631), as described above. In this case, the encryption/decryption key reconstruction unit 307 adds all the key shares to reconstruct the original encryption/decryption key 631.

For example, if a plurality of key shares d1, d2, d3, d4, and d5 are generated from an encryption/decryption key d such that d=d1+d2+d3+d4+d5 is satisfied, the encryption/decryption key d is reconstructed by d=d1+d2+d3+d4+d5.

If the encryption/decryption key is decomposed with use of the secret sharing scheme, the encryption/decryption key is reconstructed with use of a method for reconstructing secret information according to the secret sharing scheme. For example, suppose that the key shares are generated as shown in Formulas 1 to 5 in FIG. 7. In this case, collecting n key shares enables uniquely determining the polynomial y=f(x) from n sets of coordinates (aj, f(aj)) in the $(n-1)^{th}$ degree polynomial y=f(x). As a result, the constant term d in the polynomial can be determined.

Non-Patent Literature 1 provides a detailed description of reconstruction of secret information according to the secret sharing scheme.

(Verification Base Data Holding Unit 308)

The verification base data holding unit 308 holds the verification base data 640 received from the management device 200. The data structure of the verification base data 640 is described above.

(Verification Data Generation Unit 309)

The verification data generation unit 309 extracts the first partial decryption process data 641 from the verification base data 640 held in the verification base data holding unit 308, and treats the first partial decryption process data 641 as verification data 341. Also, the verification data generation unit 309 extracts the second partial decryption process data 642 from the verification base data 640, and treats the second partial decryption process data 642 as verification data 342. Also, the verification data generation unit 309 extracts the third partial decryption process data 643 from the verification base data 640, and treats the third partial decryption process data 643 as verification data 343.

FIGS. 12 to 14 show examples of the respective data structures of the verification data 341, the verification data 342, and the verification data 343.

For example, the verification data generation unit 309 transmits the verification data 341 to the detection module 131, via the control unit 303 and the transmission unit 302. The detection module 131 holds the verification data 341.

Also, the verification data generation unit 309 transmits the verification data 342, for example, to the detection module 132, via the control unit 303 and the transmission unit 302. The detection module 132 holds the verification data 342.

Furthermore, the verification data generation unit 309 transmits the verification data 343, for example, to the detection module 133, via the control unit 303 and the transmission unit 302. The detection module 133 holds the verification data 343.

(4) Detection Module Group 130

As shown in FIG. 2, the detection module group 130 includes five detection modules, namely the detection modules 131, 132, 133, 134, and 135.

Each of the detection modules 131, 132, 133, 134, and 135 is a computer program having a function of detecting whether the protection control module 120 has been tampered with.

Each of the detection modules acquires a different key share from the management device 200, and stores therein the key share. Also, each of the detection modules transmits a result of tampering detection on the protection control module 120, to the management device 200 via the network 20.

Figure 15:
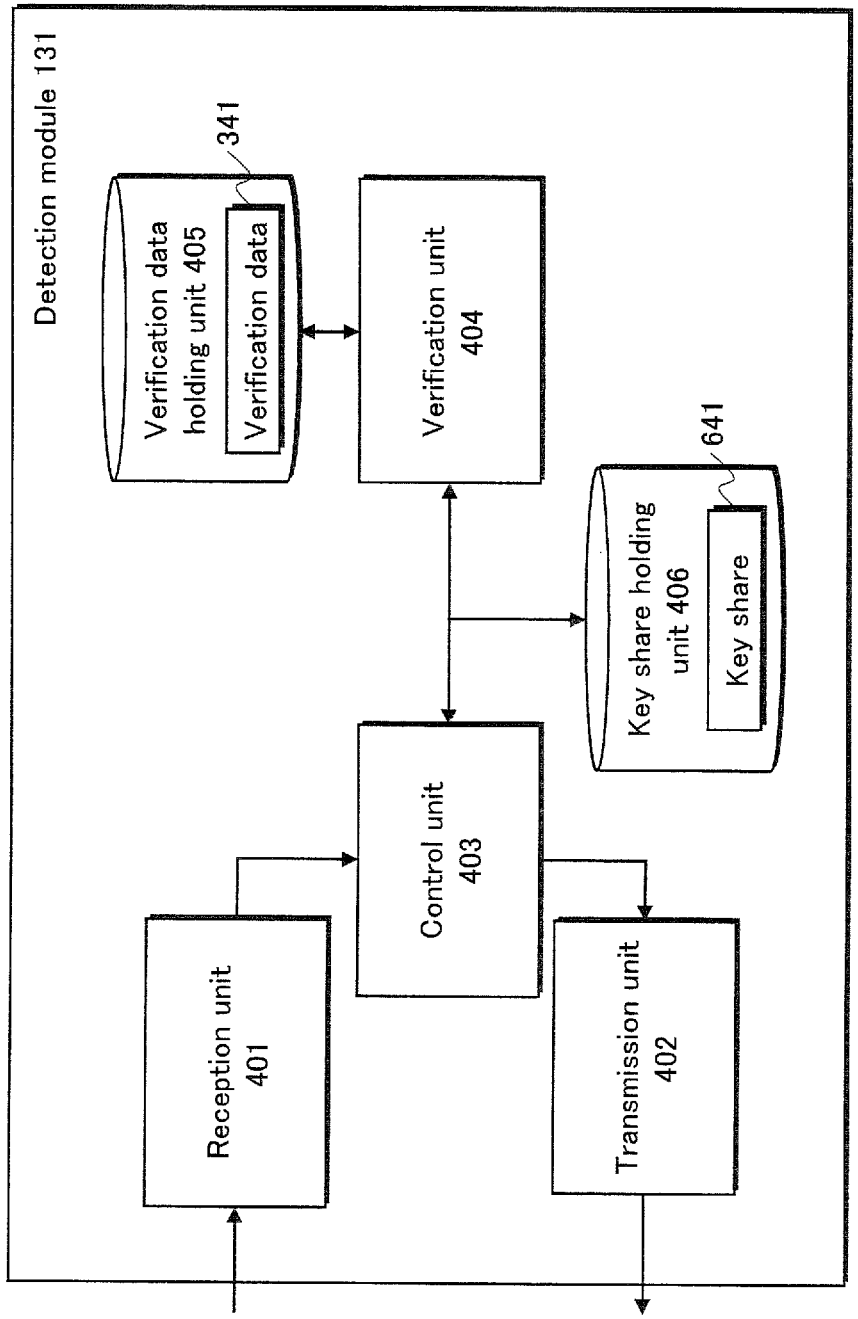
FIG. 15 is a block diagram showing the structure of a detection module 131.

As shown in FIG. 15, the detection module 131 is composed of a reception unit 401, a transmission unit 402, a control unit 403, a verification unit 404, a verification data holding unit 405, and a key share holding unit 406.

The detection modules 132, 133, 134, and 135 have a similar structure to the detection module 131. Therefore, a description thereof is omitted here.

(Reception Unit 401)

The reception unit 401 receives various instructions from the management device 200. Also, the reception unit 401 receives a result of processing performed by another module upon request, and a result of tampering detection on the protection control module 120 performed by another detection module.

(Transmission Unit 402)

The transmission unit 402 transmits data, such as results of various processes, to the management device 200, the protection control module 120, and the other detection modules.

(Control Unit 403)

The control unit 403 controls verification unit 404 based on various instructions and notifications received by the reception unit 401, in order to perform verification processing on the protection control module 120.

Also, the control unit 403 of each detection module receives, from the protection control module 120 via the reception unit 401, (i) output data from the partial decryption process corresponding to the detection module and (ii) verification data generated for the partial decryption process. For example, the control unit 403 of the detection module 131 receives the first intermediate application and the verification data generated for the partial decryption process corresponding to the detection module 131. Also, the control unit 403 of the detection module 132 receives the second intermediate application and the verification data generated for the partial decryption process corresponding to the detection module 132. Furthermore, the control unit 403 of the detection module 133 receives the decrypted application and the verification data generated for the partial decryption process corresponding to the detection module 133.

Next, the control unit 403 of each detection module outputs, to the verification unit 404, the output data from the partial decryption process corresponding to the detection module and the verification data generated for the partial decryption process. For example, the control unit 403 of the detection module 131 outputs, to the verification unit 404, the first intermediate application and the verification data generated for the partial decryption process corresponding to the detection module 131. Also, the control unit 403 of the detection module 132 outputs, to the verification unit 404, the second intermediate application and the verification data generated for the partial decryption process corresponding to the detection module 132. Furthermore, the control unit 403 of the detection module 133 outputs, to the verification unit 404, the decrypted application and the verification data generated for the partial decryption process corresponding to the detection module 133.

(Verification Unit 404)

The verification unit 404 verifies whether the protection control module 120 is operating normally. The verification unit 404 performs the verification using the output data and the verification data received from the control unit 403, and outputs a result of the verification if the verification fails.

Details are described below.

(a) When any of the applications 110, 111, . . . , 114 is being executed, the verification unit 404 performs verification on the protection control module 120, with use of the verification data 341 held in the verification data holding unit 405.

The verification unit 404 performs the verification by (i) performing the same conversion as the one-way conversion by the verification base data generation unit 609 on both the input data included in the verification data and the output data received from the control unit 403 to generate a second verification value and (ii) judging whether the decryption verification value in the verification data matches the second verification value, and outputs the result of the verification indicating a verification failure if the values do not match.

In the present example, a description is provided on the assumption that the verification unit 404 is a component of the detection module 131. Also, it is assumed that the application 110 is being executed.

The verification unit 404 receives identification information indicating the application 110, the first intermediate application of the application 110, and the verification data 341, from the protection control module 120 via the reception unit 401 and the control unit 403.

Next, the verification unit 404 extracts, from the verification data 341, the encrypted application corresponding to the received identification information, concatenates the encrypted application and the received first intermediate application in the stated order to generate a concatenation. Then, the verification unit 404 applies a hash algorithm Hash to the concatenation to calculate a hash value.

Subsequently, the verification unit 404 extracts, from the verification data 341, the decryption verification value corresponding to the received identification information, and judges whether the decryption verification value matches the calculated hash value.

If the decryption verification value does not match the calculated hash value, the verification is a failure.

If the decryption verification value matches the calculated hash value, the verification unit 404 extracts, from the verification data 341, the decryption processing certificate and all decryption verification values other than the decryption verification value corresponding to the received identification information, i.e., decryption verification values B, C, D, and E. Then, the verification unit 404 concatenates the calculated hash value and the decryption verification values B, C, D, and E to generate a concatenation, and applies a signature verification algorithm Vrfy to the concatenation and the decryption processing certificate with use of a signature public key Pbk.

Detection result=Vrfy(Pbk, decryption processing certificate, (hash value||B||C||D||E))

Here, the signature verification algorithm Vrfy corresponds to the signature generation algorithm Sign. The signature verification algorithm Vrfy is an algorithm in a signature scheme based on the public key cryptography. Examples of such an algorithm include an RSA signature scheme, DSA (Digital Signature Algorithm), and Elliptic Curve DSA.

Also, the signature public key Pbk corresponds to the signature private key Prk (632), and is a public key in the public key cryptosystem allocated to the management device 200.

Also, Vrfy(x, y, z) indicates a detection result obtained by applying the signature verification algorithm Vrfy to signature data y and data z with use of a public key x. The detection result indicates either a success or a failure.

The verification using the verification data is successful if the verification using the decryption verification value and the verification using the decryption processing certificate are both successful. In contrast, the verification using the verification data fails if one of the verification using the decryption verification value and the verification using the decryption processing certificate fails.

Assume here that the verification unit 404 is a component of the detection module 132. In this case, the verification unit 404 receives, from the protection control module 120, the identification information indicating the application 110, the second intermediate application of the application 110, and the verification data 342. Next, the verification unit 404 extracts the first intermediate application corresponding to the received identification information, concatenates the first intermediate application and the received second intermediate application in the stated order to generate a concatenation. Then, the verification unit 404 applies the hash algorithm Hash to the concatenation to calculate a hash value. Subsequently, the verification unit 404 extracts, from the verification data 342, the decryption verification value corresponding to the received identification information, and judges whether the decryption verification value matches the calculated hash value. Also, the verification unit 404 extracts, from the verification data 342, the decryption processing certificate and all decryption verification values other than the decryption verification value corresponding to the received identification information, i.e., decryption verification values G, H, I, and J. Then, the verification unit 404 concatenates the calculated hash value and the decryption verification values G, H, I, and J to generate a concatenation, and applies the signature verification algorithm Vrfy to the concatenation and the decryption processing certificate with use of the signature public key Pbk.

Also, assume here that the verification unit 404 is a component of the detection module 133. In this case, the verification unit 404 receives, from the protection control module 120, the identification information indicating the application 110, the decrypted application of the application 110, and the verification data 343. Next, the verification unit 404 extracts, from the verification data 343, the second intermediate application corresponding to the received identification information, concatenates the second intermediate application and the received decrypted application in the stated order to generate a concatenation. Then, the verification unit 404 applies the hash algorithm Hash to the concatenation to calculate a hash value. Subsequently, the verification unit 404 extracts, from the verification data 343, the decryption verification value corresponding to the received identification information, and judges whether the decryption verification value matches the calculated hash value. Also, the verification unit 404 extracts, from the verification data 343, the decryption processing certificate and all decryption verification values other than the decryption verification value corresponding to the received identification information, i.e., decryption verification values L, M, N, and O. Then, the verification unit 404 concatenates the calculated hash value and the decryption verification values L, M, N, and O to generate a concatenation, and applies the signature verification algorithm Vrfy to the concatenation and the decryption processing certificate with use of the signature public key Pbk.

The above processing is also performed when each of the applications 111, 112, . . . , 114 is executed.

(b) Also, when any of the applications 110, 111, . . . , 114 is being executed, the verification unit 404 performs verification using an identifier that identifies a partial decryption process as described below.

The verification unit 404 of each detection module performs verification on the duplication of one or more pieces of identification information received from another one or more detection modules and the identification information identifying the partial decryption process corresponding to the detection module itself, and on the comprehensiveness of the one or more pieces of identification information and the identification information identifying the partial decryption process corresponding to the detection module itself, with respect to all pieces of identification information corresponding to the plurality of partial decryption processes. The verification unit 404 of each detection module outputs a result of verification indicating a verification failure, if any duplicates exist among the one or more pieces of identification information and the identification information identifying the partial decryption process corresponding to the detection module itself, or if the one or more pieces of identification information and the identification information identifying the partial decryption process corresponding to the detection module itself do not completely cover all pieces of identification information corresponding to the plurality of partial decryption processes.

In the present example, a description is provided on the assumption that the verification unit 404 is a component of the detection module 131.

The verification unit 404 receives an identifier identifying a partial decryption process from each of the detection modules 132 and 133.

Next, the verification unit 404 verifies whether verification corresponding to each of the partial decryption processes has been performed by any of the detection modules, with use of (i) the identifier that identifies the partial decryption process and that is used for the verification by the verification unit 404 itself and (ii) the identifiers received from the other detection modules.

For example, assume that: one identifier that identifies a partial decryption process and that is used for the verification by the verification unit 404 is the identifier identifying the first partial decryption process 651 shown in FIG. 6; and two identifiers received from other detection modules identify the second partial decryption process 652 and the third partial decryption process 653, respectively. In this case, the verification unit 404 judges that the verification corresponding to each of the partial decryption processes has been performed.

Also, for example, assume that matching identifiers exist among the identifier that identifies the partial decryption process and that is used for the verification by the verification unit 404 and the received identifiers. In this case, the verification unit 404 judges that the verification corresponding to each of the partial decryption processes has not been performed.

Also, for example, assume that the identifiers identifying the partial decryption processes shown in FIG. 6 do not exist among the identifier that identifies the partial decryption process and that is used for the verification by the verification unit 404 and the received identifiers. In this case, the verification unit 404 judges that the verification corresponding to each of the partial decryption processes has not been performed.

If the verification corresponding to each of the partial decryption processes is performed, the verification using the identifiers of the partial decryption processes is successful. If the verification corresponding to each of the partial decryption processes is not performed, the verification using the identifiers of the partial decryption processes fails.

(c) Furthermore, the verification unit 404 performs tampering detection processing using the tampering detection certificate 331 attached to the protection control module 120 as follows, when none of the applications 110, 111, . . . , 114 is being executed.

The verification unit 404 applies the hash SHA-1 to the entirety of the protection control module 120 to generate a hash value, and performs a digital signature verification on the hash value and the tampering detection certificate 331, according to the signature verification algorithm Vrfy using the signature public key Pbk.

Alternatively, the verification unit 404 may use a Message Authentication Code (hereinafter, "MAC value") calculated in advance. In this case, the verification unit 404 performs the tampering detection processing by generating a MAC value using a verification key held in the verification unit 404, and comparing the MAC value and a MAC value received from the management device 200 in advance and held in the verification unit 404.

(Verification Data Holding Unit 405)

The verification data holding unit 405 holds therein the verification data 341 for verifying whether the decryption load unit 304 of the protection control module 120 operates normally. The verification data 341 is transmitted from the protection control module 120.

Note that the verification data holding unit 405 of the detection module 132 holds therein the verification data 342. Also, the verification data holding unit 405 of the detection module 133 holds therein the verification data 343.

(5) Applications 110, 111, . . . , 114

Each of the applications 110, 111, . . . , 114 is a computer program for providing a user of the device 100 with various functions.

For example, the application 110 is a computer program for purchasing music content or video content from a content delivery server device via the network 20, and playing back the purchased content. The application 111 is a computer program for accessing a server device of a financial institution, and using Internet banking such as balance inquiries and transfers.

Each application holds confidential data that must not be known to others, such as an authentication key or a password for proving the identity of the user. The authentication key is for the device 100 to perform authentication with a partner device, such as the content delivery server device or the server device of the financial institution, in order to determine whether the partner device is authentic. The confidential data needs to be protected so as not to be extracted from the application by a malicious third party (hereinafter "attacker") and used in an unauthorized manner.

2.4 Operations in Detection System 10

(1) Outline of Overall Operations

Figure 16:
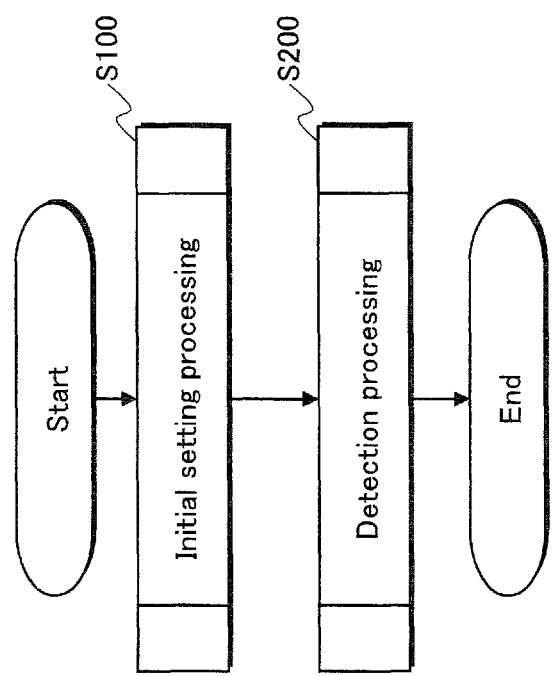
FIG. 16 is a flowchart showing overall operations in the detection system 10.

The following describes the outline of overall operations in the detection system 10, with reference to the flowchart of FIG. 16.

As shown in FIG. 16, the operations in the detection system 10 include initial setting processing performed during manufacture of the device 100 in a factory. The initial setting processing refers to installing, into the device 100, the protection control module 120, the detection module group 130, the applications 110, 111, . . . , and other computer programs. Also, the verification base data 640 is embedded into the protection control module 120 (step S100).

Subsequently, the device 100 is shipped from the factory, and provided for a user.

When the device 100 is used by the user, the protection control module 120 in the device 100 performs detection processing so as to protect the applications from an attack by an attacker, and executes the applications. At the same time, each of the detection modules verifies whether the protection control module 120 is under attack. If computer programs (the protection control module 120 and a module in the detection module group 130) stored in the device 100 are attacked and tampered with, a detection module that is not tampered with notifies the management device 200 that the computer programs have been tampered with. The device 100 may display, on a display of the device 100, the notification indicating that the computer programs have been tampered with (step S200).

(2) Operations of Initial Setting Processing

Figure 17:
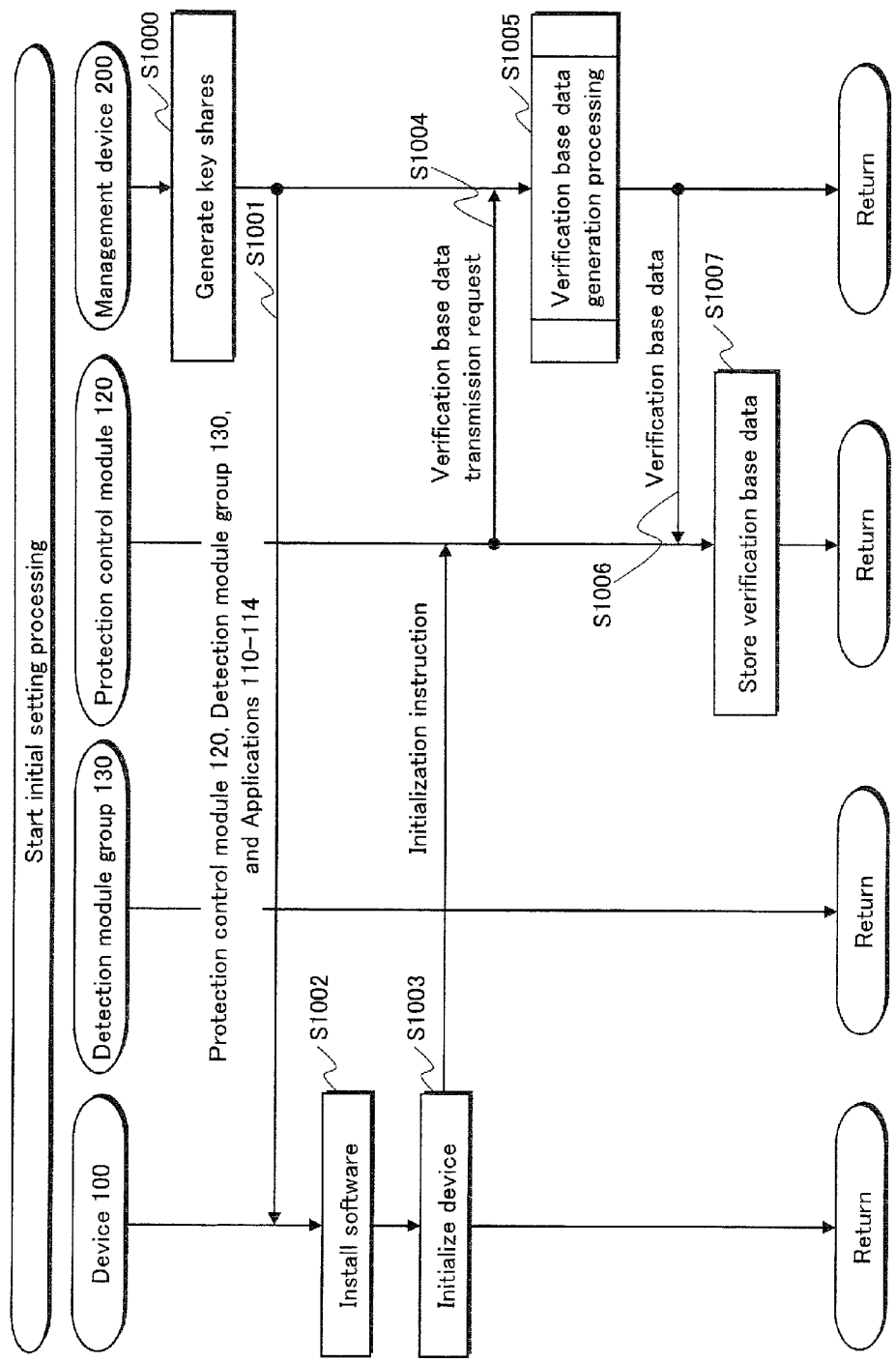
FIG. 17 is a sequence diagram showing operations of initial setting in the detection system 10.

The following describes initial setting processing with reference to the sequence diagram of FIG. 17.

Here, the processing performed individually by each of the detection modules 131, 132, 133, 134, and 135 is described collectively as being performed by the detection module group 130.

When the device 100 is manufactured in the factory, the key share generation unit 610 in the software distribution unit 220 of the management device 200 generates a plurality of key shares by decomposing the encryption/decryption key 631 held in the encryption/decryption key holding unit 607, and writes each of the plurality of key shares in a different one of the detection modules 131, 132, . . . , 135 held in the software holding unit 608 (step S1000).

Next, the control unit 603 transmits the protection control module 120, the detection module group 130, the applications 110, 111, . . . , 114, and other computer programs necessary for the operations of the device 100, to the device 100 via the transmission unit 602 and the communication unit 230. Each of the computer programs has a certificate (tampering detection certificate) attached thereto, which is used to verify whether the computer program has been tampered with. The device 100 receives the protection control module 120, the detection module group 130, the applications 110, 111, . . . , 114, and the other computer programs to each of which the certificate is attached (step S1001).

The protection control module 120, the detection module group 130, the applications 110, 111, . . . , 114, and the other computer programs to each of which the certificate is attached are installed in the EEPROM 172 of the device 100 (step S1002).

After the installation of the computer programs is completed, a computer program for performing the initial setting of the device 100, a computer program for testing whether the device 100 operates normally, etc., are executed to initialize the device 100. The device 100 gives an initialization instruction to the protection control module 120 (step S1003).

Upon receiving the initialization instruction, the protection control module 120 requests the management device 200 to transmit the verification base data 640 (step S1004).

Upon receiving the transmission request of the verification base data 640 from the protection control module 120, the management device 200 performs processing for generating the verification base data 640 (step S1005).

Upon completing the processing for generating the verification base data 640, the management device 200 transmits the verification base data 640 to the protection control module 120 (step S1006). The protection control module 120 receives the verification base data 640 from the management device 200 and stores the verification base data 640 in the verification base data holding unit 308 (step S1007).

(3) Operations of Generation of Verification Base Data 640

Figure 18:
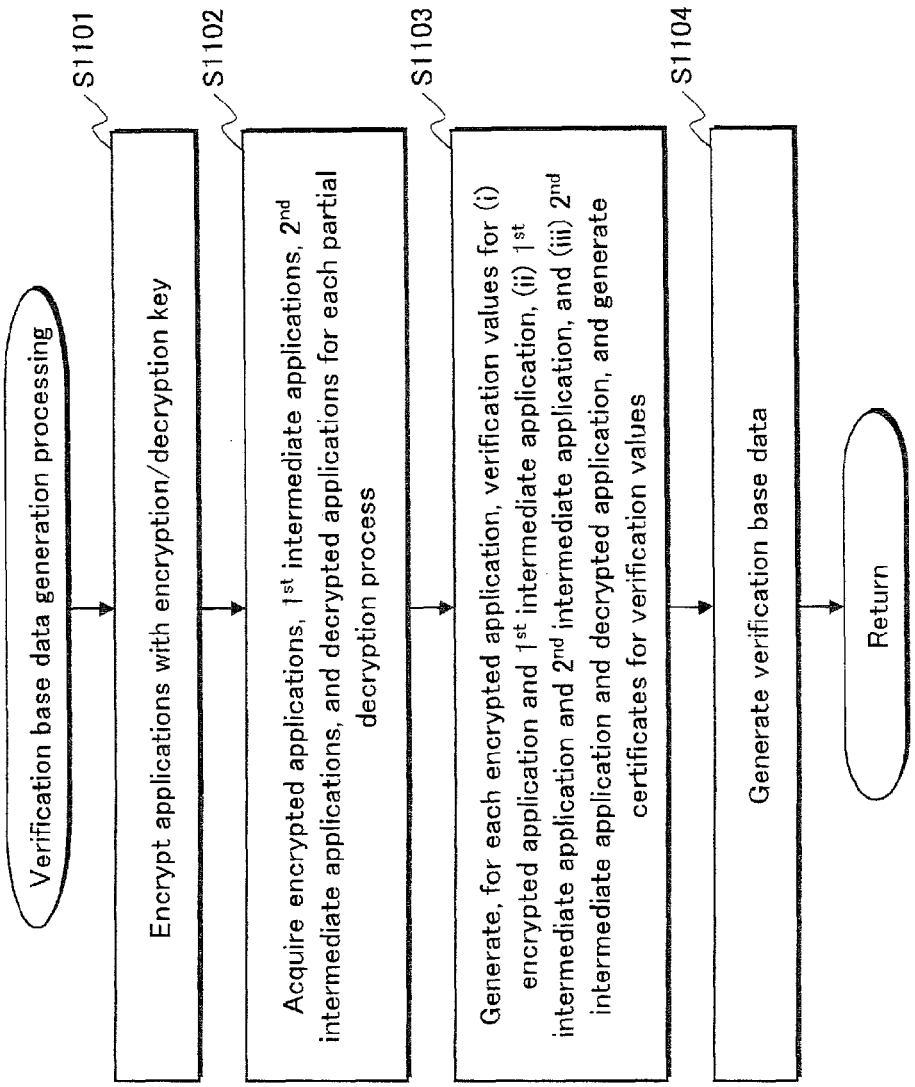
FIG. 18 is a flowchart showing operations of generating verification base data in the management device 200.

The following describes the operations of generation of the verification base data 640, with reference to FIG. 18.

The verification base data generation unit 609 reads the applications 110, 111, . . . , 114 from the software holding unit 608. Next, the verification base data generation unit 609 causes the decryption load unit 304 in the protection control module 120 stored in the software holding unit 608 to be in an executable state, and the decryption load unit 304 encrypts the applications 110, 111, . . . , 114 with use of the encryption/decryption key 631 according to the encryption algorithm E (step S1101).

The decryption load unit 304 decrypts the encrypted applications 110e, 111e, . . . , 114e according to the decryption algorithm D, and outputs, for each encrypted application, the first intermediate application, the second intermediate application, and the decrypted application, which are output data resulting from the partial decryption processes. The verification base data generation unit 609 receives, for each encrypted application, the encrypted application, the first intermediate application, the second intermediate application, and the decrypted application (step S1102).

The verification base data generation unit 609 controls the certificate generation unit 605 to generate, for each encrypted application, (i) a decryption verification value for a pair of the encrypted application and the first intermediate application, (ii) a decryption verification value for a pair of the first intermediate application and the second intermediate application, and (iii) a decryption verification value for a pair of the second intermediate application and the decrypted application. Then, the verification base data generation unit 609 generates the decryption processing certificate for each set of the decryption verification values in the first, second, and third partial decryption processes, with use of the signature private key 632 held in the signature private key holding unit 606 (step S1103).

Finally, the verification base data generation unit 609 generates the verification base data 640 including the first partial decryption process data 641, the second partial decryption process data 642, and the third partial decryption process data 643 (step S1104).

(4) Operations of Detection Processing

Figure 19:
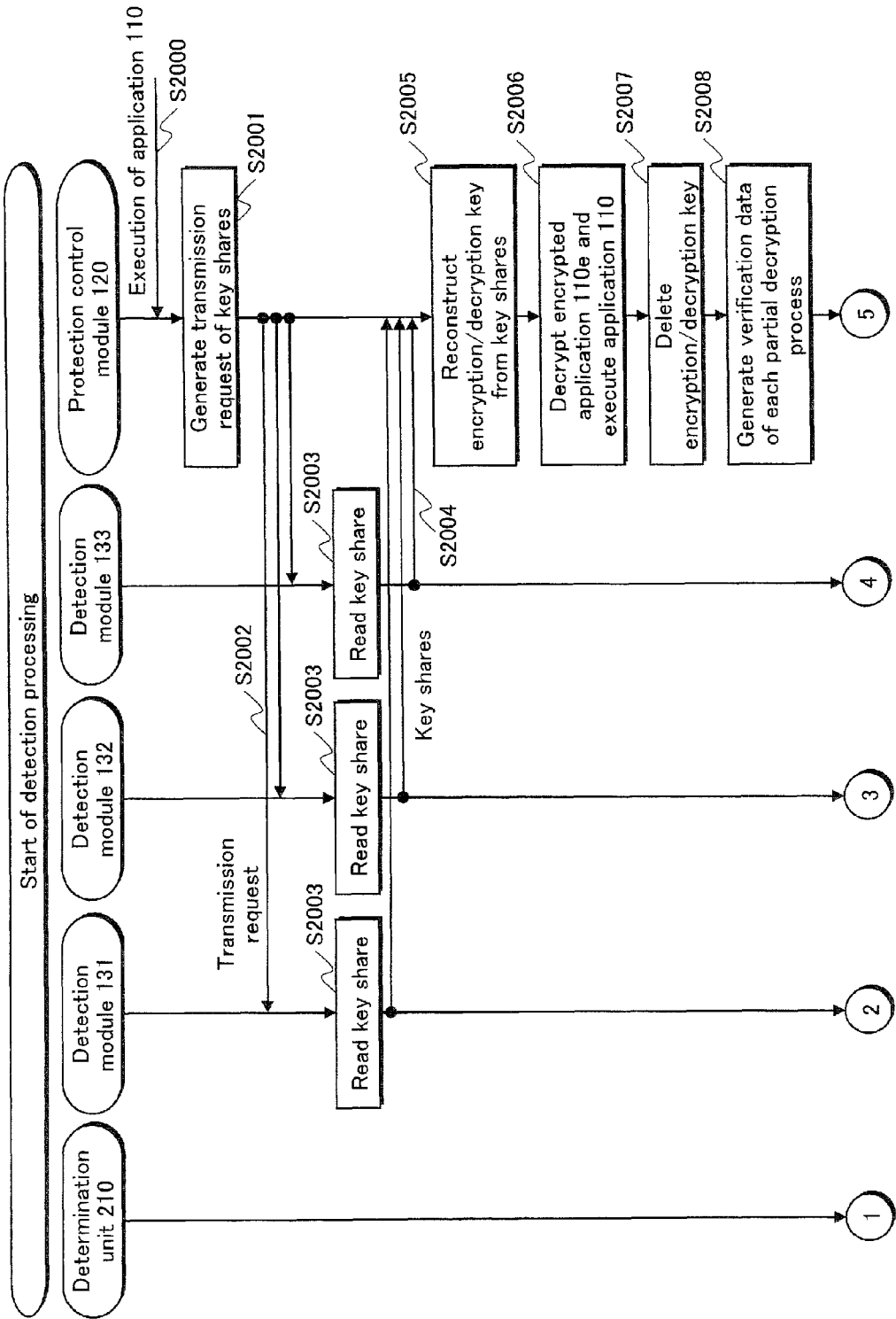
FIG. 19 is a sequence diagram showing operations of detection in the detection system 10, continuing to FIG. 20.
Figure 20:
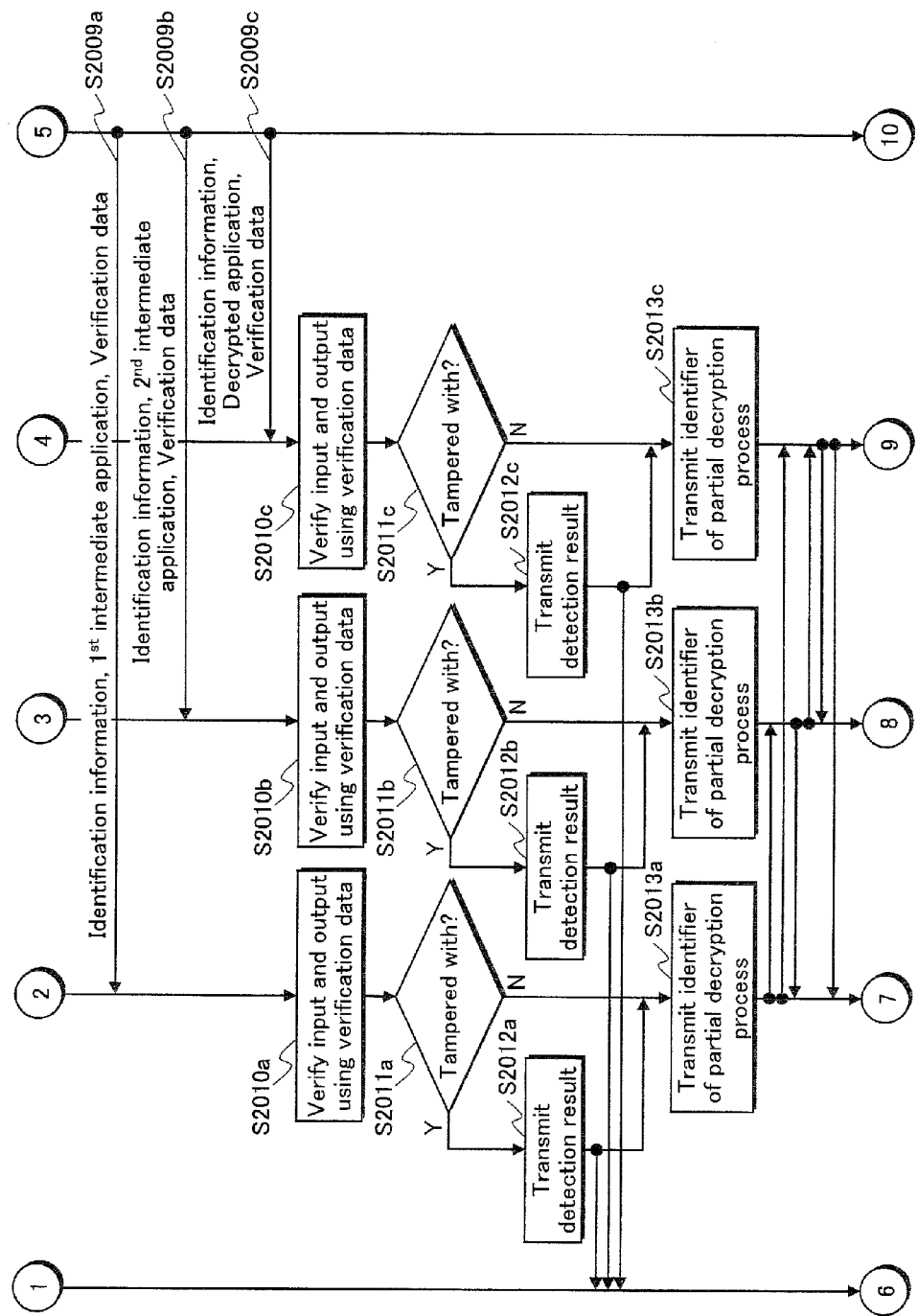
FIG. 20 is a sequence diagram showing operations of the detection in the detection system 10, continuing to FIG. 21.
Figure 21:
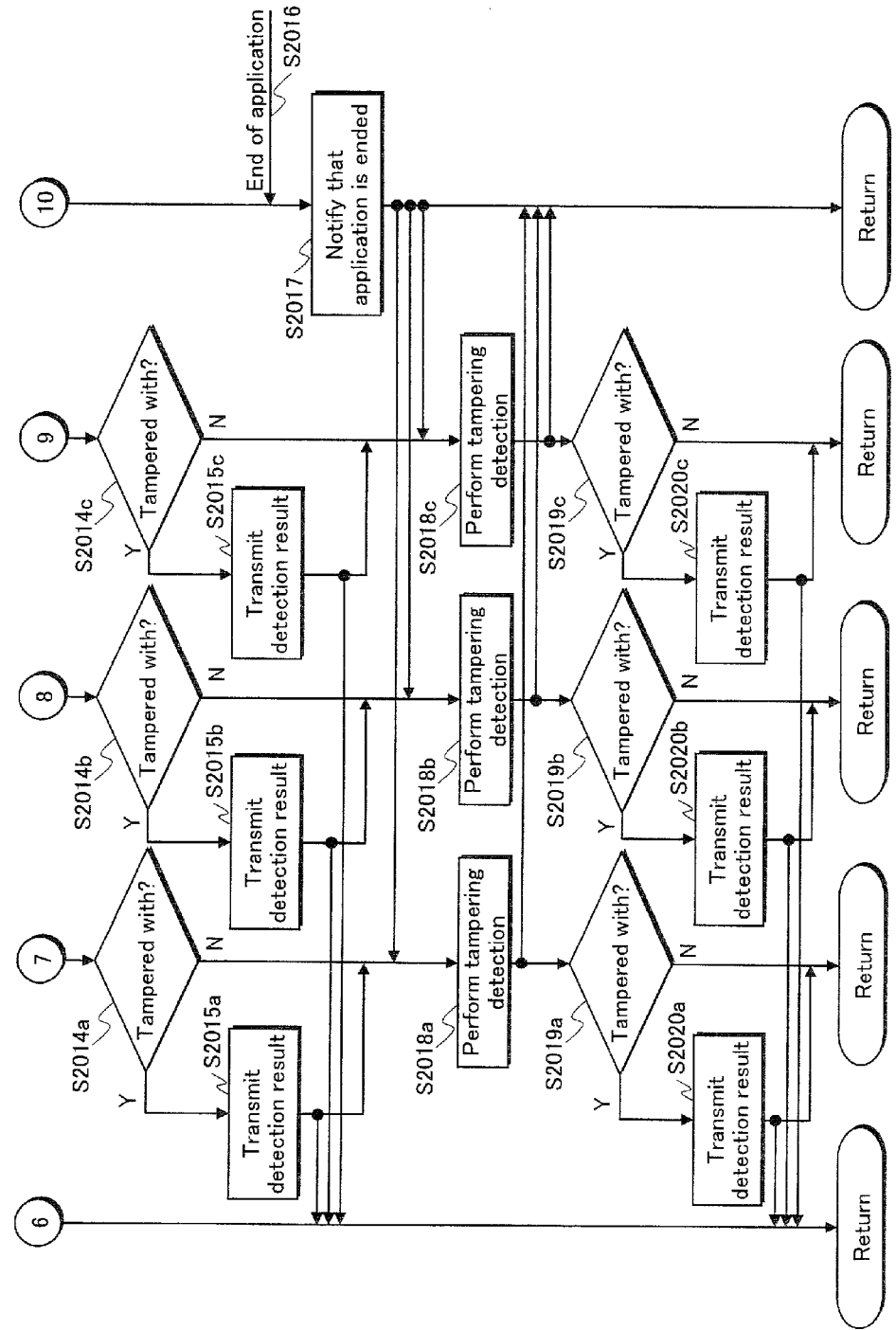
FIG. 21 is a sequence diagram showing operations of the detection in the detection system 10, continuing from FIG. 22.

The following describes details of the detection processing shown in step S200 in FIG. 16, with reference to the sequence diagrams shown in FIGS. 19 to 21.

When the initialization is completed, the device 100 is shipped from the factory and sent to the user. When the user is using the device 100 and the applications, the protection control module 120 in the device 100 performs control to achieve a decryption load function, a tampering detection function, an analysis tool detection function, etc., to protect the applications from attacks.

The following describes an example of verifying the protection control module 120 when executing the application 110.

A similar verification as in the application 110 is performed on the protection control module 120 when the applications 111, 112, 113, and 114 are executed. Therefore, a description thereof is omitted here.

When the applications are not executed, the tampering detection processing is performed on the protection control module 120, with use of the tampering detection certificate attached to the protection control module 120. In this case, a pre-calculated MAC value may be used.

The protection control module 120 receives a command for executing the application 110 (step S2000), generates a request for transmitting a key share (step S2001), and transmits the transmission request to each detection module (S2002).

In FIG. 19, the transmission request is transmitted to the detection modules 131, 132, and 133; however, the transmission request is also transmitted to the detection modules 134 and 135.

Each detection module receives the transmission request from the protection control module 120 (step S2002), reads the key share held therein (step S2003), and transmits the key share to the protection control module 120 (step S2004).

The protection control module 120 reconstructs the encryption/decryption key from the plurality of key shares (step S2005).

The decryption load unit 304 of the protection control module 120 decrypts the encrypted application 110e, and executes the application 110 (step S2006).

When the decryption of the encrypted application 110e is completed, the control unit 303 of the protection control module 120 deletes the reconstructed encryption/decryption key (step S2007).

Next, the protection control module 120 generates verification data for each partial decryption process, from the verification base data 640 held in the verification base data holding unit 308 (S2008).

The control unit 303 of the protection control module 120 transmits, via the transmission unit 302, the identification information indicating the application, the first intermediate application, and the verification data to the detection module 131 (step S2009a), the identification information indicating the application, the second intermediate application, and the verification data to the detection module 132 (step S2009b), and the identification information indicating the application, the decrypted application, and the verification data to the detection module 133 (step S2009c).

Each detection module verifies whether the correspondence between input and output of the partial decryption process is correct, with use of the verification data. Specifically, each detection module generates a decryption verification value from the verification data and either the intermediate application or the decrypted application that has been received, compares the generated decryption verification value to the decryption verification value in the verification data to determine whether the decryption verification values match. Furthermore, each detection module performs signature verification on the decryption processing certificate (steps S2010a, S2010b, and S2010c).

Each detection module determines that the protection control module 120 has been tampered with, if the verification using the verification data fails, i.e., if the decryption verification values do not match, or if the signature verification on the decryption processing certificate fails ("Y" in any of steps S2011a, S2011b, and S2011c), and transmits the detection result to the determination unit 210 (any of steps S2012a, S2012b, and S2012c). Each detection module determines that the protection control module 120 has not been tampered with, if the decryption verification values match, or if the signature verification on the decryption processing certificate is successful ("NO" in any of steps S2011a, S2011b, and S2011c), and transmits the identifier identifying the partial decryption process of the verification data to the other detection modules (any of steps S2013a, S2013b, and S2013c). Specifically, the detection module 131 transmits the notification indicating that the first partial decryption process has been verified, and the identifier identifying the first partial decryption process. Each detection module checks whether all the partial decryption processes by the protection control module 120 have been verified, with use of the identifiers identifying the partial decryption processes (any of steps S2014a, S2014b, and S2014c).

If not all of the partial decryption processes have been verified, or if more than one partial decryption process is transmitted to a single detection module, each detection module regards that the protection control module 120 has operated maliciously and determines that the protection control module 120 has been tampered with ("Y" in any of steps S2014a, S2014b, and S2014c), and transmits the detection result to the determination unit 210 (any of steps S2015a, S2015b, and S2015c).

If all the partial decryption processes have been verified ("N" in any of steps S2014a, S2014b, and S2014c), each detection module does nothing.

The protection control module 120 receives, from the OS 180, a notification indicating that the application is ended (step S2016), and transmits the notification to each of the detection modules (step S2017).

Upon receiving, from the protection control module 120, the notification indicating that the application is ended, or if the application is not being executed, each detection module performs tampering detection on the protection control module 120 with use of the tampering detection certificate 331 (any of steps S2018a, S2018b, and S2018c). Here, the verification unit 404 of each detection module may calculate the MAC value of the protection control module 120 with use of the verification key held in the verification unit 404, and may compare the calculated MAC value to the MAC value held in the verification unit 404. If the MAC values match, the verification unit 404 may determine that the protection control module 120 has not been tampered with. If the MAC values do not match, the verification unit 404 may determine that the protection control module 120 has been tampered with.

If the protection control module 120 is determined to have been tampered with ("Y" in any of steps S2019a, S2019b, and S2019c), each detection module notifies the detection result to the determination unit 210 (any of steps S2020a, S2020b, and S2020c).

If the protection control module 120 is determined not to have been tampered with ("N" in any of steps S2019a, S2019b, and S2019c), each detection module does nothing.

2.5 Effect of Detection System 10

In the detection system 10, the protection control module 120 holds the encryption/decryption key of the application in a period during execution of the application (steps S2000 to S2015 in FIG. 19), the period lasting from reconstruction of the encryption/decryption key from the plurality of key shares (step S2005) to deletion of the encryption/decryption key (step S2007).

In other words, during execution of the application, the protection control module 120 holds the encryption/decryption key only during the limited period from reconstruction of the encryption/decryption key (step S2005) to deletion of the encryption/decryption key (step S2007). This reduces the possibility that a malicious detection module, which has been tampered with, maliciously acquires the encryption/decryption key from the protection control module 120.

After the execution of the application is completed, i.e., when the application is not being executed (step S2015 onwards in FIG. 19), the protection control module 120 does not hold the encryption/decryption key of the application. As a result, even if the malicious detection module performs tampering detection of the protection control module 120 with use of the tampering detection certificate, the malicious detection module cannot acquire the encryption/decryption key. This means that the encryption/decryption key of the protection control module 120 does not leak, and security of the detection system 10 can be increased.

3. Embodiment 3

The following describes a detection system 10a (not shown) according to Embodiment 3 of the present invention.

3.1 Outline

In the detection system 10, the key shares are written into the detection modules. Then, when an application is to be decrypted and executed, the protection control module collects the key shares from the detection modules and temporarily reconstructs the encryption/decryption key from the collected key shares. During decryption of the encrypted application, the detection modules are not permitted to perform tampering detection using the tampering detection certificate or to perform tampering detection using a MAC value, in order to prevent a malicious detection module from maliciously acquiring the encryption/decryption key.

In the detection system 10a, the protection control module does not reconstruct the encryption/decryption key, and each of the detection modules partially decrypts the encrypted application.

In this way, even if the detection modules perform tampering detection by using the tampering detection certificate or a MAC value during decryption of an encrypted application, a malicious detection module cannot acquire the encryption/decryption key.

In the detection system 10a, RSA cryptography in the public key cryptosystem is used to encrypt and decrypt an application. The RSA cryptography is described in Non-Patent Literature 1. Therefore, a description thereof is omitted here.

In the following description regarding the detection system 10a, M denotes an application in plaintext. $M\hat{\ }e$ denotes encryption using a public key e in the RSA cryptosystem. C denotes an encrypted application. Accordingly, $C=M\hat{\ }e$. Also, $C\hat{\ }d$ denotes decryption using a private key d in the RSA cryptosystem. Accordingly, $M=C\hat{\ }d$. Also, $a\hat{\ }b$ denotes an operation of raising a by the power of b.

3.2 Structure of Detection System 10a

The detection system 10a has a similar structure to the detection system 10. The following description focuses on the differences from the detection system 10.

The software holding unit 608 in the software distribution unit 220 of the management device 200 stores therein a protection control module 120a instead of the protection control module 120, and a detection module group 130a instead of the detection module group 130. The detection module group 130a includes detection modules 131a, 132a, 133a, 134a, and 135a.

Also, the device 100 has the protection control module 120a and the detection module group 130a installed therein, instead of the protection control module 120 and the detection module group 130.

(1) Software Distribution Unit 220 of Management Device 200

The encryption/decryption key holding unit 607 in the software distribution unit 220 of the management device 200 stores therein a private key d (631a) instead of the encryption/decryption key d (631).

Figure 22:
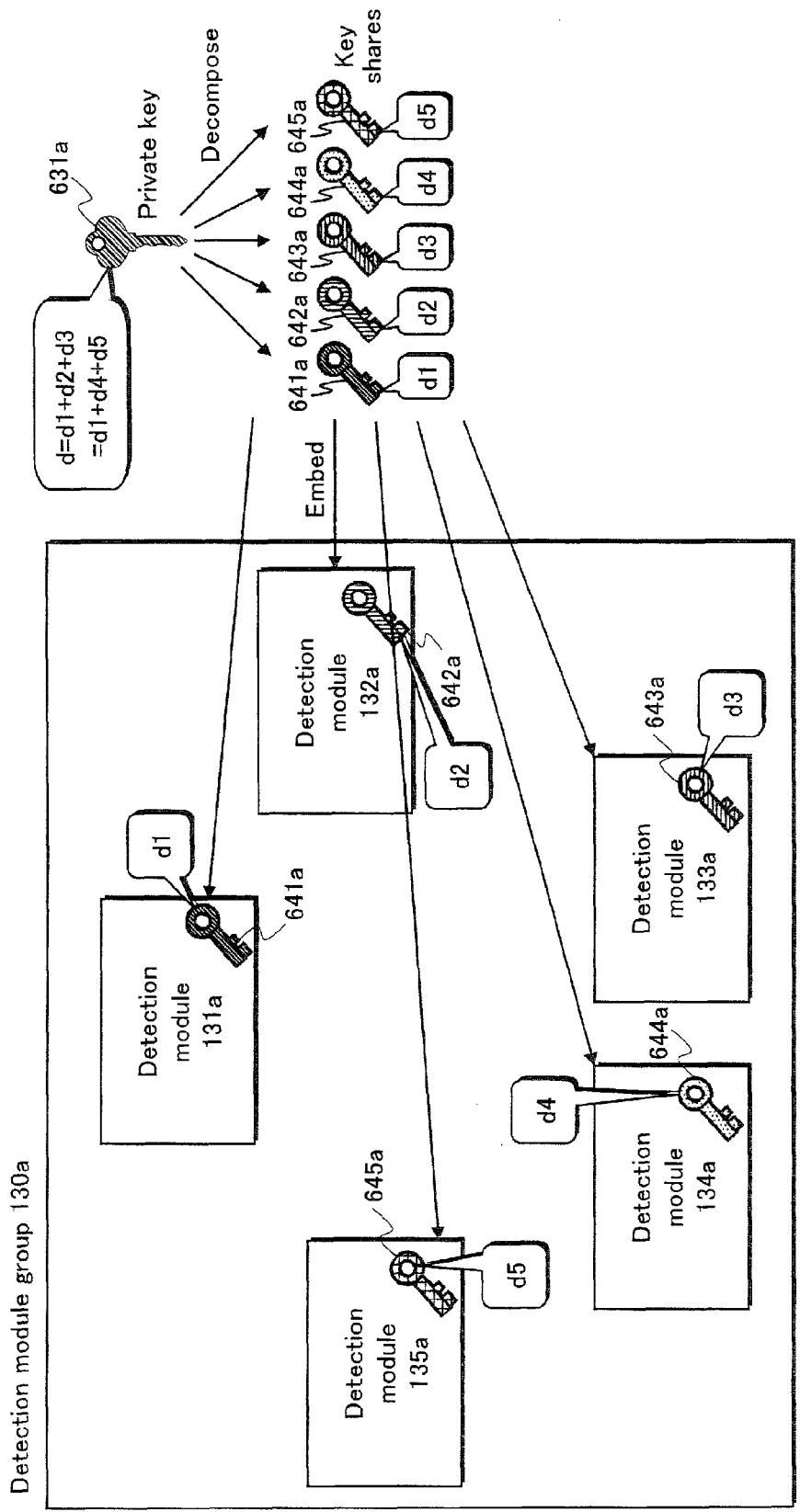
FIG. 22 is a schematic diagram showing decomposition of a private key 631a into key shares and output of the key shares to a detection module group 130a in a detection system 10a, according to Embodiment 3 of the present invention.

As shown in FIG. 22 as an example, the key share generation unit 610 in the software distribution unit 220 of the management device 200 decomposes the private key d (631a) into a plurality of key shares, i.e., a key share d1(641a), a key share d2(642a), a key share d3(643a), a key share d4(644a), and a key share d5(645a), such that d=d1+d2+d3=d1+d4+d5 is satisfied.

Specifically, the key share generation unit 610 generates a random number r1 and treats the random number r1 as the key share d1(641a), generates a random number r2 and treats the random number r2 as the key share d2(642a), and generates a random number r3 and treats the random number r3 as the key share d4(644a).

d1=r1
d2=r2
d4=r3

Next, the key share generation unit 610 calculates the key share d3(643a) using d3=d−d1−d2, and calculates the key share d5(645a) using d5=d−d1−d4.

Since the key shares d1, d2, d3, d4, and d5 are generated from the private key d, d=d1+d2+d3=d1+d4+d5 is satisfied.

Next, as shown in FIG. 22, the key share generation unit 610 transmits the key shares d1(641a), d2(642a), . . . , d5(645a) to the detection modules 131a, 132a, 133a, 134a, and 135a of the detection module group 130a of the device 100, via the control unit 603, the transmission unit 602, the communication unit 230, and the network 20.

The detection modules 131a, 132a, 133a, 134a, and 135a store the key shares d1 (641a), d2(642a), . . . , d5(645a), respectively.

(2) Protection Control Module 120a

Figure 23:
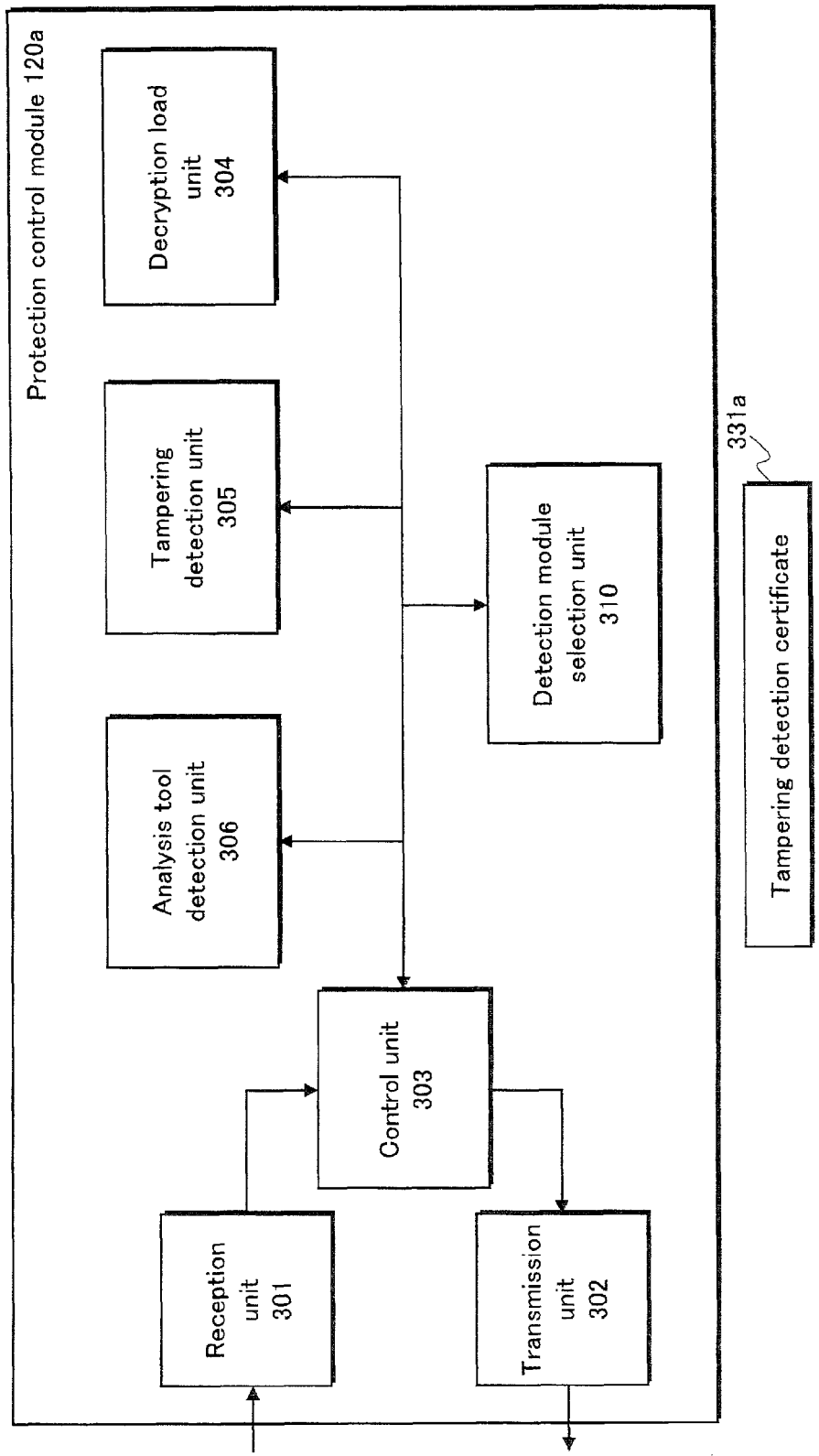

As shown in FIG. 23, the protection control module 120a includes the reception unit 301, the transmission unit 302, the control unit 303, the decryption load unit 304, the tampering detection unit 305, the analysis tool detection unit 306, and a detection module selection unit 310.

The protection control module 120a has attached thereto a tampering detection certificate 331a. The tampering detection certificate 331a is a certificate for detecting tampering of the protection control module 120a per se, similarly to the tampering detection certificate 331.

Note that components having the same functions as those in the protection control module 120 are indicated by the same reference signs, and descriptions thereof are omitted.

In comparison to the structure of the protection control module 120, the protection control module 120a does not include the encryption/decryption key reconstruction unit 307, the verification base data holding unit 308, and the verification data generation unit 309. Meanwhile, the protection control module 120a includes the detection module selection unit 310, which is not included in the protection control module 120.

(3) Detection Module Selection Unit 310

During the decryption processing of an encrypted application, the detection module selection unit 310 selects detection modules for decrypting the encrypted application.

Figure 24:
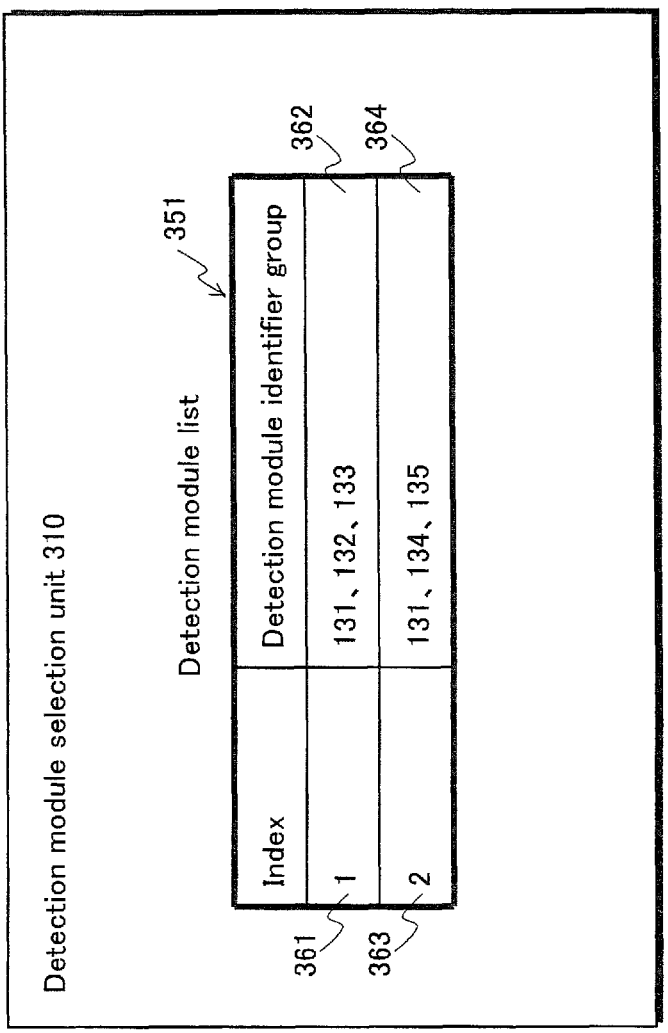
FIG. 24 shows one example of the data structure of a detection module list 351 of a detection module selection unit 310.

As shown in FIG. 24 as an example, the detection module selection unit 310 holds a detection module list 351 which shows groups of detection modules that are caused to decrypt an encrypted application.

The detection module list 351 holds a plurality of combinations each consisting of an index and a detection module identifier group. Each combination indicates a plurality of detection modules that are caused to decrypt an encrypted application.

Each index is identification information for identifying the corresponding detection module identifier group. Each detection module identifier group includes a plurality of detection module identifiers. Each detection module identifier is identification information for identifying a corresponding one of detection modules. These detection modules are caused to decrypt an encrypted application. Each of the detection modules stores therein a key share for decrypting an encrypted application.

As shown in FIG. 24, the detection module list 351 includes combinations, such as a combination that consists of an index 361 "1" and a detection module identifier group 362 including detection module identifiers "131", "132", and "133", and a combination that consists of an index 363 "2" and a detection module identifier group 364 including detection module identifiers "131", "134", and "135".

Here, the detection modules identified by the detection module identifiers "131", "132", "133", "134", and "135" are the detection modules 131a, 132a, 133a, 134a, and 135a, respectively.

Accordingly, it is possible to reconstruct the private key from the key shares stored in all detection modules identified by the detection module identifiers in a detection module identifier group in one of the combinations in the detection module list 351.

For example, the detection module identifier group 362 corresponding to the index 361 "1" includes the detection module identifiers "131", "132", and "133". The detection module identifiers "131", "132", and "133" identify the detection module 131a, 132a, and 133a, respectively. As shown in FIG. 22, the detection modules 131a, 132a, and 133a store therein the key share d1(641a), the key share d2(642a), and the key share d3(643a), respectively. The private key 631a can be calculated by adding the key share d1(641a), the key share d2(642a), and the key share d3(643a).

Similarly, regarding the detection module identifier group 364 corresponding to the index 363 "2", the private key 631a can be calculated by adding the key share d1 (641a), the key share d4(644a), and the key share d5(645a) stored in the detection modules identified by the detection module identifiers "131", "134", and "135" in the detection module identifier group 364.

As shown in FIG. 24, the detection module list 351 includes two combinations; however, it is not limited to such. The detection module list 351 may further include additional combinations.

The detection module selection unit 310 randomly selects, by control of the control unit 303, one index from the detection module list 351 during decryption of an encrypted application. Next, the detection module selection unit 310 extracts the detection module identifier group corresponding to the selected index, and outputs the detection module identifier group to the control unit 303.

(4) Structure of Detection Module 131a

Figure 25:
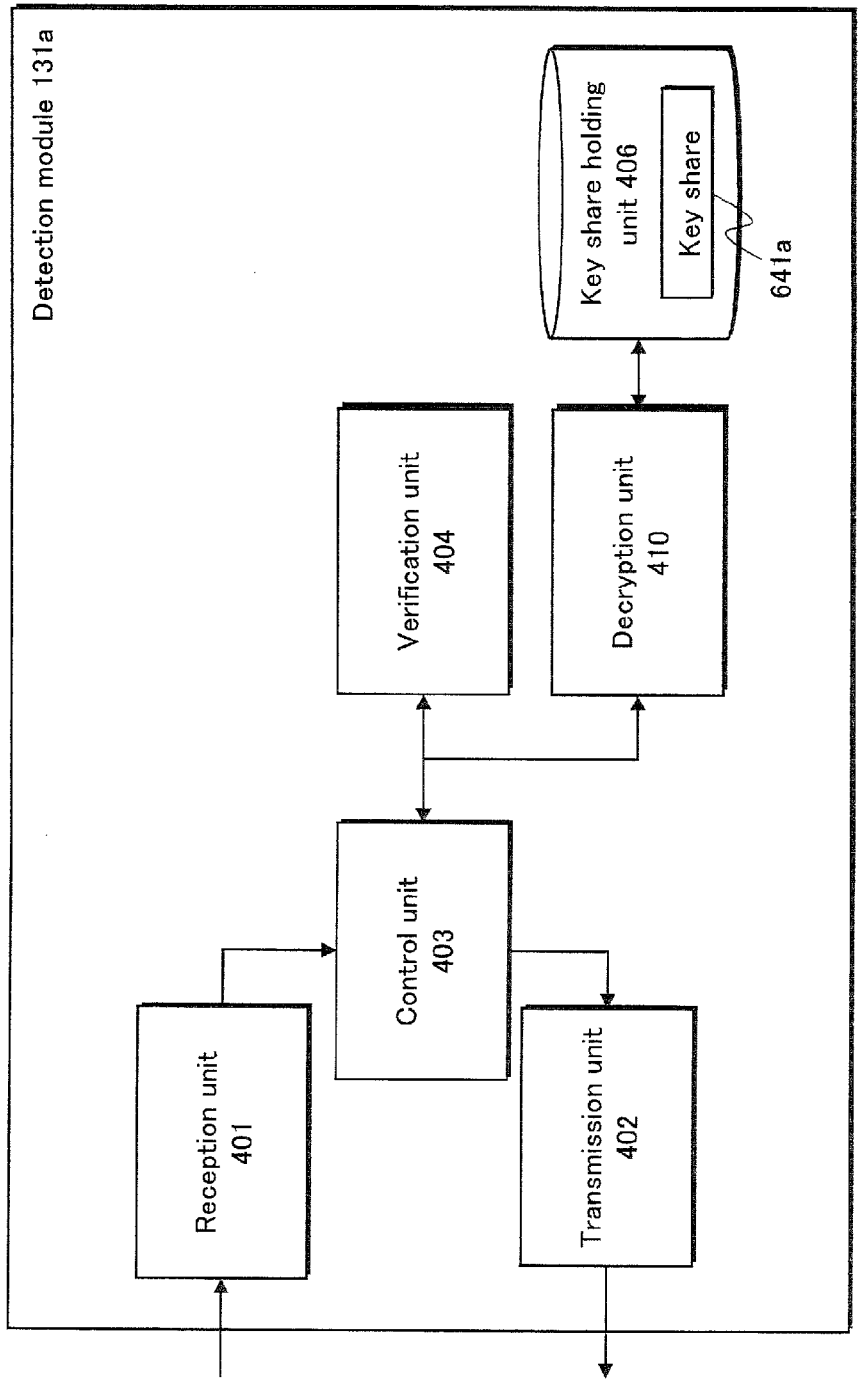

As shown in FIG. 25, the detection module 131a is composed of the reception unit 401, the transmission unit 402, the control unit 403, the verification unit 404, the key share holding unit 406, and a decryption unit 410.

Note that components having the same functions as those in the detection module 131 are indicated by the same reference signs, and descriptions thereof are omitted.

In comparison to the structure of the detection module 131, the detection module 131a does not include the verification data holding unit 405. Also, the detection module 131a includes the decryption unit 410, which is not included in the detection module 131.

The detection modules 132a, 133a, 134a, and 135a have a similar structure to the detection module 131a. Therefore, a description thereof is omitted here.

The decryption unit 410 decrypts an encrypted application C (110) with use of the key share d1(641a) held by the key share holding unit 406 according to the RSA cryptosystem, and thereby generates a partially decrypted text M1.

M1=C^d1

Next, the decryption unit 410 outputs the partially decrypted text M1 to the protection control module 120a, via the control unit 403 and the transmission unit 402.

Similarly, the decryption unit 410 of the detection module 132a decrypts the encrypted application C (110) with use of the key share d2(642a) held by the key share holding unit 406 of the detection module 132a according to the RSA cryptosystem, and thereby generates a partially decrypted text M2.

M2=C^d2

Next, the decryption unit 410 outputs the partially decrypted text M2 to the protection control module 120a, via the control unit 403 and the transmission unit 402.

Similarly, the decryption unit 410 of the detection module 133a decrypts the encrypted application C (110) with use of the key share d3(643a) held by the key share holding unit 406 of the detection module 133a according to the RSA cryptosystem, and thereby generates a partially decrypted text M3.

M3=C^d3

Next, the decryption unit 410 outputs the partially decrypted text M3 to the protection control module 120a, via the control unit 403 and the transmission unit 402.

Similar processing as described above is performed by the decryption unit 410 of the detection module 134a and the decryption unit 410 of the detection module 135a.

Figure 26:
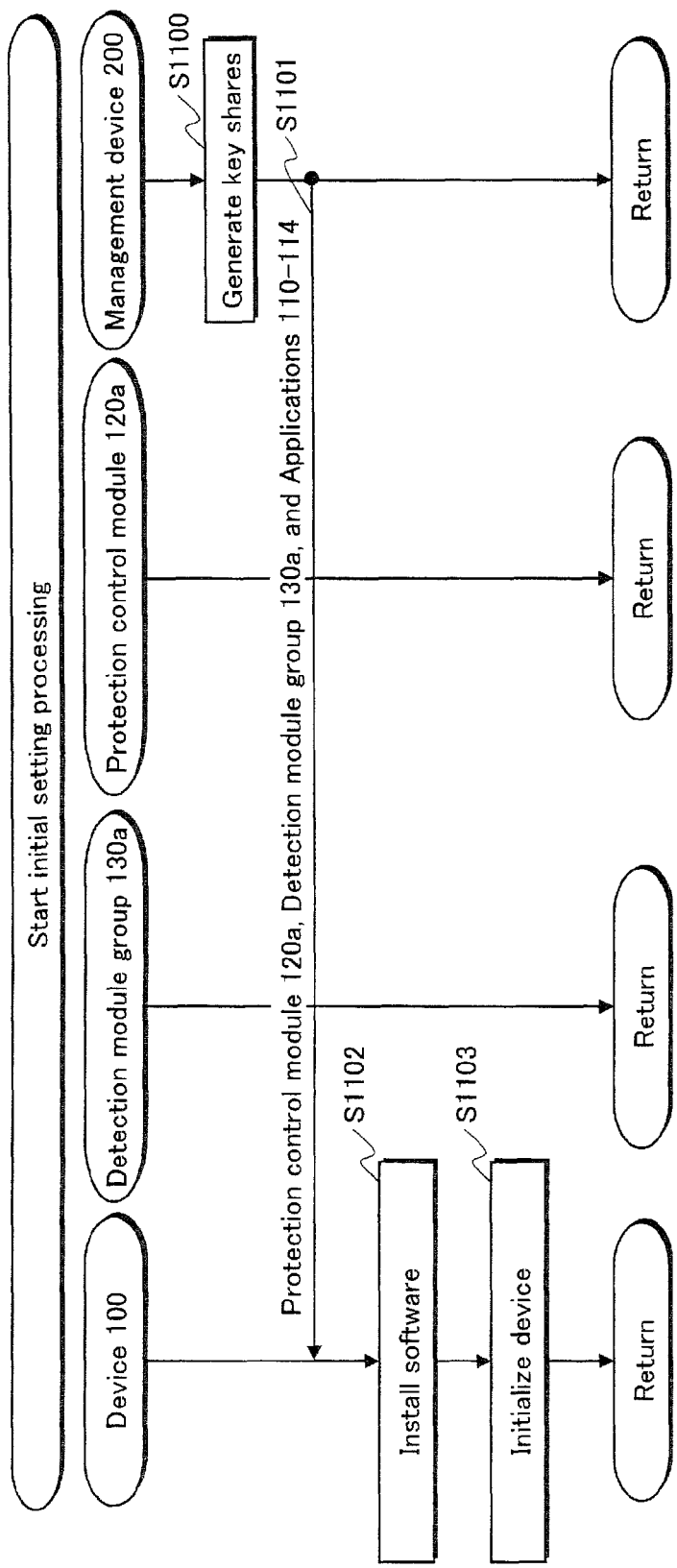

3.3 Operations of Detection System 10a (1) Operations of Initial Setting Processing The following describes initial setting processing in the detection system 10a, with reference to the sequence diagram of FIG. 26.

When the device 100 is manufactured in a factory, the key share generation unit 610 in the software distribution unit 220 of the management device 200 generates a plurality of key shares 641a, 642a, . . . , 645a by decomposing the private key 631a held in the encryption/decryption key holding unit 607, and writes each of the plurality of key shares 641a, 642a, . . . , 645a in a different one of the detection modules 131a, 132a, . . . , 135a held in the software holding unit 608 (step S1100).

Next, the control unit 603 transmits the protection control module 120a, the detection module group 130a, applications 110a, 111a, . . . , 114a, and other computer programs necessary for the operations of the device 100, to the device 100 via the transmission unit 602 and the communication unit 230. Each of the computer programs has a certificate (tampering detection certificate) attached thereto, which is used to verify whether the computer program has been tampered with. Note that the applications 110a, 111a, . . . , 114a have been encrypted. The device 100 receives the protection control module 120a, the detection module group 130a, the applications 110a, 111a, . . . , 114a, and the other computer programs to each of which the certificate is attached (step S1101).

The protection control module 120a, the detection module group 130a, the applications 110a, 111a, . . . , 114a, and the other computer programs to each of which the certificate is attached are installed in the EEPROM 172 of the device 100 (step S1102).

After the installation of the computer programs is completed, computer programs for performing the initial setting of the device 100, testing whether the device 100 operates normally, etc., are executed to initialize the device 100 (step S1103).

(2) Operations of Detection Processing

Figure 27:
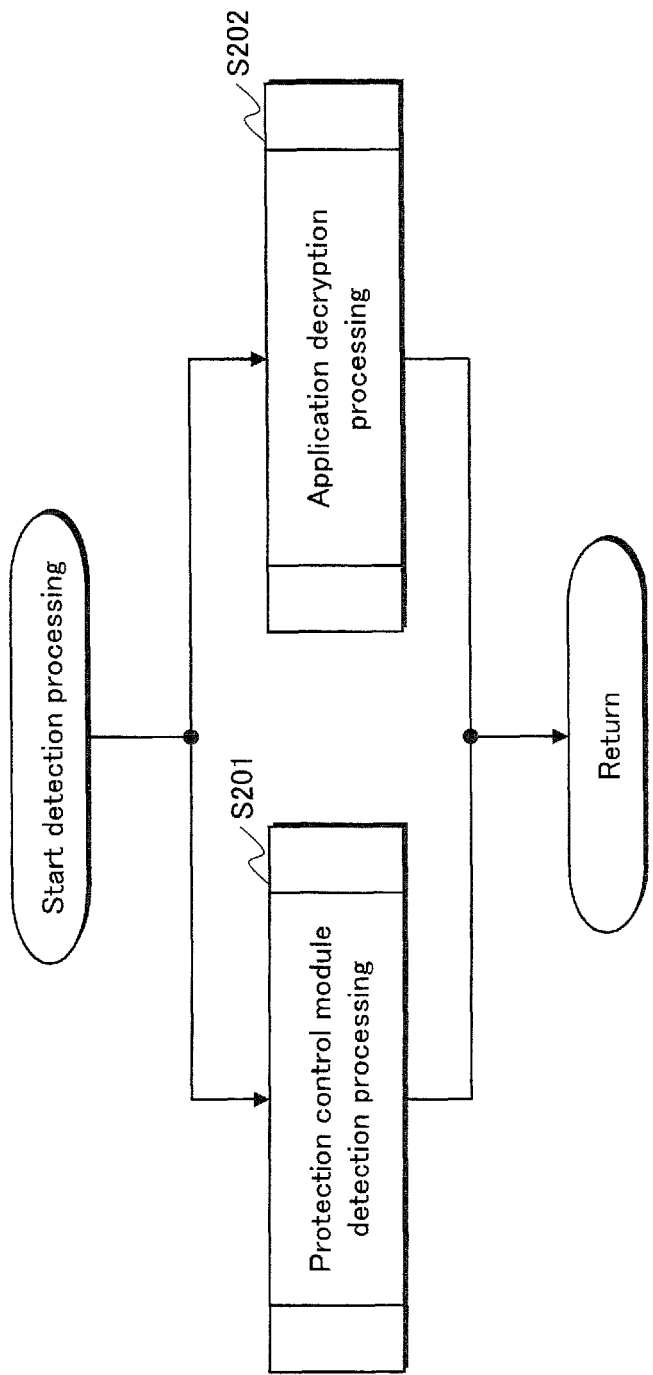

The following describes operations of the detection processing in the detection system 10a, with reference to the flowchart of FIG. 27.

The detection processing includes protection control module detection processing (S201) and application decryption processing (S202) which are performed in parallel. In other words, the protection control module detection processing (S201) and the application decryption processing (S202) are performed in the same time period.

The protection control module detection processing is performed to detect whether the protection control module 120a has been tampered with. The application decryption processing is performed, at the time of executing an application, to decrypt the application with use of key shares embedded in detection modules.

Details of the protection control module detection processing and the application decryption processing are described below.

Note that the protection control module detection processing is performed either regularly or irregularly regardless of whether the application decryption processing is being performed.

(2-1) Operations of Protection Control Module Detection Processing

During the protection control module detection processing, the detection modules 131a, 132a, 133a, 134a, and 135a perform tampering detection of the protection control module 120a with use of the tampering detection certificate 331a.

Note that each detection module may perform the tampering detection by calculating a MAC value of the protection control module 120a with use of the verification key held in the verification unit 404, and comparing the calculated MAC value to the MAC value held in the verification unit 404. If the MAC values match, the verification unit 404 may determine that the protection control module 120a has not been tampered with. If the MAC values do not match, the verification unit 404 may determine that the protection control module 120a has been tampered with.

Figure 28:
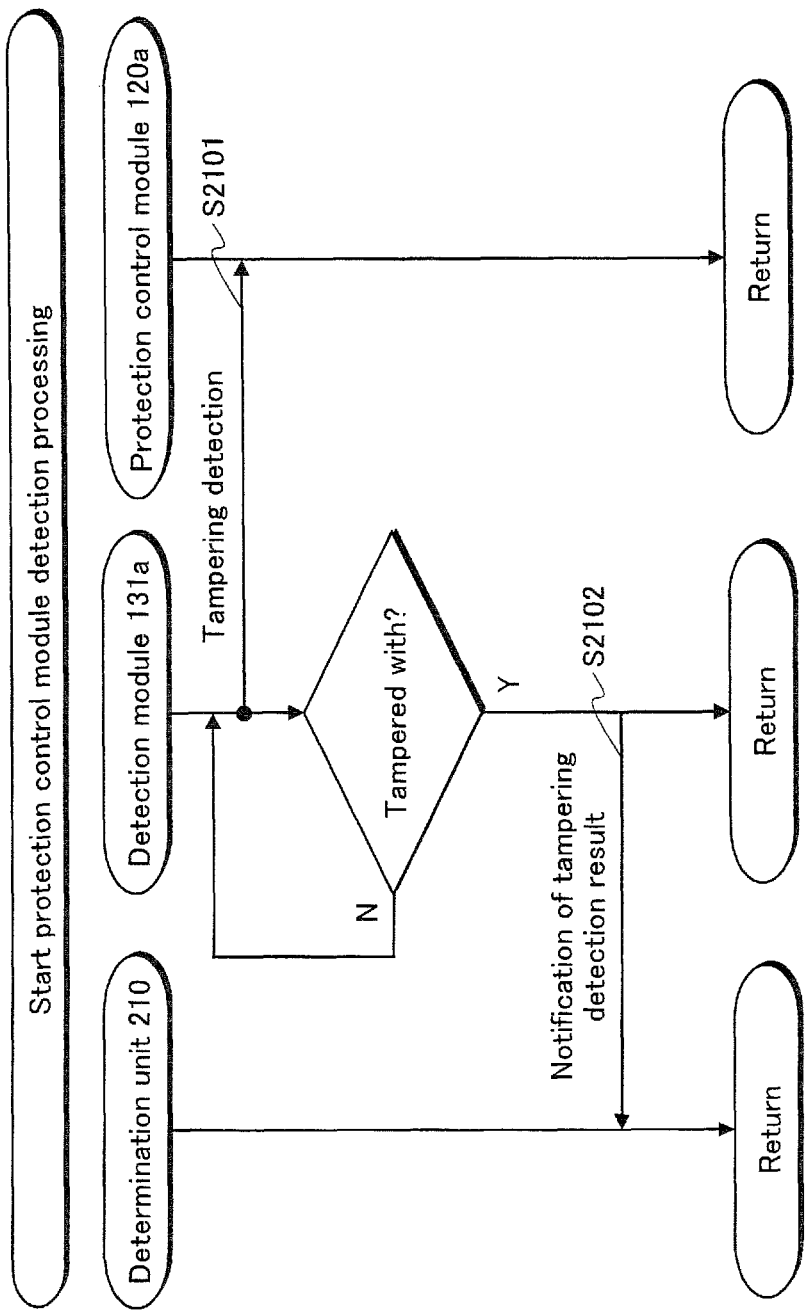

The following describes operations of the tampering detection of the protection control module, with reference to FIG. 28.

Note that FIG. 28 is simplified to show only the detection module 131a performing the tampering detection of the protection control module 120a. However, similar processing is of course performed by the detection modules 132a, 133a, 134a, and 135a.

The detection module 131a performs tampering detection on the protection control module 120a, with use of the tampering detection certificate 331a (step S2101).

If the protection control module 120a is determined to have been tampered with ("Y" in S2101), the detection module 131a notifies the determination unit 210 of the management device 200 of the detection result indicating that the protection control module 120a has been tampered with (S2102).

If the protection control module 120a is determined not to have been tampered with ("N" in step S2101), the detection module 131a does not notify the determination unit 210 of the detection result and returns to the tampering detection processing (step S2101).

The determination unit 210 receives tampering detection results from the detection modules 131a, 132a, 133a, 134a, and 135a.

(2-2) Operations of Decrypting Encrypted Application

Figure 29:
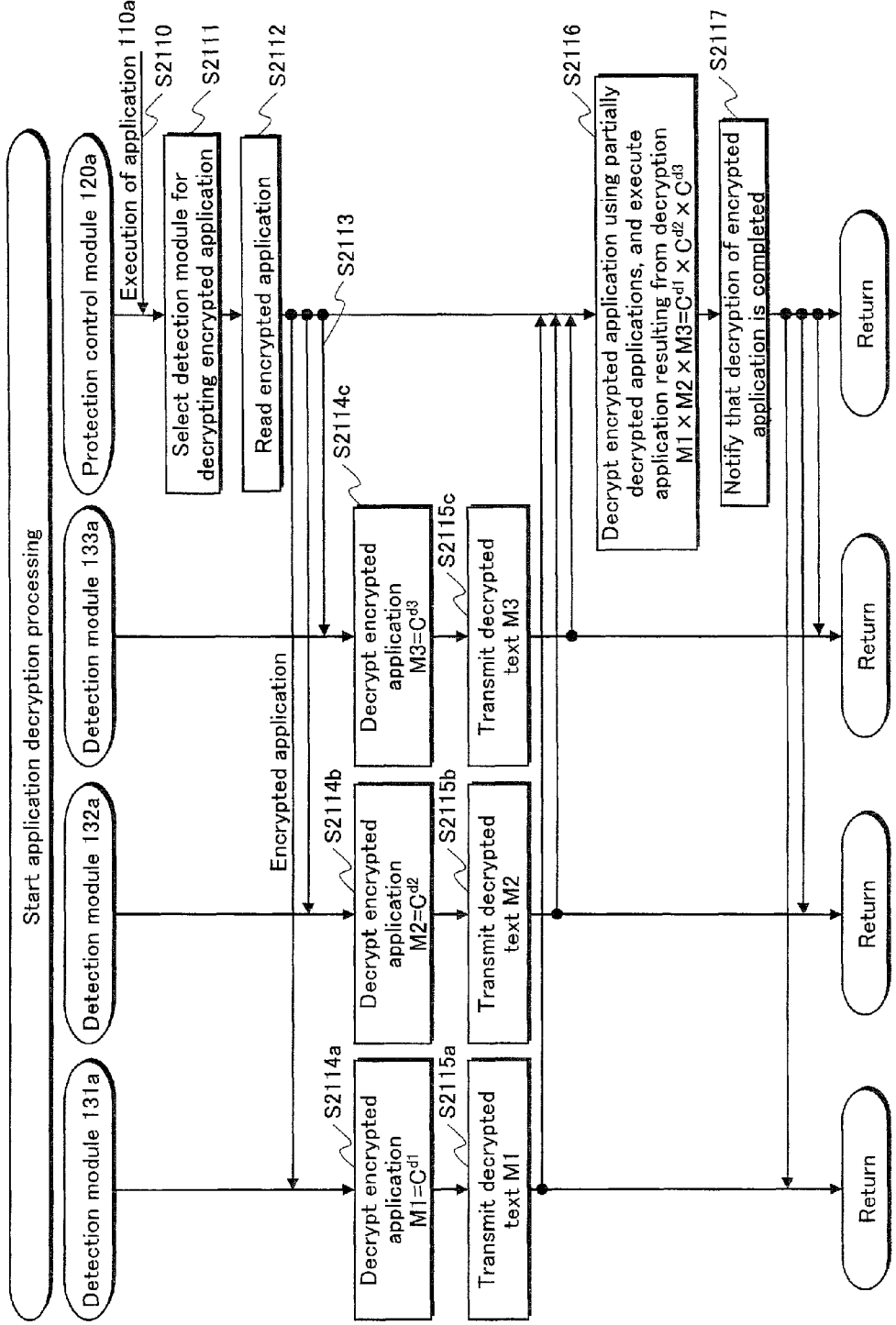

The following describes operations of decrypting an encrypted application in the detection system 10a, with reference to the sequence diagram of FIG. 29.

Upon receiving a command for executing the application 110a (step S2110), the detection module selection unit 310 of the protection control module 120a selects a detection module that is caused to decrypt an encrypted application C (step S2111). In the present example, the detection modules 131a, 132a, and 133a are selected.

Next, the protection control module 120a reads the encrypted application C (step S2112), and transmits the encrypted application C to the selected detection module (step S2113).

Each of the detection modules receives the encrypted application C (step S2113), and partially decrypts the encrypted application C with use of the key share held therein (steps S2114a, S2114b, and S2114c). Specifically, the detection module 131a calculates a partially decrypted text M1=C^d1, by decrypting the encrypted application C with use of the key share d1 held therein (step S2114a); the detection module 132a calculates a partially decrypted text M2=C^d2, by decrypting the encrypted application C with use of the key share d2 held therein (step S2114b); and the detection module 133a calculates a partially decrypted text M3=C^d3, by decrypting the encrypted application C with use of the key share d3 held therein (step S2114c).

Each of the detection modules transmits the partially decrypted application to the protection control module 120a (steps S2115a, S2115b, and S2115c). The detection module 131a transmits the partially decrypted text M1 to the protection control module 120a (step S2115a); the detection module 132a transmits the partially decrypted text M2 to the protection control module 120a (step S2115b), and the detection module 133a transmits the partially decrypted text M3 to the protection control module 120a (step S2115c).

The protection control module 120a receives the partially decrypted texts M1, M2, and M3 resulting from the respective partial decryption processes by the detection modules (steps S2115a, S2115b, and S2115c).

The protection control module 120a decrypts the encrypted application with use of the partially decrypted texts resulting from the partial decryption processes, and executes an application obtained as a result of the decryption (step S2116). Specifically, the application is generated by multiplication of the partially decrypted text M1, the partially decrypted text M2, and the partially decrypted text M3.

$$M1 \times M2 \times M3 = (C^{\wedge}d1) \times (C^{\wedge}d2) \times (C^{\wedge}d3)$$
$$= C^{\wedge}(d1 + d2 + d3)$$
$$= C^{\wedge}d$$
$$= (M^{\wedge}e)^{\wedge}d$$
$$= M^{\wedge}(e \times d)$$
$$= M^{\wedge}1$$
$$= M$$

Accordingly, an application M in plaintext is obtained.

When the decryption of the encrypted application is completed, the protection control module 120a notifies each detection module that the decryption of the encrypted application is completed (step S2117).

(2-3) Relationship Between Protection Control Module Detection Processing and Application Decryption Processing As described above, the protection control module detection processing and the application decryption processing are performed in parallel. The protection control module 120a rarely operates except during decryption of an application. Therefore, the frequency of the protection control module detection processing may be decreased except during decryption of an application. During decryption of an application, however, the protection control module 120a operates frequently to protect the application. Therefore, the frequency of the protection control module detection processing may be increased. Note that "during decryption of an application" refers to a period from steps S2115a, S2115b, and S2115c in FIG. 29 in which decrypted texts obtained by the partial decryption processes are transmitted from the detection modules to the protection control module 120a, to step S2117 in which the protection control module 120a notifies the detection modules that decryption of the application is completed.

3.4 Effect of Detection system 10a

In the detection system 10a, the private key of an application is not reconstructed inside the protection control module 120a. This prevents a leak of the private key of the application even if the protection control module 120a has been tampered with.

Also, the detection modules can perform tampering detection on the protection control module 120a with use of the tampering detection certificate, regardless of whether an application is being decrypted.

In this way, even if the protection control module 120a is tampered with, the tampering can be immediately detected, thus increasing security of the system.

4. Embodiment 4

The following describes a detection system 10b (not shown) according to Embodiment 4 of the present invention.

4.1 Outline

In the detection system 10b, the key shares held by the detection modules are updated.

Tampering with any of the detection modules may lead to a failure in reconstruction of the encryption/decryption key in the detection system 10 or a failure in decryption of an encrypted application in the detection system 10a. Note that Patent Literature 3 provides detailed descriptions of mutual monitoring processing for detecting a detection module that has been tampered with, and of module identification processing for identifying a detection module that has been tampered with. Therefore, descriptions thereof are omitted here.

In the detection system 10b, the key shares held by the detection modules are updated so as to enable reconstruction of the encryption/decryption key and decryption of an encrypted application.

4.2 Structure of Detection System 10b

The detection system 10b has a similar structure to the detection system 10a. The following description focuses on the differences from the detection system 10a.

The software holding unit 608 in the software distribution unit 220 of the management device 200 stores therein a detection module group 130b instead of the detection module group 130a. The detection module group 130b includes detection modules 131b, 132b, 133b, 134b, and 135b.

Also, the device 100 has the detection module group 130b installed therein, instead of the detection module group 130a.

Figure 30:
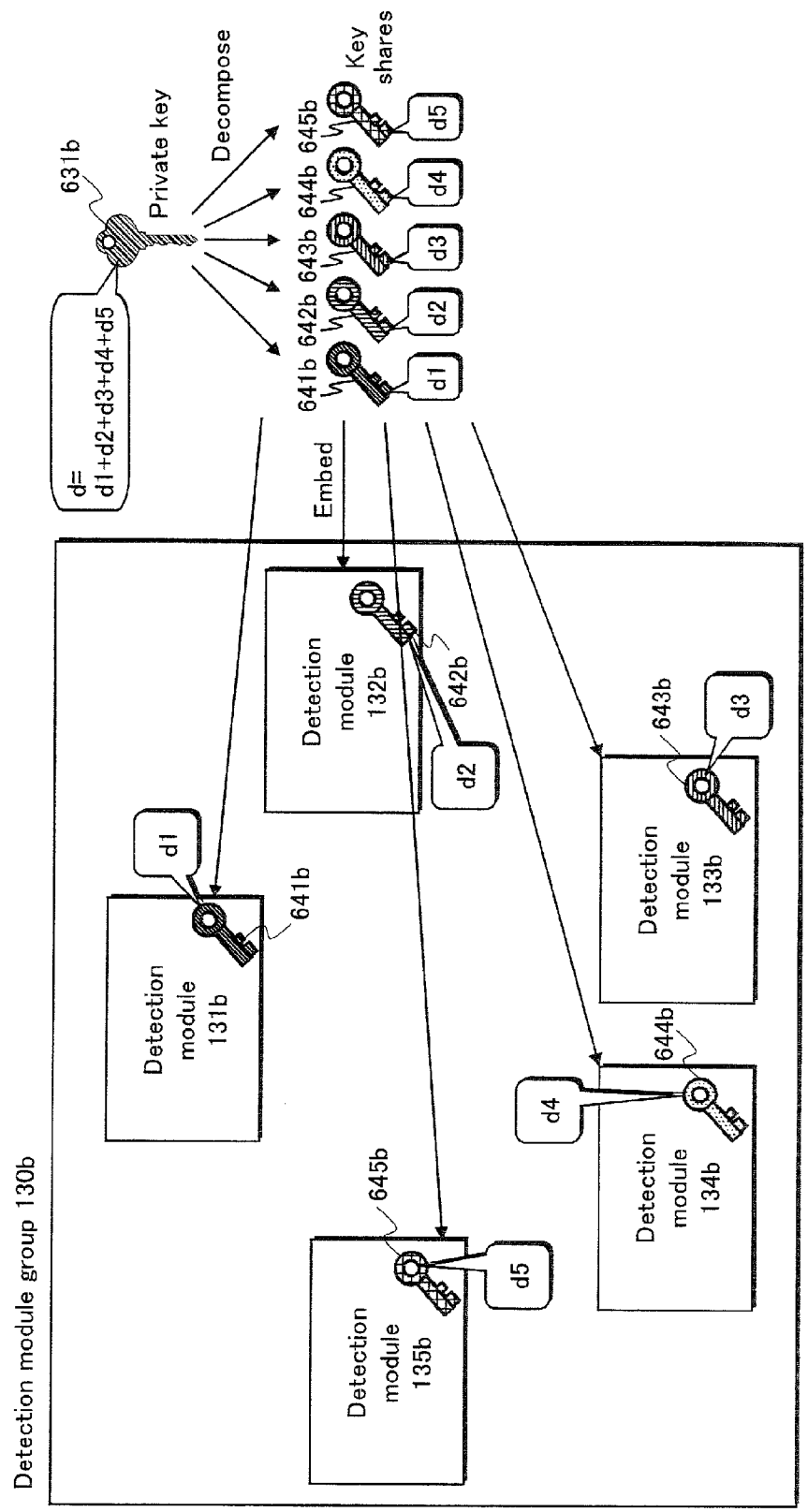
FIG. 30 is a schematic diagram showing decomposition of a private key 631b into key shares and output of the key shares to a detection module group 130b in a detection system 10b, according to Embodiment 4 of the present invention.

As shown in FIG. 30, in the detection system 10b, it is assumed that the plurality of key shares d1(641b), d2(642b), d3(643b), d4(644b), and d5(645b) generated from the private key d (631b) are written in the detection modules 131b, 132b, 133b, 134b, and 135b of the detection module group 130b. Also, it is assumed that d=d1+d2+d3+d4+d5 is satisfied.

(1) Determination Unit 210

The determination unit 210 identifies a detection module that has been tampered with, within the detection module group 130b. Patent Literature 3 provides detailed descriptions of identification of a detection module that has been tampered with. Therefore, descriptions thereof are omitted here.

Figure 31:
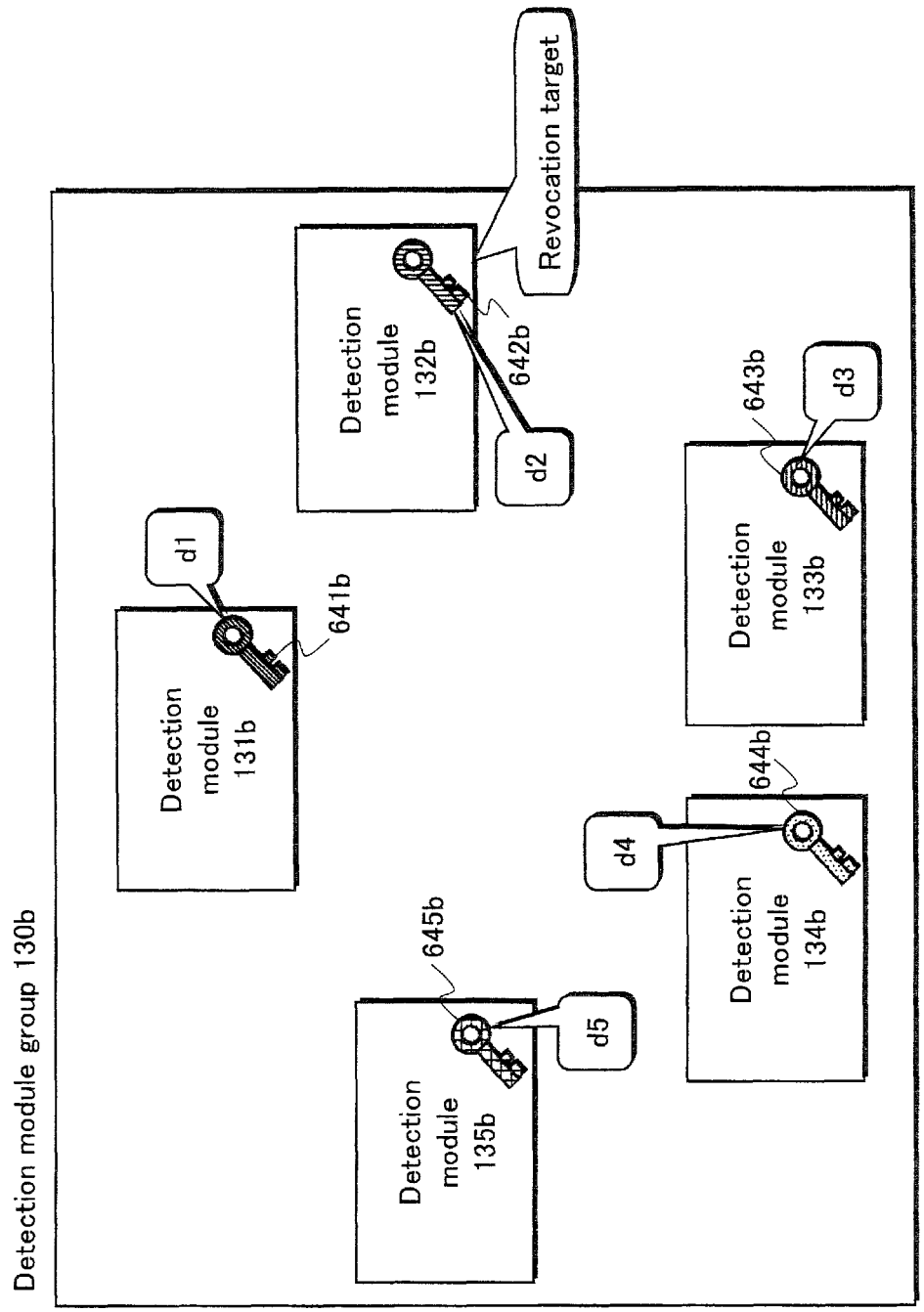
FIG. 31 shows the structure of the detection module group 130b in the detection system 10b, where a detection module 132b has been revoked.

In the present example, descriptions are provided under the assumption that the detection module 132b is a revocation target that is to be revoked, as shown in FIG. 31.

The determination unit 210 outputs, to the software distribution unit 220, an identifier identifying the detection module to be revoked. In the present example, the determination unit 210 outputs the identifier identifying the detection module 132b to be revoked to the key share generation unit 610 of the software distribution unit 220.

(2) Software Distribution Unit 220

(Encryption/Decryption Key Holding Unit 607)

The encryption/decryption key holding unit 607 holds therein identifiers identifying the detection modules 131b, 132b, ..., 135b in the detection module group 130b, in association with the key shares transmitted to the detection module 131b, 132b, ..., 135b.

(Key Share Generation Unit 610)

The key share generation unit 610 receives, from the determination unit 210, the identifier identifying the detection module to be revoked. Next, the key share generation unit 610 reads the key share corresponding to the received identifier, from the encryption/decryption key holding unit 607. In present example, the software distribution unit 220 reads the key share d2 transmitted to the detection module 132b that is to be revoked.

Next, the key share generation unit 610 decomposes the key share transmitted to the detection module to be revoked, and thereby generates a plurality of regenerated key shares. Note that the number of regenerated key shares is equal to the number of detection modules in the detection module group 130b excluding the detection module to be revoked.

Figure 32:
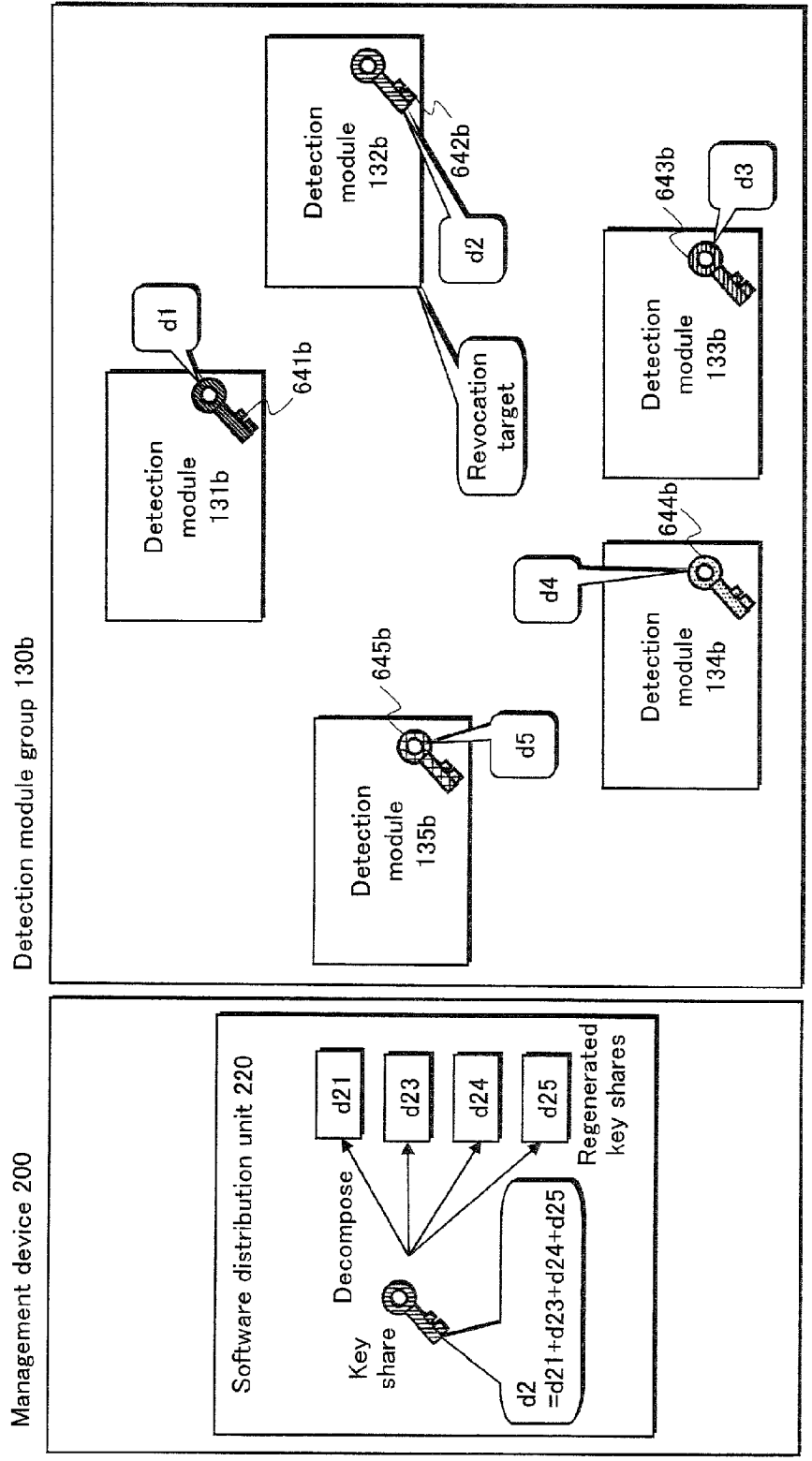
FIG. 32 is a schematic diagram explaining generation of regenerated key shares in the detection system 10b.

For example, the key share generation unit 610 generates regenerated key shares d21, d23, d24, and d25 by decomposing the key share d2 into four keys, as shown in FIG. 32. At this time, the key share is decomposed such that d2=d21+d23+d24+d25 is satisfied.

The method for generating the regenerated key shares d21, d23, d24, and d25 from the key share d2 is similar to the method for generating the key shares d1, d2, d3, d4, and d5 from the private key d.

Next, key share generation unit 610 transmits the plurality of regenerated key shares thus generated to the detection modules not targeted for revocation in the device 100, via the control unit 603, transmission unit 602, communication unit 230, and the network 20. For example, the key share generation unit 610 transmits the regenerated key shares d21, d23, d24, and d25 to the detection modules 131b, 133b, 134b, and 135b.

(3) Structure of Detection Module 131b

Figure 33:
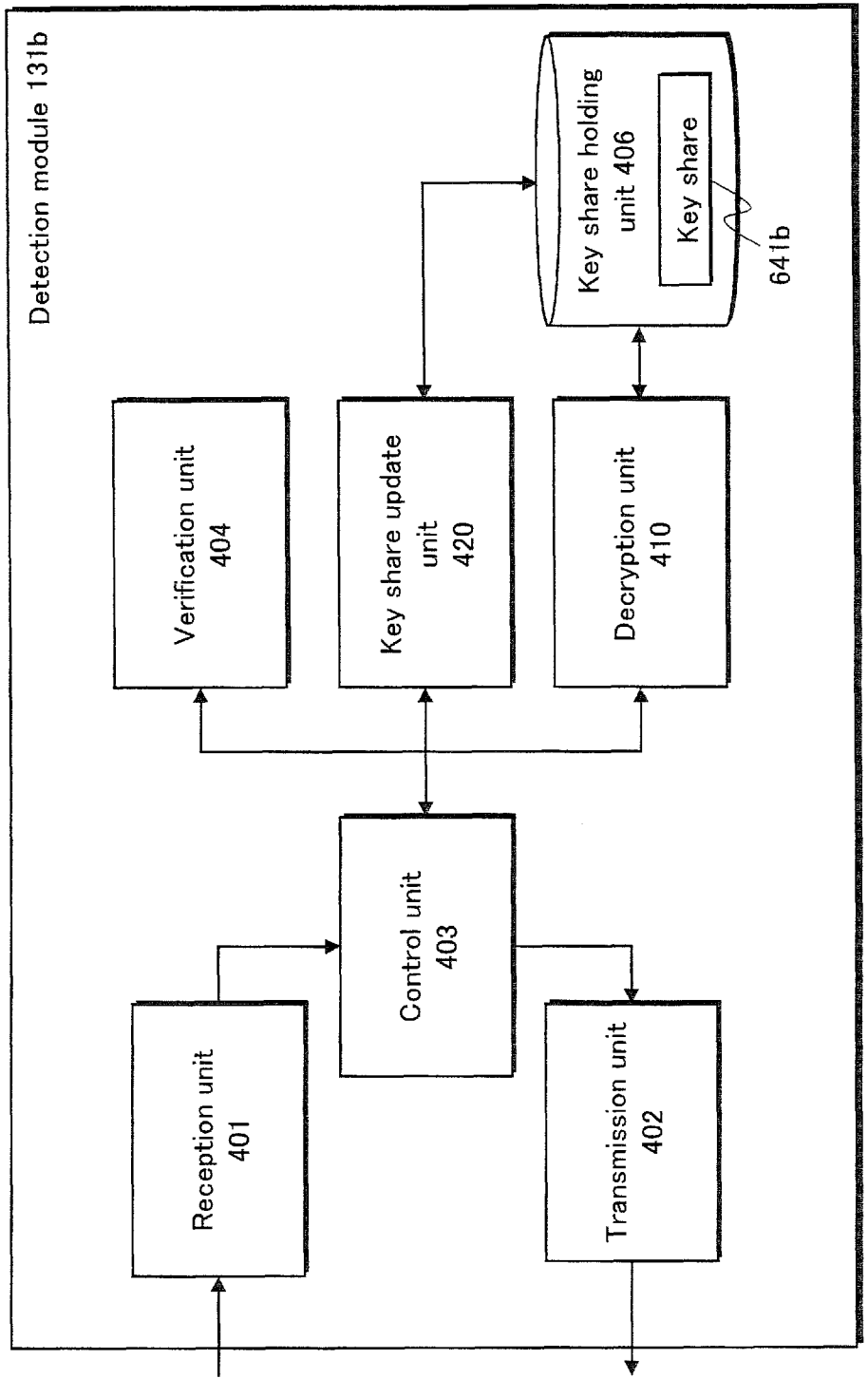
FIG. 33 is a block diagram showing the structure of a detection module 131b in the detection system 10b.

As shown in FIG. 33, the detection module 131b is composed of the reception unit 401, the transmission unit 402, the control unit 403, the verification unit 404, the key share holding unit 406, the decryption unit 410, and a key share update unit 420.

Note that components having the same functions as those in the detection module 131a are indicated by the same reference signs, and descriptions thereof are omitted.

In comparison to the structure of the detection module 131a, the detection module 131b includes a key share update unit 420, which is not included in the detection module 131a.

The detection modules 132b, 133b, 134b, and 135b have a similar structure to the detection module 131b. Therefore, descriptions thereof are omitted here.

The key share update unit 420 receives the regenerated key share from the management device 200, and reads the key share from the key share holding unit 406. Then, the key share update unit 420 adds the regenerated key share to the key share, and overwrites the key share held in the key share holding unit 406 with a result of the addition being a new key share.

As an example, it is assumed that the key share update unit 420 receives the regenerated key share d21 from the management device 200, and that the key share holding unit 406 stores therein the key share d1(641b), as shown in FIG. 32. The key share update unit 420 reads the key share d1(641b) from the key share holding unit 406 and then, as shown in FIG. 34, adds the regenerated key share d21 thus received to the key share d1(641b) to generate a new key share d1+d21 (641c), and overwrites the key share d1(641b) held in the key share holding unit 406 with the key share d1+d21(641c).

Figure 34:
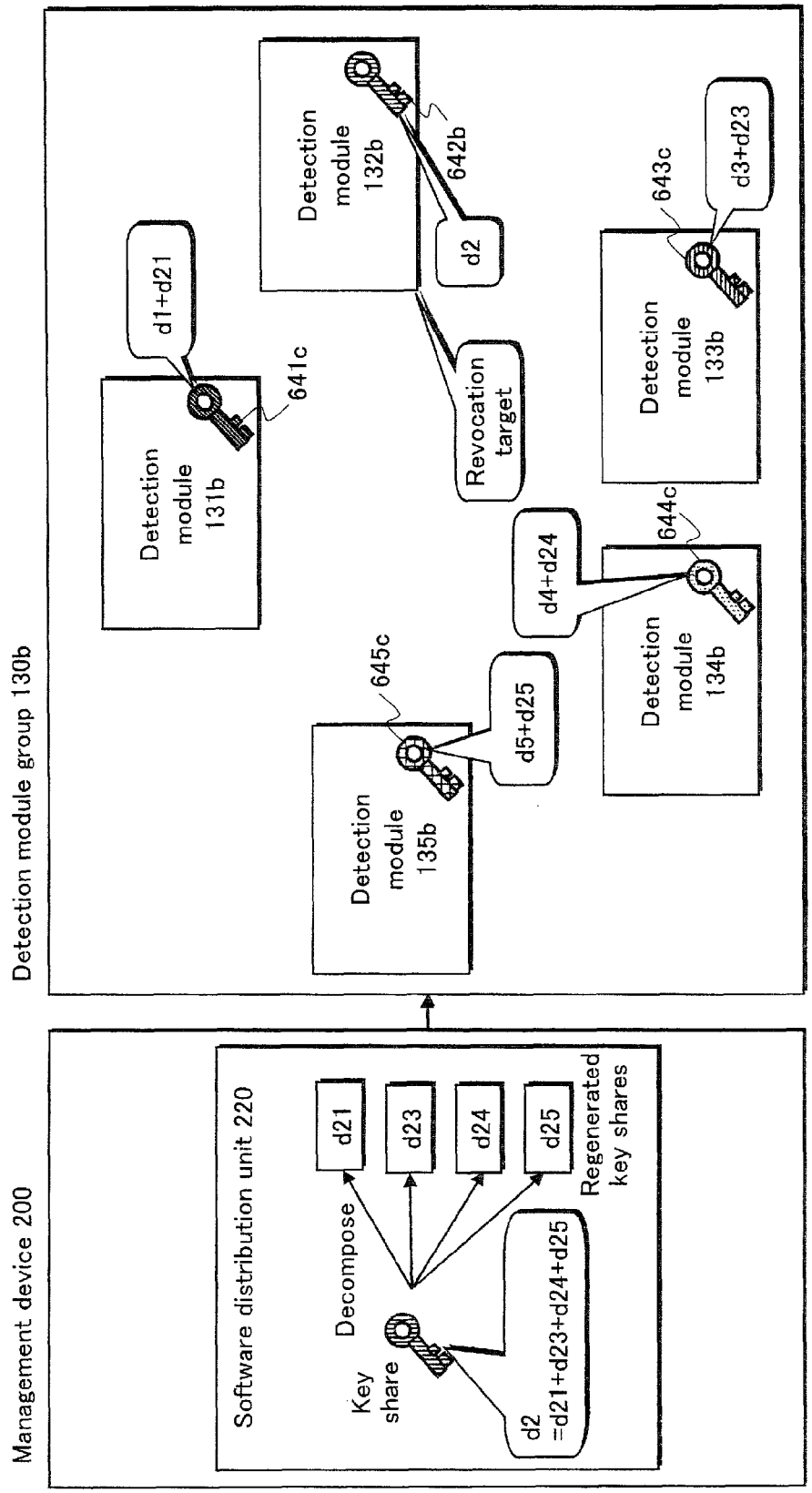
FIG. 34 is a schematic diagram explaining update of the key shares using the regenerated key shares in the detection system 10b.

Similarly to the detection module 131b, as shown in FIG. 34, the detection modules 133b, 134b, and 135b receive the regenerated key shares d23, d24, and d25, add the regenerated key shares d23, d24, and d25 to the key shares d3, d4, and d5 stored therein to generate a new key share d3+d23(643c), a new key share d4+d24(644c), and a new key share d5+d25 (645c), and store therein the new key shares 643c, 644c, and 645c.

In this way, even if the detection module 132b is revoked, the private key d is calculated from the key shares held in the detection modules 131b, 133b, 134b, and 135b in the detection module group 130b.

4.3 Operations in Detection System 10b

Figure 35:
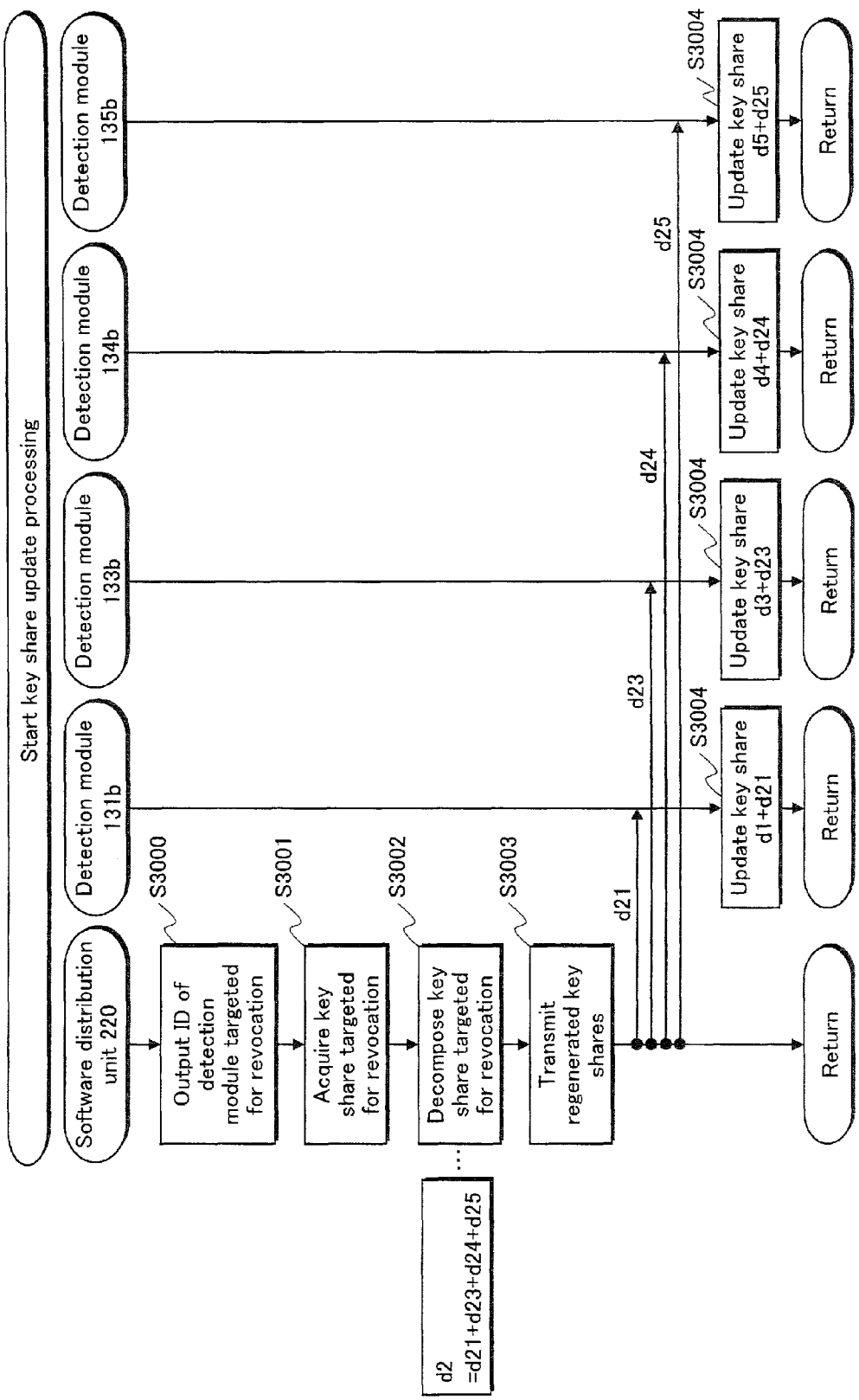
FIG. 35 is a sequence diagram showing operations of update of the key shares using the regenerated key shares in the detection system 10b.

The following describes operations in the key share update processing in the detection system 10b, with reference to the sequence diagram in FIG. 35.

In the present example, the detection module 132b is targeted to be revoked, as shown in FIG. 31.

The determination unit 210 outputs, to the software distribution unit 220, an identifier identifying the detection module to be revoked (step S3000).

The key share generation unit 610 of the software distribution unit 220 acquires a key share corresponding to the received identifier (step S3001), generates a plurality of regenerated key shares by decomposing the acquired key share (step S3002), and transmits the regenerated key shares to the detection modules that have not been revoked (step S3003).

Each of the detection modules that are not revoked receives the regenerated key share from the management device 200 (step S3003), adds the regenerated key share to the key share held in the key share holding unit 406 to generate a new key share, and updates the key share by overwriting the key share in the key share holding unit 406 with the new key share (step S3004).

In this way, even if the detection module targeted for revocation is actually revoked, the private key d is calculated from the key shares held in the detection modules 131b, 133b, 134b, and 135b, which are not revoked, in the detection module group 130b.

4.4 Effect of Detection System 10b

According to the detection system 10b, even if any of the detection modules storing the key shares is revoked as a result of being tampered with, a situation where the private key for decrypting an encrypted application cannot be reconstructed is prevented by updating the key shares stored in the detection modules that are not revoked.

This enables reconstructing the private key for decrypting an encrypted application, while revoking the detection module that has been tampered with so as to increase security of the system.

5. Other Modifications

While the present invention has been described based on the above embodiments, the present invention is of course not limited to these embodiments. The present invention also includes the following cases.

(1) In each of the above embodiments, mutual monitoring processing, in which the detection modules monitor each other, may be performed after the detection processing. Patent Literature 2 provides a detailed description of mutual monitoring processing; therefore, a description thereof is omitted here.

(2) In the modification (1) above, if the protection control module is normal as a result of the detection processing and a detection module that operates maliciously is found as a result of the mutual monitoring processing, the detection module found by the protection control module may be revoked.

Also, the revocation processing may be performed by a normal detection module.

Also, if the protection control module is abnormal as a result of the detection processing and a detection module that operates maliciously cannot be found as a result of the mutual monitoring processing, the protection control module may be updated.

Note that Patent Literature 2 provides a detailed description of the revocation processing of a detection module and the update processing of a protection control module. Therefore, descriptions thereof are omitted here.

(3) In the detection system 10, the protection control module 120 reconstructs the encryption/decryption key in step S2005 of FIG. 19. However, the protection control module 120 may further verify whether the encryption/decryption key is correct or not.

In this case, the protection control module 120 receives a verification value of the encryption/decryption key from the management device 200, during the initial setting processing. This verification value may be a hash value of the encryption/decryption key or a MAC value of the encryption/decryption key. After reconstructing the encryption/decryption key in step S2005, the protection control module 120 verifies whether the encryption/decryption key is correct or not with use of the verification value.

This enables detecting whether the encryption/decryption key is incorrect, thus increasing security of the system.

(4) In the detection system 10, the protection control module 120 receives the key shares from the detection modules in step S2004 of FIG. 19, and reconstructs the encryption/decryption key in step S2005. However, the protection control module 120 may further verify whether the key shares received from the detection modules are correct.

In this case, the protection control module 120 receives verification values of the respective key shares of the detection modules from the management device 200, during the initial setting processing. The verification value of each key share may be a hash value of the key share or a MAC value of the key share.

The protection control module 120 receives the key shares from the detection modules in step S2004 of FIG. 19, and verifies whether the received key shares are correct or not with use of the verification values before reconstructing the encryption/decryption key in step S2005.

This enables detecting whether the encryption/decryption key is incorrect, and if detecting that the encryption/decryption key is incorrect, enables identifying which detection module has transmitted an abnormal key share. Accordingly, the detection module which has transmitted the abnormal key share is judged to have been tampered with, and the tampered detection module is revoked, whereby security of the system can be improved.

(5) In the detection system 10*a*, the protection control module 120*a* decrypts the encrypted application in step S2116 of FIG. 29. However, the protection control module 120*a* may further verify whether the decrypted application is correct or not.

In this case, the protection control module 120*a* receives a verification value of the application from the management device 200, during the initial setting processing. This verification value may be a hash value of the application or a MAC value of the application. After decrypting the encrypted application in step S2116 of FIG. 29, the protection control module 120*a* verifies whether the decrypted application is correct or not with use of the verification value.

This enables detecting whether the application is incorrect, thus increasing security of the system.

(6) In the detection system 10*a*, the protection control module 120*a* receives, from the detection modules, the partially decrypted texts M1, M2, and M3 obtained by partial decryption of the encrypted application in steps S2115*a*, S2115*b*, and S2115*c* in FIG. 29. Then, the protection control module 120*a* decrypts the encrypted application in step S2116. However, the protection control module 120*a* may further verify whether the decrypted texts received from the detection modules are correct or not.

In this case, the protection control module 120*a* receives a verification value of each decrypted text obtained by partial decryption, from the management device 200 during the initial setting processing. This verification value may be a hash value of each of the decrypted texts obtained by partial decryption or a MAC value of each of the decrypted texts obtained by partial decryption.

The protection control module 120*a* verifies whether the decrypted texts obtained by partial decryption and received from the detection modules are correct or not with use of the verification values, before decrypting the encrypted application in step S2116 of FIG. 29.

This enables detecting whether a decrypted text obtained by partial decryption and received from a detection module is incorrect, and if detecting that the decrypted text is incorrect, enables identifying which detection module has transmitted the abnormal decrypted text. Accordingly, the detection module which has transmitted the abnormal decrypted text is judged to have been tampered with, and the tampered detection module is revoked, whereby security of the system can be improved.

(7) In the detection system 10, the encryption/decryption key may be decomposed as follows in the initial setting processing.

Figure 36:
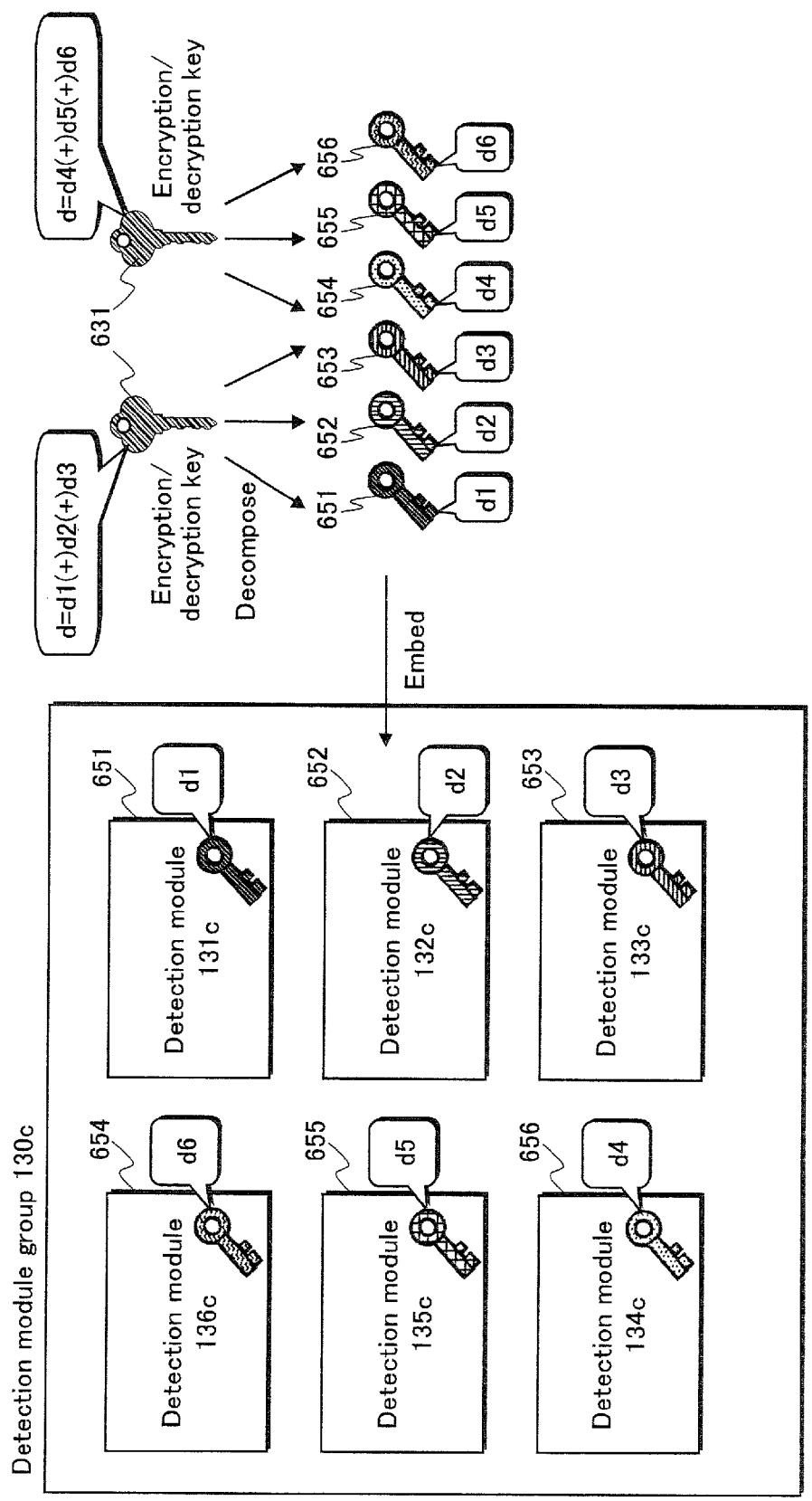
FIG. 36 is a schematic diagram showing generation of key shares and output of the key shares to a detection module group 130c, according to a modification of the embodiments of the present invention.

As shown in FIG. 36, the key share generation unit 610 decomposes the encryption/decryption key d (631) to generate key shares d1 (651), d2(652), d3(653), d4(654), d5(655), and d6(656).

Here, it is assumed that d=d1 (+) d2 (+) d3=d4 (+) d5 (+) d6 is satisfied. The symbol (+) in the above formula denotes an exclusive OR operation.

During decryption of the encryption/decryption key, a group of detection modules is selected from the detection module list, which is held in the detection module selection unit 310 and indicates detection module groups, and the key shares are transmitted to the respective detection modules in the selected group.

Figure 37:
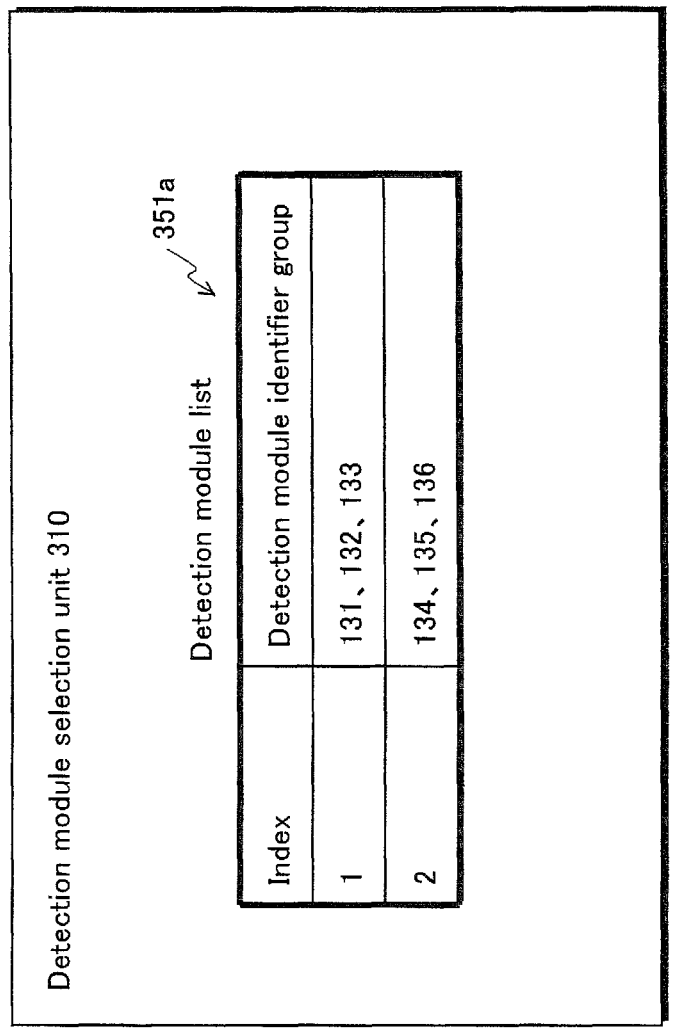
FIG. 37 shows one example of the data structure of a detection module list 351a of the detection module selection unit 310.

FIG. 37 shows an example of a detection module list 351*a* held in the detection module selection unit 310.

The protection control module 120 receives the key shares from the detection modules, and reconstructs the encryption/decryption key with use of the received key shares.

If the detection module selection unit 310 selects the detection modules 131, 132, and 133, the protection control module 120 reconstructs the encryption/decryption key d by calculating d1 (+) d2 (+) d3.

In this way, an attacker who attempts to acquire the encryption/decryption key cannot reconstruct the encryption/decryption key unless knowing a group of detection modules capable of reconstructing the encryption/decryption key.

Furthermore, suppose that the attacker randomly attacks some of the detection modules, and acquires the key shares from four or more detection modules including the detection modules 131, 132, and 133. Even in such a case, the encryption/decryption key cannot be reconstructed unless a correct group of detection modules (e.g., a group consisting of the detection modules 131, 132, and 133) is selected.

Specifically, suppose that the attacker acquires the key shares d1, d2, d3, and d4 from the detection modules 131, 132, 133, and 134, and calculates d1 (+) d2 (+) d3 (+) d4. In this case, d≠d1 (+) d2 (+) d3 (+) d4, and therefore the attacker cannot calculate the encryption/decryption key d.

If the encryption/decryption key d is decomposed with use of the secret sharing scheme, the encryption/decryption key d can be calculated from the key shares d1, d2, d3, and d4. However, if the encryption/decryption key d is decomposed with use of an exclusive OR operation, the encryption/decryption key d cannot be calculated from the key shares d1, d2, d3, and d4.

(8) In the detection system 10, the protection control module 120 transmits, to the detection modules, a notification indicating that the application is ended in step S2017 of FIG. 21. Upon receiving the notification, the detection modules perform tampering detection using the tampering detection certificate.

However, the present invention is not limited to such. After deleting the encryption/decryption key in step S2007 of FIG. 19, the protection control module 120 may transmit, to the detection modules, a notification indicating that the encryption/decryption key has been deleted. Then, after receiving the notification indicating that the encryption/decryption key has been deleted, the detection modules may perform tampering detection using the tampering detection certificate.

Also, the protection control module 120 may delete the encryption/decryption key (S2007) immediately after the decryption of the encrypted application is completed in step S2006 of FIG. 19. Upon completing the decryption of the encrypted application, the protection control module 120 may transmit, to the detection modules, a notification indicating that the decryption of the encrypted application is completed. Upon receiving the notification indicating that the decryption of the encrypted application is completed, the detection modules may perform tampering detection using the tampering detection certificate.

(9) In the detection system 10, the protection control module 120 transmits a notification indicating that the application is ended in step S2017 of FIG. 21. Upon receiving the notification indicating that the application is ended, the detection modules perform tampering detection using the tampering detection certificate.

However, if the protection control module 120 has been tampered with, the protection control module 120 may not transmit the notification indicating that the application is ended.

Also, according to the modification (8) above, the protection control module 120 may transmit, to the detection modules, a notification indicating that the encryption/decryption key has been deleted. Then, after receiving the notification indicating that the encryption/decryption key has been deleted, the detection modules may perform tampering detection using the tampering detection certificate.

However, if the protection control module 120 has been tampered with, the protection control module 120 may not transmit the notification indicating that the encryption/decryption key has been deleted.

Furthermore, according to the modification (8) above, the protection control module 120 may transmit, to the detection modules, a notification indicating that the decryption of the encrypted application is completed. Upon receiving the notification indicating that the decryption of the encrypted application is completed, the detection modules may perform tampering detection using the tampering detection certificate.

However, if the protection control module 120 has been tampered with, the protection control module 120 may not transmit the notification indicating that the decryption of the encrypted application is completed.

In preparation for such cases, if the aforementioned notifications are not transmitted even after the lapse of a predetermined period since the start of execution of the application, the detection modules may perform tampering detection of the protection control module 120. For example, the predetermined period may be the time necessary for the decryption of the encrypted application. Alternatively, the predetermined time period may be the time notified by a server in advance.

(10) According to the above embodiments and modifications, each of the detection modules holds one key share. However, it is not limited to such.

A first detection module may hold a key share allocated thereto, and may further hold a key share allocated to a second detection module different from the first detection module. Then, if the second detection module is attacked, the first detection module holding the key share of the second detection module may decompose the key share allocated to the second detection module to generate a plurality of regenerated key shares, and transmit the regenerated key shares to other detection modules that are not under attack. This enables updating the key shares held by the detection modules that are not under attack, without intervention of a server. Patent Literature 1 provides a detailed description of processing for holding a key share of another detection module and updating key shares. Therefore, a description thereof is omitted here.

(11) In the above embodiments and modifications, if a first detection module has been tampered with, processing for revoking the first detection module may be performed.

Also, after the revocation processing is completed, a second detection module may be newly installed in the device to be added to the already-installed detection modules. In this case, the second detection module is installed in a state where the second detection module holds a key share dx. Here, the key share of the first detection module, which has been revoked in the revocation processing, is assumed to be a key share dy. The second detection module transmits a difference dy−dx, which is a key share difference between the key share dy and the key share dx, to a third detection module. The third detection module receives the key share difference dy−dx, and adds the key share difference dy−dx to a key share dz held in the third detection module itself, and thereby updates the key share dz.

This enables performing the processing for revoking a detection module that has been tampered with and the processing for newly adding a detection module, without changing the value of the encryption/decryption key d.

Here, there is a possibility of a leak of the key share of the first detection module that has been revoked. However, the key share of the first detection module is not identical to any of the key shares in the new detection module group. Therefore, a leak of the first detection module does not lead to a leak of the key shares of the detection modules in the new detection module group. To guarantee that a leak of the key shares in the new detection module group is prevented, the value of dy−dx+dz is set to be different from any of the values of the key shares of the other detection modules.

(12) According to the above embodiments and modifications, each of the detection modules holds one key share. However, it is not limited to such.

A first detection module may hold a key share allocated thereto, and may further hold a key share allocated to a second detection module different from the first detection module. In this case, if the second detection module is attacked, the first detection module holding the key share of the second detection module under attack transmits the key share of the second detection module to a server. The server receives the key share, and decomposes the key share to generate a plurality of regenerated key shares. Then, the server transmits the regenerated key shares to the respective detection modules not under attack. Each of the detection modules not under attack receives the regenerated key share, and updates the key share held therein using the regenerated key share. The processing performed after the server receives the key share is similar to the processing from the step S3002 onwards in FIG. 35. Therefore, a description thereof is omitted here.

(13) In the above embodiments and modifications, the key shares of all the detection modules may be generated to be different from each other. In this way, even if the key share of one of the detection modules is leaked, leaks of the key shares of the other detection modules are prevented.

In contrast, suppose that the key shares of two detection modules are identical. In this case, a leak of the key share of one of the two detection modules will lead to a leak of the key share of the other one of the two detection modules.

(14) In the detection system 10b, the management device 200 acquires the key share of the detection module to be revoked, decomposes the key share to generate a plurality of regenerated key shares, and transmits the regenerated key shares to the detection modules not targeted for revocation. Each of the detection modules not targeted for revocation receives the regenerated key share, and updates the key share held therein with use of the regenerated key share thus received. However, it is not limited to such.

The management device 200 may newly generate, from the private key d, key shares to be transmitted to the detection modules not targeted for revocation, and transmit the newly generated key shares to the detection modules not targeted for revocation. Each of the detection modules not targeted for revocation may replace the key share held in the key share holding unit 406 with the newly generated key share received from the management device 200.

(15) Each of the above modules may specifically be an individual computer program, a module embedded in an operating system, a driver called by the operating system, or an application program.

(16) The following structure may be adopted.

One aspect of the present invention may be a management device for managing: a protection control module for protecting an application program; and a plurality of detection modules for monitoring tampering of the protection control module. The management device may comprise: a key share generation circuit configured to generate a plurality of key shares by decomposing a decryption key, the decryption key being for decrypting an encrypted application program generated as a result of encryption of the application program; and an output circuit configured to output each of the key shares to a different one of the detection modules.

Another aspect of the present invention may be an integrated circuit constituting a management device for managing: a protection control module for protecting an application program; and a plurality of detection modules for monitoring tampering of the protection control module. The integrated circuit may comprise: a key share generation circuit configured to generate a plurality of key shares by decomposing a decryption key, the decryption key being for decrypting an encrypted application program generated as a result of encryption of the application program; and an output circuit configured to output each of the key shares to a different one of the detection modules.

Yet another aspect of the present invention may be a management device for managing: a protection control module for protecting an application program; and a plurality of detection modules for monitoring tampering of the protection control module. The management device may comprise: a memory storing therein a computer program constituted by a combination of a plurality of computer instructions; and a processor configured to fetch the computer instructions one at a time from the computer program stored in the memory, decode the computer instructions, and operate according to a result of the decoding. The computer program may cause the management device, which is a computer, to perform the steps of: generating a plurality of key shares by decomposing a decryption key, the decryption key being for decrypting an encrypted application program generated as a result of encryption of the application program; and outputting each of the key shares to a different one of the detection modules.

(17) The following structure may be adopted.

One aspect of the present invention may be a protection control module for protecting an application program, tampering of the protection control module being monitored by a plurality of detection modules. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The detection modules acquire and store therein the key shares. The protection control module may comprise: an acquisition circuit configured to acquire the key shares from the detection modules; a reconstruction circuit configured to reconstruct the decryption key by composing the key shares acquired by the acquisition circuit; a decryption circuit configured to decrypt the encrypted application program, with use of the decryption key reconstructed by the reconstruction circuit; and a deletion circuit configured to delete the decryption key, after the decryption by the decryption circuit is completed.

Another aspect of the present invention may be an integrated circuit constituting a protection control module for protecting an application program, tampering of the protection control module being monitored by a plurality of detection modules. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The detection modules acquire and store therein the key shares. The integrated circuit may comprise: an acquisition circuit configured to acquire the key shares from the detection modules; a reconstruction circuit configured to reconstruct the decryption key by composing the key shares acquired by the acquisition circuit; a decryption circuit configured to decrypt the encrypted application program, with use of the decryption key reconstructed by the reconstruction circuit; and a deletion circuit configured to delete the decryption key, after the decryption by the decryption circuit is completed.

Yet another aspect of the present invention may be a protection control module for protecting an application program, tampering of the protection control module being monitored by a plurality of detection modules. The protection control module may comprise: a memory storing therein a computer program constituted by a combination of a plurality of computer instructions; and a processor configured to fetch the computer instructions one at a time from the computer program stored in the memory, decode the computer instructions, and operate according to a result of the decoding. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The detection modules acquire and store therein the key shares. The control computer program may cause the protection control module, which is a computer, to perform the steps of: acquiring the key shares from the detection modules; reconstructing the decryption key by composing the key shares acquired in the acquiring step; decrypting the encrypted application program, with use of the decryption key reconstructed by the reconstructing step; and deleting the decryption key, after the decryption in the decrypting step is completed.

(18) The following structure may be adopted.

One aspect of the present invention may be one of a plurality of detection modules for monitoring tampering of a protection control module that is for protecting an application program. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The detection module may comprise: an acquisition circuit configured to acquire the key share; a storage circuit configured to store therein the key share; and an output circuit configured to output the key share to the protection control module.

Another aspect of the present invention may be an integrated circuit constituting one of a plurality of detection modules for monitoring tampering of a protection control module that is for protecting an application program. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The integrated circuit may comprise: an acquisition circuit configured to acquire the key share; a storage circuit configured to store therein the key share; and an output circuit configured to output the key share to the protection control module.

Yet another aspect of the present invention may be one of a plurality of detection modules for monitoring tampering of a protection control module that is for protecting an application program. The detection module may comprise: a memory storing therein a computer program constituted by a combination of a plurality of computer instructions; and a processor configured to fetch the computer instructions one at a time from the computer program stored in the memory, decode the computer instructions, and operate according to a result of the decoding. A plurality of key shares are generated as a result of a decryption key being decomposed by a management device, the decryption key being for decrypting an encrypted application program generated as a result of encryption of the application program. Each of the key shares thus generated is output by the management device to a different one of the detection modules. The computer program may cause the detection module, which is a computer, to perform the steps of: acquiring the key share; storing the key share in the memory; and outputting the key share to the protection control module.

(19) The following structure may be adopted.

One aspect of the present invention is an information processing device including: a protection control module having a function of protecting an application; and a plurality of detection modules. Each of the detection modules comprises: a key share holding unit configured to hold therein a key share obtained by decomposition of an encryption/decryption key, the encryption/decryption key being for encrypting and decrypting the application; and a transmission unit configured to transmit the key share to the protection control module. The protection control module comprises: a reception unit configured to receive the key shares from the detection modules at a time of decrypting the application in an encrypted state; an encryption/decryption key reconstruction unit configured to reconstruct the encryption/decryption key from the key shares; and a decryption unit configured to, when the application encrypted with use of the encryption/decryption key is input thereto as input data, decrypt the input data and output a result of the decryption as output data.

With the above structure, verification is performed on application decryption processing by the protection control module. This enables judging whether the protection control module has been tampered with, without revealing the encryption/decryption key held by the protection control module to the detection modules.

Also, except during decryption of the application, i.e., except during a period lasting from transmission of the key shares by the detection modules to reception of a notification indicating deletion of the encryption/decryption key, the protection control module does not hold the encryption/decryption key of the application. Accordingly, it is possible for the detection modules to judge whether the protection control module has been tampered with, by reading data of the protection control module and using a tampering detection certificate.

As a result, even if any of the detection modules has been tampered with and operates maliciously, information on the protection control module 120 and information on the application do not leak. This increases security of the system.

Also, the protection control module does not hold the encryption/decryption key of the application. Therefore, even if the protection control module is attacked, the encryption/decryption key does not leak, and information on the protection control module and information on the application do not leak, either. This increases security of the system.

Here, the protection control module may further comprise: a decomposition unit configured to decompose the output data into at least k pieces of decomposed data, where k is k≥2; and a distribution unit configured to distribute each of the k pieces of decomposed data to a different one of the detection modules. Each of the detection modules may further comprise a verification unit configured to perform verification on the piece of decomposed data that has been distributed so as to determine whether the piece of decomposed data is correct or not, with use of verification data and the input data. The verification data is generated based on the piece of decomposed data, the input data, and a value of the decomposed data expected when the decryption unit has operated normally.

According to the above structure, verification is performed on the application decryption processing by the protection control module 120. This enables judging whether the protection control module 120 has been tampered with, without revealing the encryption/decryption key held by the protection control module 120 to the detection modules.

Here, the protection control module may further comprise a deletion unit configured to delete the encryption/decryption key. Each of the detection modules may further comprise a tampering detection unit configured to detect whether the protection control module has been tampered with. The tampering detection unit may operate except during a period lasting from the reconstruction of the encryption/decryption key by the encryption/decryption key reconstruction unit of the protection control module to the deletion of the encryption/decryption key by the deletion unit of the protection control module.

With the above structure, except during decryption of the application, i.e., except during the period lasting from transmission of the key shares by the detection modules to reception of a notification indicating deletion of the encryption/decryption key, the protection control module does not hold the encryption/decryption key of the application. Accordingly, it is possible for the detection modules to judge whether the protection control module has been tampered with, by reading data of the protection control module and using the tampering detection certificate.

Here, the protection control module may further comprise a notification transmission unit configured to, upon completion of the deletion of the encryption/decryption key by the deletion unit, transmit a notification indicating that the deletion has been completed to the detection modules. Each of the detection modules may further comprise a notification reception unit configured to receive the notification from the protection control unit. Upon the notification reception unit receiving the notification, the detection module may determine that the deletion unit has completed the deletion of the encryption/decryption key.

Another aspect of the present invention is an information processing device including: a protection control module having a function of protecting an application; and a plurality of detection modules. Each of the detection modules comprises: a key share holding unit configured to hold therein a key share obtained by decomposition of a decryption key for decrypting the application in an encrypted state; a partial decryption unit configured to, when the application in the encrypted state is input thereto as input data, partially decrypt the input data with use of the key share, and to output a result of the decryption as output data; and a transmission unit configured to transmit the output data to the protection control module. The protection control module comprises: a reception unit configured to receive the output data from each of the detection modules; and an application decryption unit configured to calculate the application in a decrypted state from the output data of each of the detection modules.

With the above structure, the decryption key of the application is not reconstructed inside the protection control module. This prevents a leak of the decryption key of the application even if the protection control module has been tampered with.

Here, each of the detection modules may further comprise a tampering detection unit configured to perform detection processing for detecting whether the protection control module has been tampered with.

With the above structure, regardless of whether the application is being decrypted, it is possible for the detection modules to judge whether the protection control module has been tampered with, by reading data of the protection control module and using a tampering detection certificate. Furthermore, even if the protection control module is tampered with, the tampering can be immediately detected, thus increasing security of the system.

Here, the frequency of the detection processing performed by the tampering detection unit on the protection control module may be increased during a period lasting from start of the decryption by the partial decryption unit of each of the detection modules to completion of the calculation by the application decryption unit of the protection control module.

Here, the protection control module may further comprise a notification transmission unit configured to, upon completion of the calculation of the application by the application decryption unit, transmit a notification indicating that the calculation has been completed to the detection modules. Each of the detection modules may further comprise a notification reception unit configured to receive the notification from the protection control unit. Upon the notification reception unit receiving the notification, the detection module may determine that the application decryption unit has completed the calculation of the application.

Here, each of the detection modules may be connected to a management device via a network, and may further comprise: a key share reception unit configured to receive a key share for updating from the management device; and an update unit configured to generate a new key share from the key share received by the key share reception unit and the key share held in the key share holding unit, and to update the key share held in the key share holding unit with the new key share.

With the above structure, even if any of the detection modules holding the key shares generated from the decryption key of the application is tampered with, the detection modules other than the tampered detection module update the respective key shares held therein. This prevents a situation where the decryption key of the application cannot be reconstructed. Also, even if any of the detection modules has been tampered with, the application can still be encrypted and decrypted. Further, it is possible to increase security of the system by revoking the tampered detection module.

Here, the information processing device may be connected to a management device via a network, and each of the detection modules may further comprise: a key share reception unit configured to receive a key share for updating from the management device; and an update unit configured to generate a new key share from the key share received by the key share reception unit and the key share held in the key share holding unit, and to update the key share held in the key share holding unit with the new key share.

Yet another aspect of the present invention is a management device connected to an information processing device. The information processing device includes a decryption unit that decrypts encrypted data input thereto through a plurality of processes, and verifies the processes of the decryption unit. The management device comprises: a verification base data generation unit configured to generate verification base data from (i) input data for each of the processes and (ii) output data, from each of the processes, expected when the decryption unit has operated normally; and a transmission unit configured to transmit the verification base data to the information processing device.

Here, the decryption unit of the information processing device may decrypt a plurality of applications in an encrypted state. The verification base data generation unit may generate pieces of verification base data corresponding one-to-one to the plurality of processes. Each piece of the verification base data includes: the applications in the encrypted state; verification values of the applications; and a concatenated data verification value. Each of the verification values of the applications for each process indicates a correspondence between input data for the process and output data resulting from the process, the correspondence being expected when the decryption unit has operated normally. The concatenated data verification value for each process is generated from data resulting from concatenation of the verification values in the process.

(20) Each of the above devices is, specifically, a computer system composed of a microprocessor, a ROM, a RAM, a hard disk unit, a display unit, a keyboard, a mouse, etc. A computer program is stored on the RAM or the hard disk unit. Each device fulfills its functions when the microprocessor operates in accordance with the computer program. To fulfill its functions, the computer program is composed of a combination of instruction codes that indicate instructions to the computer.

(21) Part or all of the components constituting each of the above devices may be assembled as one system LSI (Large Scale Integration). The system LSI is an ultra multi-functional LSI that is manufactured by integrating a plurality of components on one chip. More specifically, the system LSI is a computer system including a microprocessor, a ROM, a RAM, and the like. A computer program is stored on the RAM. The microprocessor operates in accordance with the computer program, thereby enabling the system LSI to fulfill its functions.

The components constituting each of the above devices may separately be made into discrete chips, or part or all of the components may be made into one chip.

In addition, the method for assembling integrated circuits is not limited to LSI, and a dedicated circuit or a general-purpose processor may be used. An FPGA (Field Programmable Gate Array), which is programmable after the LSI is manufactured, or a reconfigurable processor, which allows reconfiguration of the connection and setting of circuit cells inside the LSI, may be used.

(22) Part or all of the components constituting each of the above devices may be assembled as an IC card or a single module removable from each device. The IC card or the module is a computer system that includes a microprocessor, a ROM, a RAM, and the like. The IC card or the module may include the aforementioned ultra multi-functional LSI. The microprocessor operates in accordance with the computer program and causes the IC card or the module to fulfill its functions. The IC card or the module may be tamper-resistant.

(23) One aspect of the present invention may be a method for controlling the operations of the above devices. Another aspect of the present invention may be a computer program that allows a computer to realize the method, or may be a digital signal representing the computer program.

Yet another aspect of the present invention may be a computer-readable recording medium storing thereon the computer program or the digital signal. Examples of such a recording medium include a flexible disk, a hard disk, a CD-ROM, an MO, a DVD, a DVD-ROM, a DVD-RAM, a BD, and a semiconductor memory. Yet another aspect of the present invention may be the digital signal recorded on any of the aforementioned recording media.

Yet another aspect of the present invention may be the computer program or the digital signal transmitted via an electric communication line, a wireless or wired communication line, a network represented by the Internet, data broadcasting or the like.

Yet another aspect of the present invention may be a computer system that includes a microprocessor and a memory, the memory storing therein the computer program, and the microprocessor operating in accordance with the computer program.

Furthermore, the program or the digital signal may be stored on any of the aforementioned recording media and transferred to another independent computer system or, alternatively, may be transferred to the computer system via the network or the like, so that the program or the digital signal is implemented by the other computer system.

(24) The present invention may be any combination of the above-described embodiments and modifications.

INDUSTRIAL APPLICABILITY

In a tampering monitoring system according to the present invention, a protection control module does not always hold a decryption key, but holds the decryption key only during decryption of an encrypted application program. Then, upon completion of the decryption, the protection control module deletes the decryption key. This reduces the possibility of a malicious leak of the decryption key from the protection control module. Accordingly, the tampering monitoring system is applicable to a technique for monitoring tampering of modules or the like that operate inside a device such as an information processing device.

REFERENCE SIGNS LIST 10, 10a, 10b detection system
10d tampering monitoring system
100 device
110, 111, 112, 113, 114 application
120, 120a, 120b protection control module
130, 130a, 130b, detection module group
131, 132, 133, 134, 135 detection module
171 CPU
172 EEPROM
173 RAM
174 NIC
180 OS
190 boot loader
200, 200d management device
210 determination unit
220 software distribution unit
230 communication unit
301 reception unit
302 transmission unit
303 control unit
304 decryption load unit
305 tampering detection unit
306 analysis tool detection unit
307 encryption/decryption key reconstruction unit
308 verification base data holding unit
309 verification data generation unit
310 detection module selection unit
401 reception unit
402 transmission unit
403 control unit
404 verification unit
405 verification data holding unit
406 key share holding unit
410 decryption unit
420 key share update unit
501 reception unit
502 transmission unit
503 instruction generation unit
601 reception unit
602 transmission unit
603 control unit
604 authentication unit
605 certificate generation unit
606 signature private key holding unit
607 encryption/decryption key holding unit
608 software holding unit
609 verification base data generation unit
610 key share generation unit

The invention claimed is:
1. A tampering monitoring system comprising:
a management device; and
an information processing device,
wherein the information processing device includes a microprocessor and a non-transitory computer-readable recording medium coupled to the microprocessor storing computer-executable instructions thereon, wherein the instructions include:
   a protection control module for protecting an application program; and
   a plurality of detection modules for monitoring tampering of the protection control module,
wherein the management device includes a microprocessor and a non-transitory computer-readable recording medium coupled to the microprocessor storing computer-executable instructions thereon, wherein the instructions, when executed by the microprocessor of the management device, are configured to:
   generate a plurality of key shares by decomposing a decryption key, the decryption key being for decrypting an encrypted application program generated as a result of encryption of the application program; and
   output each of the key shares to a different one of the detection modules,
wherein the detection modules, when executed by the microprocessor of the information processing device, are configured to acquire and store therein the key shares,
wherein the protection control module, when executed by the microprocessor of the information processing device, is configured to:
   acquire the key shares from the detection modules;
   reconstruct the decryption key by composing the acquired key shares;
   decrypt the encrypted application program, with use of the reconstructed decryption key; and
   delete the decryption key, after the decryption is completed,
wherein the instructions, when executed by the microprocessor of the management device, are further configured to:
   perform decryption processing made up of a plurality of partial decryption processes on an encrypted application program generated as a result of encryption of the application program in a non-tampered state and, for each partial decryption process, perform a one-way conversion on both input data for the partial decryption process and output data resulting from the partial decryption process to generate a decryption verification value, and generate verification data including the input data and the decryption verification value; and
   output the verification data to the protection control module,
wherein the protection control module, when executed by the microprocessor of the information processing device, is further configured to:
   perform the decryption processing made up of the plurality of partial decryption processes on the encrypted application program,
   output, for each partial decryption process, the verification data and the output data resulting from the partial decryption process to a corresponding one of the detection modules, and
wherein each of the detection modules corresponding to the partial decryption processes, when executed by the microprocessor of the information processing device, is further configured to:
   receive the output data and the verification data; and
   perform verification using the output data and the verification data, and output a result of the verification indicating a verification failure if the verification fails,
wherein the plurality of partial decryption processes correspond one-to-one to two or more of the plurality of detection modules,
wherein the instructions, when executed by the microprocessor of the management device, are further configured to output the verification data and the output data resulting from each partial decryption process to the detection module corresponding to the partial decryption process, and
wherein each of the detection modules corresponding to the partial decryption processes when executed by the microprocessor of the information processing device, is further configured to:
   transmit identification information identifying the partial decryption process corresponding to the detection module, to another one or more of the detection modules;
receive, from another one or more of the detection modules, one or more pieces of identification information identifying the partial decryption processes corresponding to the other one or more detection modules; and
perform verification on duplication of the one or more pieces of identification information and the identification information identifying the partial decryption process corresponding to the detection module, and on the comprehensiveness of the one or more pieces of identification information and the identification information identifying the partial decryption process corresponding to the detection module, with respect to all pieces of identification information corresponding to the plurality of partial decryption processes.

2. The tampering monitoring system of claim 1 wherein
each of the detection modules corresponding to the partial decryption processes when executed by the microprocessor of the information processing device, is further configured to output a result of verification indicating a verification failure, if any duplicates exist among the one or more pieces of identification information and the identification information identifying the partial decryption process corresponding to the detection module, or if the one or more pieces of identification information and the identification information identifying the partial decryption process corresponding to the detection module do not completely cover all pieces of identification information corresponding to the plurality of partial decryption processes.

3. A tampering monitoring system comprising:
a management device; and
an information processing device,
wherein the information processing device includes a microprocessor and a non-transitory computer-readable recording medium coupled to the microprocessor storing computer-executable instructions thereon, wherein the instructions include:
   a protection control module for protecting an application program; and
   a plurality of detection modules for monitoring tampering of the protection control module,
wherein the management device includes a microprocessor and a non-transitory computer-readable recording medium coupled to the microprocessor storing computer-executable instructions thereon, wherein the instructions, when executed by the microprocessor of the management device, are configured to:
   generate a plurality of key shares by decomposing a decryption key, the decryption key being for decrypting an encrypted application program generated as a result of encryption of the application program; and output each of the key shares to a different one of the detection modules, wherein the detection modules, when executed by the microprocessor of the information processing device, are configured to acquire and store therein the key shares, wherein the protection control module, when executed by the microprocessor of the information processing device, is configured to output the encrypted application program to each of the detection modules, wherein each detection module, when executed by the microprocessor of the information processing device, is further configured to:

acquire the encrypted application program from the protection control module;

partially decrypt the encrypted application program with use of the key share stored therein to generate a partially decrypted text; and output the partially decrypted text to the protection control module, and wherein the protection control module, when executed by the microprocessor of the information processing device, is further configured to:

acquire the partially decrypted texts from the detection modules; and decrypts decrypt the encrypted application program with use of the acquired partially decrypted texts.

4. The tampering monitoring system of claim 3 wherein the encrypted application program has been generated according to an RSA cryptosystem, wherein each detection module, when executed by the microprocessor of the information processing device, is further configured to generate the partially decrypted text by raising the encrypted application program by the power of a value of the key share, and wherein the protection control module, when executed by the microprocessor of the information processing device, is configured to decrypt the encrypted application program by multiplying values of the partially decrypted texts.

5. The tampering monitoring system of claim 3 wherein the protection control module, when executed by the microprocessor of the information processing device, is configured to:

select a plurality of detection modules from among all the detection modules; and output the encrypted application program to each of the selected detection modules.

6. The tampering monitoring system of claim 3 wherein the protection control module has attached thereto a tampering detection certificate, the tampering detection certificate being generated by digitally signing the protection control module in a non-tampered state, and each of the detection modules, when executed by the microprocessor of the information processing device, is further configured to perform tampering detection on the protection control module using the tampering detection certificate.

7. A tampering monitoring system comprising:

a management device; and an information processing device, wherein the information processing device includes a microprocessor and a non-transitory computer-readable recording medium coupled to the microprocessor storing computer-executable instructions thereon, wherein the instructions include:

a protection control module for protecting an application program;

a plurality of detection modules for monitoring tampering of the protection control module, wherein the management device includes a microprocessor and a non-transitory computer-readable recording medium coupled to the microprocessor storing computer-executable instructions thereon, wherein the instructions, when executed by the microprocessor of the management device, are configured to:

generate a plurality of key shares by decomposing a decryption key, the decryption key being for decrypting an encrypted application program generated as a result of encryption of the application program; and output each of the key shares to a different one of the detection modules, wherein the detection modules, when executed by the microprocessor of the information processing device, are configured to acquire and store therein the key shares, wherein the protection control module, when executed by the microprocessor of the information processing device, is configured to:

acquire the key shares from the detection modules;

reconstruct the decryption key by composing the acquired key shares;

decrypt the encrypted application program, with use of the reconstructed decryption key; and delete the decryption key, after the decryption is completed, wherein one of the detection modules has been revoked, wherein the instructions, when executed by the microprocessor of the management device, are further configured to:

generate a plurality of regenerated key shares by decomposing the key share allocated to the revoked detection module; and output each of the plurality of regenerated key shares to a different one of the detection modules that have not been revoked, and wherein each of the unrevoked detection modules, when executed by the microprocessor of the information processing device, is further configured to acquire the regenerated key share, and update the key share stored therein with use of the regenerated key share to generate a new key share.

8. The tampering monitoring system of claim 7 wherein the instructions, when executed by the microprocessor of the management device, are further configured to generate the plurality of regenerated key shares such that the key share from which the regenerated key shares is generated is obtained by addition of the regenerated key shares, and each of the unrevoked detection modules, when executed by the microprocessor of the information processing device, is further configured to generate the new key share by adding the regenerated key share to the key share stored therein.

9. A management device for managing (i) a protection control module for protecting an application program, and (ii) a plurality of detection modules for monitoring tampering of the protection control module, the management device comprising:

a microprocessor; and a non-transitory computer-readable recording medium coupled to the microprocessor storing computer-executable instructions thereon, wherein the instructions, when executed by the microprocessor, are configured to:

generate a plurality of key shares by decomposing a decryption key, the decryption key being for decrypting an encrypted application program generated as a result of encryption of the application program; and output each of the key shares to a different one of the detection modules, wherein one of the detection modules has been revoked, and wherein the instructions, when executed by the microprocessor, are further configured to:

generate a plurality of regenerated key shares by decomposing the key share allocated to the revoked detection module; and output each of the plurality of regenerated key shares to a different one of the detection modules that have not been revoked.

10. The management device of claim 9 wherein the instructions, when executed by the microprocessor, are further configured to generate the plurality of regenerated key shares such that the key share from which the regenerated key shares are generated is obtained by addition of the regenerated key shares.

11. An information processing device comprising:

a microprocessor; and a non-transitory computer-readable recording medium coupled to the microprocessor storing computer-executable instructions thereon, wherein the instructions include:

a protection control module for protecting an application program; and a plurality of detection modules for monitoring tampering of the protection control module, wherein a plurality of key shares are generated as a result of a decryption key being decomposed by a management device, the decryption key is for decrypting an encrypted application program generated as a result of encryption of the application program, and each of the key shares thus generated are output by the management device to a different one of the detection modules, wherein the detection modules, when executed by the microprocessor, acquire and store therein the key shares, wherein the protection control module, when executed by the microprocessor of the information processing device, is configured to output the encrypted application program to each of the detection modules, wherein each detection module, when executed by the microprocessor, is further configured to acquire the encrypted application program from the protection control module, partially decrypt the encrypted application program with use of the key share stored therein to generate a partially decrypted text, and output the partially decrypted text to the protection control module, and wherein the protection control module, when executed by the microprocessor of the information processing device, is further configured to:

acquire the partially decrypted texts from the detection modules, and decrypt the encrypted application program with use of the acquired partially decrypted texts.

12. The information processing device of claim 11 wherein the encrypted application program has been generated according to an RSA cryptosystem, each detection module, when executed by the microprocessor, is further configured to generate the partially decrypted text by raising the encrypted application program by the power of a value of the key share, and the protection control module, when executed by the microprocessor of the information processing device, is further configured to decrypt the encrypted application program by multiplying values of the partially decrypted texts.

13. The information processing device of claim 11 wherein the protection control module, when executed by the microprocessor of the information processing device, is further configured to:

select a plurality of detection modules from among all the detection modules, and output the encrypted application program to each of the selected detection modules.

14. An information processing device comprising:

a microprocessor; and a non-transitory computer-readable recording medium coupled to the microprocessor storing computer-executable instructions thereon, wherein the instructions include:

a protection control module for protecting an application program; and a plurality of detection modules for monitoring tampering of the protection control module, wherein a plurality of key shares are generated as a result of a decryption key being decomposed by a management device, the decryption key is for decrypting an encrypted application program generated as a result of encryption of the application program, and each of the key shares thus generated are output by the management device to a different one of the detection modules, wherein one of the detection modules, when executed by the microprocessor, is configured to:

acquire the key share;

store therein the key share; and output the key share to the protection control module, wherein the management device further performs decryption processing made up of a plurality of partial decryption processes on an encrypted application program generated as a result of encryption of the application program in a non-tampered state and, for each partial decryption process, performs a one-way conversion on both input data for the partial decryption process and output data resulting from the partial decryption process to generate a decryption verification value, generates verification data including the input data and the decryption verification value, and outputs the verification data to the protection control module, wherein the protection control module, when executed by the microprocessor, is further configured to perform the decryption processing made up of the plurality of partial decryption processes on the encrypted application program and, for each partial decryption process, output the verification data and the output data resulting from the partial decryption process to a corresponding one of the detection modules, wherein the one of the detection modules, when executed by the microprocessor, is further configured to:

receive the output data and the verification data; and perform verification using the output data and the verification data, and output a result of the verification indicating a verification failure if the verification fails, wherein the plurality of partial decryption processes correspond one-to-one to two or more of the plurality of detection modules, wherein the protection control module, when executed by the microprocessor, is further configured to output the verification data and the output data resulting from each partial decryption process to the detection module corresponding to the partial decryption process, wherein the one of the detection modules, when executed by the microprocessor, is further configured to:

transmit identification information identifying the partial decryption process corresponding to the detection module, to another one or more of the detection modules;

receive, from another one or more of the detection modules, one or more pieces of identification information identifying the partial decryption processes corresponding to the other one or more detection modules; and perform verification on duplication of the one or more pieces of identification information and the identification information identifying the partial decryption process corresponding to the detection module, and on the comprehensiveness of the one or more pieces of identification information and the identification information identifying the partial decryption process corresponding to the detection module, with respect to all pieces of identification information corresponding to the plurality of partial decryption processes.

15. The information processing device of claim 14 wherein the one of the detection modules, when executed by the microprocessor, is further configured to output a result of verification indicating a verification failure, if any duplicates exist among the one or more pieces of identification information and the identification information identifying the partial decryption process corresponding to the detection module, or if the one or more pieces of identification information and the identification information identifying the partial decryption process corresponding to the detection module do not completely cover all pieces of identification information corresponding to the plurality of partial decryption processes.

16. An information processing device comprising:

a microprocessor; and a non-transitory computer-readable recording medium coupled to the microprocessor storing computer-executable instructions thereon, wherein the instructions include:

a protection control module for protecting an application program; and a plurality of detection modules for monitoring tampering of the protection control module, wherein a plurality of key shares are generated as a result of a decryption key being decomposed by a management device, the decryption key is for decrypting an encrypted application program generated as a result of encryption of the application program, and each of the key shares thus generated are output by the management device to a different one of the detection modules, wherein one of the detection modules, when executed by the microprocessor, is configured to:

acquire the key share; and store therein the key share, wherein the protection control module, when executed by the microprocessor, is configured to output the encrypted application program to the detection module, wherein the one of the detection modules, when executed by the microprocessor, if further configured to:

acquire the encrypted application program from the protection control module;

partially decrypt the encrypted application program with use of the key share stored therein to generate a partially decrypted text; and output the partially decrypted text to the protection control module, and wherein the protection control module, when executed by the microprocessor, is further configured to acquire the partially decrypted texts from the detection modules, and decrypt the encrypted application program with use of the partially decrypted texts.

17. The information processing device of claim 16 wherein the encrypted application program has been generated according to an RSA cryptosystem, and the one of the detection modules, when executed by the microprocessor, is further configured to generate the partially decrypted text by raising the encrypted application program by the power of a value of the key share.

18. The information processing device of claim 16 wherein the protection control module has attached thereto a tampering detection certificate, the tampering detection certificate being generated by digitally signing the protection control module in a non-tampered state, and the one of the detection modules, when executed by the microprocessor, is further configured to perform tampering detection on the protection control module using the tampering detection certificate.

19. An information processing device comprising:

a microprocessor; and a non-transitory computer-readable recording medium coupled to the microprocessor storing computer-executable instructions thereon, wherein the instructions include:

a protection control module for protecting an application program; and a plurality of detection modules for monitoring tampering of the protection control module, wherein a plurality of key shares are generated as a result of a decryption key being decomposed by a management device, the decryption key is for decrypting an encrypted application program generated as a result of encryption of the application program, and each of the key shares thus generated are output by the management device to a different one of the detection modules, wherein one of the detection modules, when executed by the microprocessor, is configured to perform:

acquire the key share;

store therein the key share; and output the key share to the protection control module, wherein one of the detection modules has been revoked, wherein the management device further generates a plurality of regenerated key shares by decomposing the key share allocated to the revoked detection module, and outputs each of the plurality of regenerated key shares to a different one of the detection modules that have not been revoked, wherein the one of the detection modules has not been revoked, and wherein the one of the detection modules, when executed by the microprocessor, is further configured to acquire the regenerated key share, and update the key share stored therein with use of the regenerated key share to generate a new key share.

20. The information processing device of claim 19 wherein the management device generates the plurality of regenerated key shares such that the key share from which the regenerated key shares is generated is obtained by addition of the regenerated key shares, and the one of the detection modules, when executed by the microprocessor, is further configured to generate the new key share by adding the regenerated key share to the key share stored therein.

\* \* \* \* \*